United States Patent [19]
Shirasaki et al.

[11] Patent Number: 6,025,894
[45] Date of Patent: Feb. 15, 2000

[54] SCATTER CONTROL MEMBER FOR ORGANIC ELECTROLUMINESCENT LIGHT SOURCE FOR PASSING LIGHT WITH OR WITHOUT SCATTERING DEPENDING UPON AN INCIDENT ANGLE

[75] Inventors: Tomoyuki Shirasaki, Higashiyamato; Hiroyasu Yamada, Hachioji; Masaharu Shioya, Akiruno; Tetsushi Yoshida, Kanagawa-ken; Manabu Takei, Sagamihara; Tetsuo Muto, Hachioji; Yasuhiro Daiku, Iruma, all of Japan

[73] Assignee: Casio Computer Co., Ltd., Tokyo, Japan

[21] Appl. No.: 08/922,265

[22] Filed: Sep. 2, 1997

[30] Foreign Application Priority Data

Sep. 4, 1996 [JP] Japan .................................... 8-252195
Dec. 25, 1996 [JP] Japan .................................... 8-345848
Dec. 25, 1996 [JP] Japan .................................... 8-345849

[51] Int. Cl.[7] .................................................. G02F 1/1335
[52] U.S. Cl. ................................. 349/69; 349/64; 349/61
[58] Field of Search .................................. 349/62, 64, 69, 349/65, 112, 61

[56] References Cited

U.S. PATENT DOCUMENTS 5,703,326 12/1997 Yamada et al. ....................... 174/50.52
5,739,180 4/1998 Taylor-Smith ........................... 349/158
5,748,271 5/1998 Hikmet et al. ............................. 349/69
5,777,038 7/1998 Nishikawa et al. ...................... 525/295
5,903,101 5/1999 Kijima ..................................... 313/506

Primary Examiner—William L. Sikes
Assistant Examiner—Kari M. Horney
Attorney, Agent, or Firm—Frishauf, Holtz, Goodman, Langer & Chick, P.C.

[57] ABSTRACT

An organic electroluminescence device is placed as a back light of a liquid crystal display panel. The organic electroluminescence device is constituted by a front electrode (#112) having transparency to visible light, a rear electrode (#113) having reflection to visible light and an organic electroluminescence layer (#114) for emitting light as a predetermined voltage is applied between the front and rear electrodes. A scatter control member (#120), located between the liquid crystal panel and the organic electroluminescence panel, passes incident light within a predetermined range without scattering and passes light outside the predetermined range with scattering. Preferably, the scatter control member is constituted by a plurality of lightguiding portions (#121) having transparency to visible light and a plurality of reflection films (#122) having a reflection property to visible light.

11 Claims, 36 Drawing Sheets

SCATTER CONTROL MEMBER FOR ORGANIC ELECTROLUMINESCENT LIGHT SOURCE FOR PASSING LIGHT WITH OR WITHOUT SCATTERING DEPENDING UPON AN INCIDENT ANGLE

BACKGROUND OF THE INVENTION

1. Field of the Invention

The present invention relates to a display apparatus, more particularly to a liquid crystal display apparatus which is used as both a reflection type display and a transmission type display and a method of driving the same.

This invention also relates to a light source apparatus, having a scatter control member, which is preferable to a liquid crystal display apparatus.

2. Description of the Related Art

Since liquid crystal display (LCD) apparatuses can be designed flat and light, they are used as display apparatuses for various kinds of electronic apparatuses. As the idea of computerization is recently penetrating among people, portable personal computers (notebook type personal computers) and portable information terminals become popular. Because of the portability, such electronic apparatuses should suppress power consumption as low as possible. In this respect, portable electronic apparatuses use a reflection type LCD apparatus which uses no back-light to reduce required power accordingly. While such an LCD apparatus can obtain good contrast in the daylight with bright outside light (in a bright environment), it cannot provide a visible display in a dark place or in the night (in the dark). By contrast to the reflection type, a transmission type LCD apparatus with a back-light can give sufficient contrast in the dark with the back-light's luminance of about 20 cd/m$^2$, but cannot give good contrast in a bright environment even if the back-light's luminance is 200 cd/m$^2$. In view of this, an LCD apparatus which can be used as both a reflection type display and a transmission type display as shown in FIG. 37 has been developed. This LCD apparatus has an LCD panel 201, a semipermeable semireflection film (half mirror) 202 located at the back of an LCD panel 201, and a back-light system 203 positioned at the back of the semipermeable semireflection film 202.

The LCD panel 201 comprises electrodes 213 and 214 respectively provided on the opposing surfaces of substrates 211 and 212, aligning films 215 and 216, and polarization plates 218 and 219 provided on the outer surfaces of the substrates 211 and 212. The back-light system 203 comprises a lamp 204 of a straight tube or an L shape, and a light guiding plate 205 of a white acrylic plate provided in association with the LCD panel 201. The semipermeable semireflection film 202 reflects lights which is incident through the LCD panel 201 thereto.

Another LCD apparatus which has a back-light system 303 as shown in FIG. 38 is also developed. The back-light system 303 comprises a transparent electrode 305, a high-dielectric layer 306, an inorganic electroluminescence (EL) layer 307, a high-dielectric layer 308 and an electrode 309 sequentially formed on a glass substrate 304. The high-dielectric layer 308 is formed of barium titanate. The inorganic EL layer 307 consists of a binder and inorganic electroluminescence particles dispersed in the binder. Those layers 307 and 308 are both as thick as several tens of micrometers.

The inorganic EL layer 307 should be formed thick in order to prevent the generation of pinholes which would short-circuit the transparent electrode 305 and the electrode 309 and to emit a uniform light in emitting area and also to ensure sufficient light emission. The high-dielectric layer 308 should be so formed as to ensure uniform luminance control. Accordingly, the inorganic EL layer 307 and the high-dielectric layer 308 are thick enough to be opaque to the visible light. However, because of their thicknesses, the effective voltage to be applied to the electrodes 305, 309 should be set high.

The display functions of those LCD apparatuses will now be briefly described. In the diagrams, reference character X indicates outside light in a bright state, which reaches the LCD panel 201. This outside light X passes the LCD panel 201 and hits the semipermeable semireflection film 202. At this time, a part of the incident light X1 passes the semipermeable semireflection film 202 as transmitted light X3. The remaining component of the incident light X1 is reflected to be reflected light X2. This reflected light X2 reaches the LCD panel 201. Display light X4 according to the alignment stage of the liquid crystal goes out from the display surface to display an image. In the dark, the back-light system 203 or 303 is activated. Consequently, illumination light Y goes out from the light guiding plate 205 or the inorganic EL layer 307. This illumination light Y passes the semipermeable semireflection film 202 to become illumination light Y1. In this case, a part of the illumination light Y passes the semipermeable semireflection film 202, and this transmitted part of the illumination light Y becomes the illumination light Y1. As the illumination light Y1 comes to the LCD panel, display according to the alignment state of the liquid crystal becomes possible.

In these LCD apparatuses, however, the light guiding plate 205, the inorganic EL layer 307 and the high-dielectric layer 308, whose sizes match with the display area of the LCD panel 201, are opaque to the visible light and do not show reflectability so much. If those display apparatuses do not provide the semipermeable semireflection film 202 above the light guiding plate 205 or the inorganic EL layer 307, they cannot be used as a reflection type display.

In those LCD apparatuses, a part of the incident light X1 (the transmitted light X3) passes the semipermeable semireflection film 202. This undesirably reduces the amount of the reflected light X2 so that the good contrast cannot be achieved. The illumination light Y outgoing from the back-light system 203 or 303, when those LCD apparatuses are used in the dark, is partly absorbed by the semipermeable semireflection film 202 and transmits thereto, then it becomes the illumination light Y1. That is, the light from the back-light system 203 or 303 cannot be used efficiently for display. The provision of good contrast in the dark, therefore, requires an improvement on the luminescent performance. This increases the power consumption. Particularly, a portable LCD apparatus cannot avoid the problem of a shorter continuous display time. Further, because of the thick inorganic EL layer 307 and high-dielectric layer 308, a high applied voltage of approximately several tens of volts (V) is needed. It is thus necessary to enlarge the voltage generator in a portable display apparatus, which makes it difficult to achieve high-density implementation of the portable display apparatus.

The luminance of the outgoing light Y from the back-light system 203 varies according to the distance from the lamp 204. To emit planar uniform light, therefore, a separate scatter plate becomes necessary, which undesirably makes the apparatus thicker.

In an LCD apparatus which uses color filters to ensure multi-color display, the outside light or the light from the back-light, which comes to the color filters provided in the LCD panel 201 and are dispersed to predetermined wavelength ranges by the color filters before going out. That is, the red color filter absorbs lights of the other wavelength ranges than the red wavelength range and passes the light of the red wavelength range. But, the red color filter cannot completely cut off the lights of the other wavelength ranges than the red wavelength range so that those lights partially escape the filter, thus lowering the color purity. Further, actually, the red color filter absorbs the light of the red wavelength range slightly in addition to the lights of the other wavelength ranges than the red wavelength range. This LCD apparatus therefore suffers a low luminance and a smaller contrast ratio. In the case of a semipermeable semireflection type LCD apparatus provided with color filters on the display side with respect to the liquid crystal, in particular, the outside light should pass the color filters and the liquid crystal twice when the apparatus functions as a reflection type. As the transmission type, the light from the back-light passes the color filters and the liquid crystal once. By contrast to used as a transmission type, the ratio of the outgoing light to the incident light is significantly low when the display apparatuses are used as a reflection type. Further, there is a great difference in display luminance between the reflection type display and the transmission type display.

There is an ECB (Electrically Controlled Birefringence) type LCD apparatus as an LCD apparatus which displays colors without using color filters.

The reflection type ECB LCD apparatus is structured such that polarization plates having polarization axes are arranged on both outer surfaces of a liquid crystal cell, which has a liquid crystal sandwiched between a pair of substrates, and a reflection plate is provided under one of the polarization plates.

In such an LCD apparatus, the outside light incident to one of the polarization plates passes the polarization plate, and it becomes linearly polarized light. As the linearly polarized light passes the liquid crystal cell, it becomes elliptically polarized light due to the birefringence effect of the liquid crystal. Thereafter, as the elliptically polarized light passes the other polarization plate, it becomes linearly polarized light. The light outgoing from the other polarization plate, whose intensity varies wavelength by wavelength, becomes colored light according to the intensity of the light of each wavelength. This colored light is reflected by the reflection plate and travels along the opposite path to the aforementioned path and goes out from the polarization plate. Therefore, the reflection type ECB LCD apparatus achieves color display with the birefringence effect of the liquid crystal and the polarization effects of both polarization plates, without any color filters. Note that as the alignment state of a liquid crystal molecules varies in accordance with the level of the applied voltage, the birefringence of light changes. In other words, the polarization state of the light which goes out from the liquid crystal cell changes, in accordance with the level of the applied voltage. It is therefore possible to change the color of the same pixel by controlling the level of the voltage applied to the liquid crystal.

Even in such an ECB LCD apparatus, as shown in FIG. 39, the reflectance or the ratio of the outgoing light to the incident light considerably differs for each color or in accordance with the level of the voltage to be applied between the electrodes 203 and 214. This significantly deteriorates the display luminance balance.

SUMMARY OF THE INVENTION

Accordingly, it is an object of the present invention to provide a display apparatus, used as both a reflection type display and a transmission type display, which can be designed compact and can accomplish high-contrast display with low power consumption even in the dark, and a method of driving the same.

It is another object of the present invention to provide a light source apparatus, when used as a back light of a liquid crystal display apparatus, which provides a wide view-angle for the liquid crystal display apparatus.

To achieve the object, a display apparatus according to this invention comprises:

a liquid crystal display panel having a pair of transparent substrates having electrodes formed on opposing surfaces and a liquid crystal sandwiched between the transparent substrates; and an organic electroluminescence panel arranged opposite to the liquid crystal display panel and having a front electrode having a transparency to visible light, a rear electrode having a reflection property to the visible light and an organic electroluminescence layer for emitting light as a predetermined voltage is applied between the front electrode and the rear electrode.

The organic electroluminescence layer, unlike an inorganic electroluminescence layer, can be formed considerably thin. Because of the thinness, the organic electroluminescence layer can emit light of sufficient luminance and uniform luminance in plane as a back-light with a relatively low applied voltage of approximately several volts (V) to twenty volts (V). Therefore, this liquid crystal display apparatus need not use a large voltage generator, and can thus be made compact easily. Further, since the organic electroluminescence layer shows a transmission property to the visible light, the display apparatus is very effective as a reflection type liquid crystal display apparatus with a high reflectance obtained by well passing the outside light.

Furthermore, it is easier to select the color of emitted light in accordance with the material of the organic electroluminescence layer as compared with an inorganic electroluminescence material. When the luminance differs in accordance with the display color of the liquid crystal display panel, therefore, it is possible to set the color of emitted light in such a way as to compensate for the variation and adjust the luminance balance of the display color of the liquid crystal display apparatus.

As a scatter control member is provided on that side of the organic electroluminescence layer from which light goes out, liquid crystal display with a uniform luminance is visible in a wide angle in both reflection type display and transmission type display.

To achieve the object, a light source apparatus according to this invention comprises:

a light source having a pair of electrodes and an organic electroluminescence layer sandwiched between the pair of electrodes, for emitting light in accordance with a voltage applied between the pair of electrodes; and a scatter control member, arranged on that side of the light source where the light emitted by the organic electroluminescence layer goes out, for allowing light incident at an incident angle within a predetermined angular range to go out unscattered and allowing light incident at an incident angle off the predetermined angular range to be scattered and go out.

To achieve the object, a method of driving a display apparatus according to this invention, in which the display apparatus comprises a liquid crystal display panel having a pair of transparent substrates having electrodes formed on opposing surfaces and a liquid crystal sandwiched between the transparent substrates; and an organic electroluminescence panel arranged opposite to the liquid crystal display panel and having a front electrode having a transparency to visible light, a rear electrode having a reflection property to the visible light and an organic electroluminescence layer for emitting light as a predetermined voltage is applied between the front electrode and the rear electrode, comprises:

a reflection display step of causing light coming from outside of the display apparatus via the liquid crystal display panel to be reflected by the rear electrode and to go out toward the one of the pair of substrates via the liquid crystal, thereby displaying an image; and a transmission display step of applying a predetermined voltage between the front electrode and the rear electrode to permit light emission of the organic electroluminescence layer and causing light emitted by the organic electroluminescence layer to go out toward the pair of substrates via the liquid crystal, thereby displaying an image.

DETAILED DESCRIPTION OF THE PREFERRED EMBODIMENTS

Display apparatuses according to this invention will now be specifically described, embodiment by embodiment, with reference to the accompanying drawings.

First Embodiment

Figure 1:
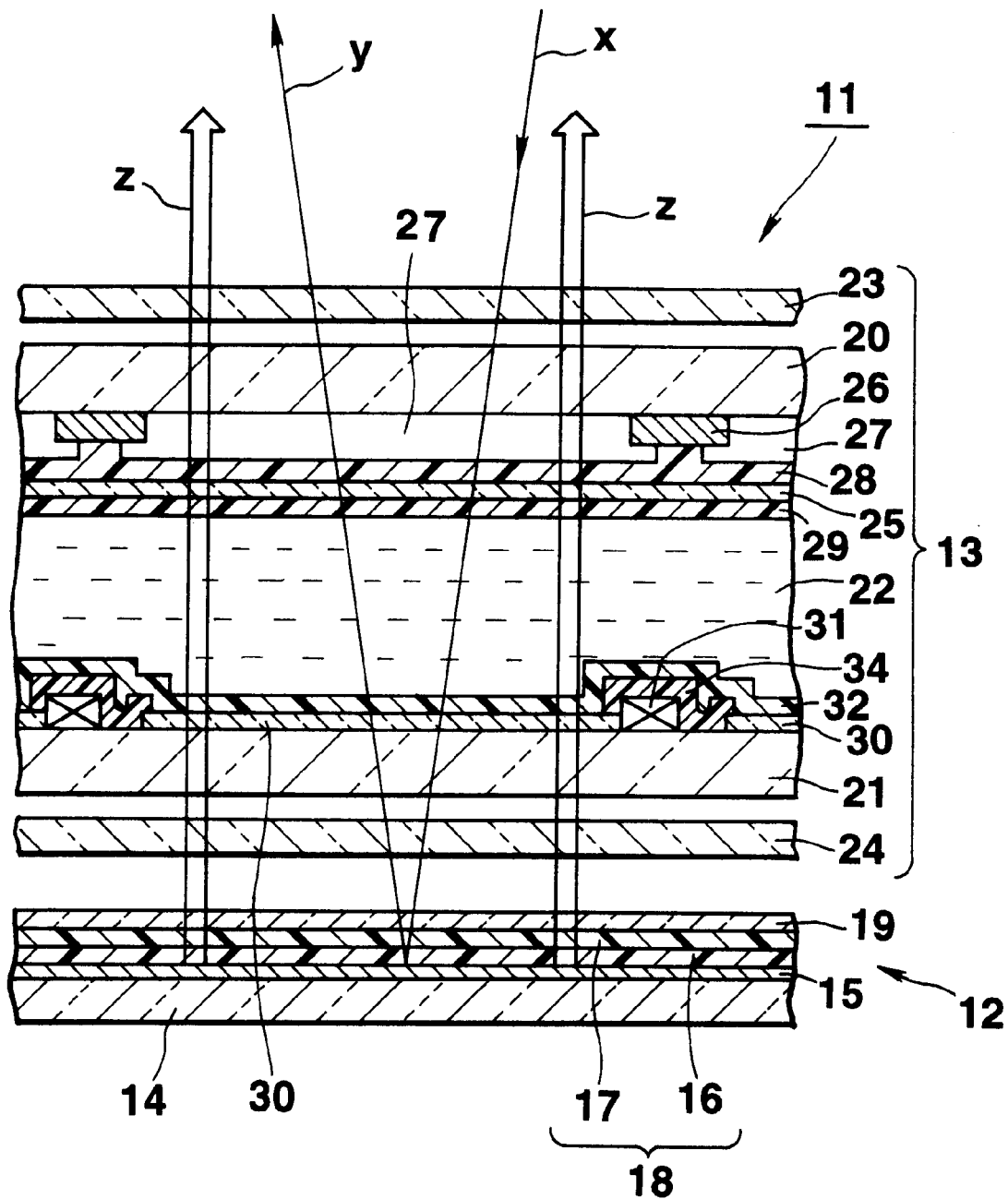
FIG. 1 is a cross-sectional view of a display apparatus according to the first embodiment of this invention.

FIG. 1 is a cross-sectional view showing a display apparatus 11 according to the first embodiment of this invention. As illustrated, the display apparatus 11 comprises an organic electroluminescence (EL) device 12 and a liquid crystal display (LCD) panel 13 located in front of (above in the diagram) this organic EL device 12.

The structure of the organic EL device 12 will now be discussed. As shown in FIG. 1, a reflection cathode electrode 15 of a light-reflective metal like Mg—In or Mg—Ag is formed on a substrate 14 of glass or a resin like poly (ethyleneterephthalate) (hereinafter referred to as "PET"). From the viewpoint of the electron injecting property, a material of a low work function is desirable for the reflection cathode electrode 15. It is desirable that the electron affinity of the material for the reflection cathode electrode 15 is close to or smaller than that of the material for an electron-transporting layer 16. From the viewpoint of the light reflection, a material having a reflection property with respect to visible light (an electromagnetic wave having a wavelength of 400 nm or greater and 800 nm or smaller) is desirable for the reflection cathode electrode 15. This reflection cathode electrode 15 has a shape and area which match the display area of the LCD panel 13. The reflection cathode electrode 15 is formed of an arbitrary thickness by sputtering or vacuum vapor deposition or the like, and its reflection surface (the interface with the electron-transporting layer 16) has a smooth mirror structure.

Formed on the reflection cathode electrode 15 is the electron-transporting layer 16 of aluminum-tris(8-hydroxyquinolinate) (hereinafter referred to as "Alq3") which has a shape and an area likewise matching with the display area. This electron-transporting layer 16 is formed by vapor deposition. The electron-transporting layer 16 has a thickness of about 20 nm to 100 nm, and has a property to inject electrons from the reflection cathode electrode 15 and transport the injected electrons in accordance with the voltage applied between the reflection cathode electrode 15 and an anode electrode 19 therein. Formed on the electron-transporting layer 16 is a hole-transporting layer 17 which consists of a mixture of poly(N-vinylcarbazole) (hereinafter referred to as "PVCz"), 2,5-bis(1-naphthyl)oxadiazole (hereinafter referred to as "BND") and a luminescent material. The hole-transporting layer 17 is formed by a wet method, such as dip coating or spin coating, or vapor deposition. The thickness of the hole-transporting layer 17 is about 20 nm to 100 nm. BND is mixed with a mole ratio of approximately 10/100 to 20/100 with respect to a PVCz unit (n=1 in formula (II)). BND has a relative band gap with respect to the anode electrode and propagates the injection and transportation of holes in the hole transporting layer 17. The electron-transporting layer 16 and the hole-transporting layer 17 constitute an organic EL layer 18 whose thickness is approximately 40 nm to 200 nm. Chemical formulae (I) to (II) respectively show the structural formulae of Alq3, PVCz and BND.

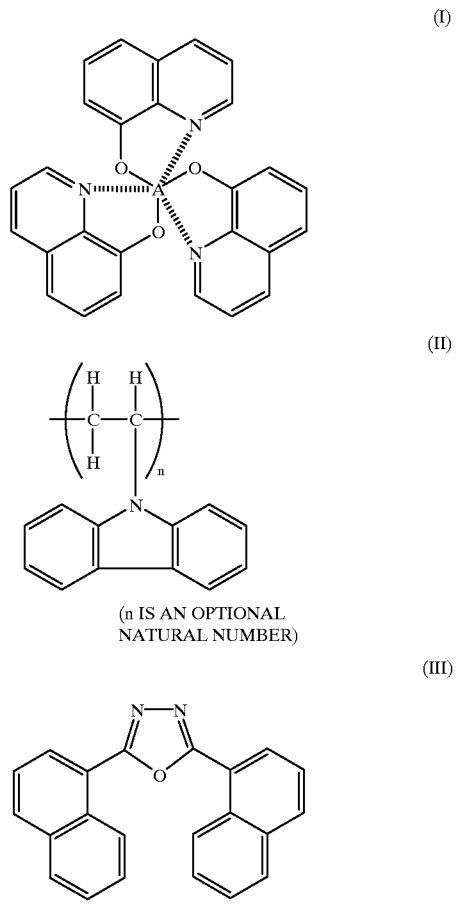

(n IS AN OPTIONAL NATURAL NUMBER)

Luminescent materials have an electroluminescence function to absorb energy generated by the recombination of holes and electrons in accordance with the electric field which is applied to the organic EL layer 18, and to emit light. Those luminescent materials are doped in the hole-transporting layer 17 and/or the electron-transporting layer 16. The luminescent materials include a red dopant, a green dopant and a blue dopant, which respectively emit lights of red (R), green (G) and blue (B).

Figure 16:
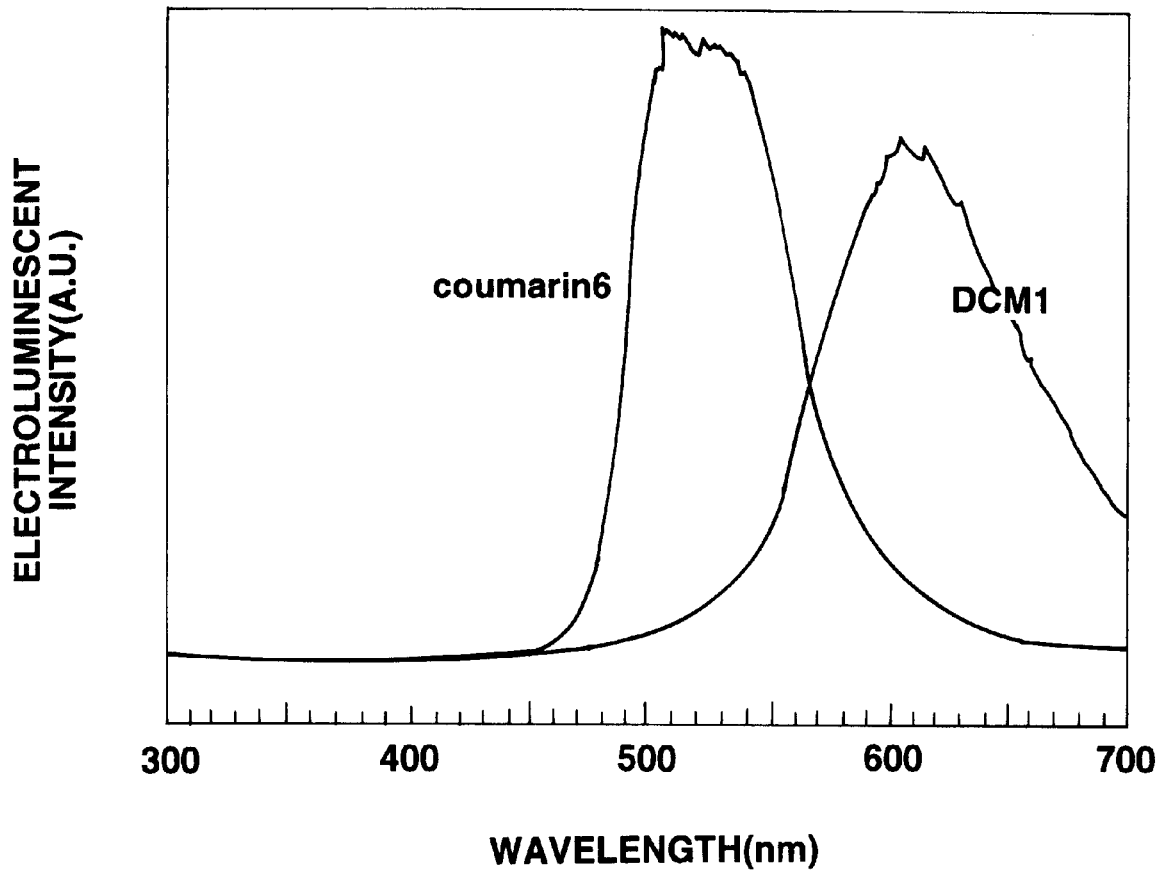
FIG. 16 is a graph showing the EL intensities of coumarin 6 and DCM1.

As the red dopant, 4-dicyanomethylene)-2-methyl-6-(p-dimethylarninostyryl)-4H-pyran (hereinafter referred to as "DCM1") is used. DCM1 emits orange to red lights having a luminescent peak in the vicinity of 600 nm as shown in FIG. 16. The structural formula of DCM1 is given below.

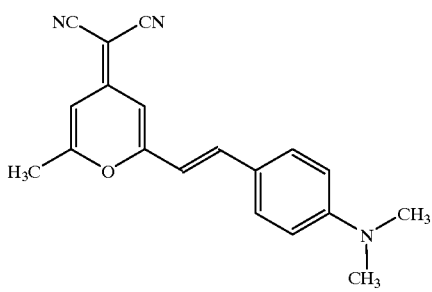

(IV)

3-(2'-benzothiazoyl)-7-diethylaminocoumarin (hereinafter referred to as "coumarin 6") is used as the green dopant as shown in FIG. 16, coumarin 6 emits green light having a peak between 500 nm and 550 nm. The structural formula of coumarin 6 is given below.

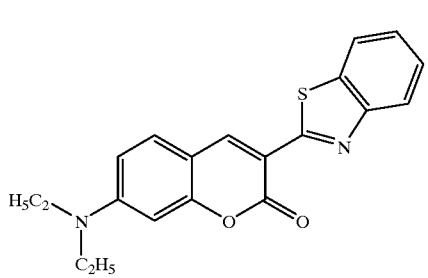

(V)

Besides coumarin 6, quinacridone may also be used as the green dopant. The structural formula of quinacridone is shown below.

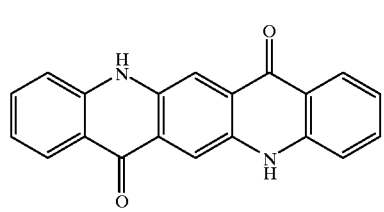

(VI)

As the blue dopant, tetraphenylbenzidine (hereinafter referred to as "TPB"), 4,4'-bis(2,2'-diphenylvinylene) biphenyl, 4,4'-bis((2-carbazole)vinylene)biphenyl, tetraphenylbutadiene derivative, cyclopentadiene derivative, oxadiazole derivative or the like is used. The structural formula of TPB is given below.

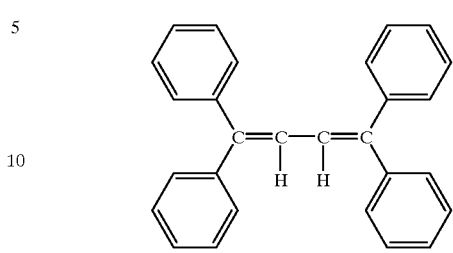

(VII)

The red dopant, green dopant and blue dopant are mixed with mole ratios of approximately 1/100 to 5/100 with respect to a PVCz unit. The amounts of the red dopant, green dopant and blue dopant to be mixed in the PVCz unit are so adjusted as to emit lights of colors which match the spectra of the LCD panel which will be discussed later.

Although the organic EL layer 18 consists of the electron-transporting layer 16 and the hole-transporting layer 17 in FIG. 1, which is in no way restrictive, it may consist of three or more carrier-transporting layers.

The organic EL layer may be constituted by respectively arranging a red EL layer, a green EL layer and a blue EL layer in the areas (the red area, green area and blue area) associated with R, G and B color filters arranged in the LCD panel 13 to be discussed later.

In this case, an EL layer, which has a two-layer structure having an electron-transporting layer of Alq3 and a hole-transporting layer of PVCz doped with DCM1, and emits red light is provided in the R area Provided in the G area is an EL layer, which has a two-layer structure of an electron-transporting EL layer having beryllium-bis(10-hydroxybenzo[h]quinolinato) (hereinafter referred to as "Bebq2") and a hole-transporting layer of N,N'-di(α-naphthyl-N,N'-diphenyl-1,1'-biphenyl-4,4'-diamine (hereinafter referred to as "α-NPD"), and emits green light. Provided in the B area is an EL layer, which has a three-layer structure having an electron-transporting layer of Alq3, a luminescent layer consisting of a mixture of 4,4'-bis(2,2-diphenylvinylene)biphenyl (hereinafter referred to as "DPVBi") of 96% by weight and 4,4'-bis((2-carbazole) vinylene)biphenyl (hereinafter referred to as "BCzVBi") of 4% by weight, and a hole-transporting layer of α-NPD, and emits blue light.

The following are the structural formulae of Bebq2, α-NPD, DPVBi, and BCzVBi respectively.

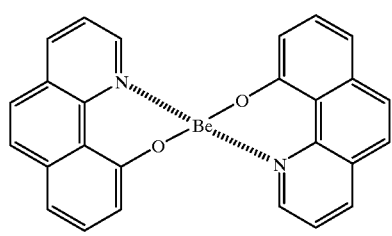

(VIII)

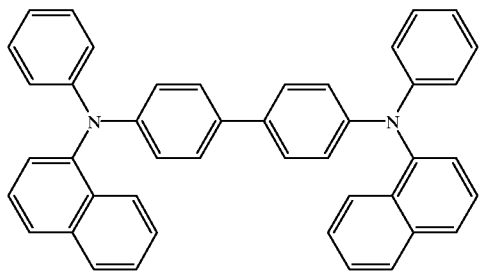

(IX)

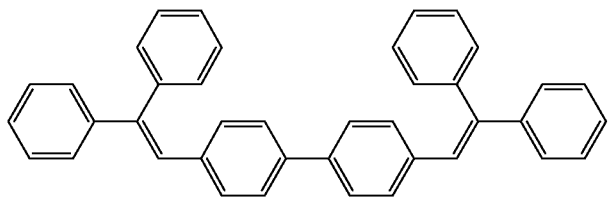

(X)

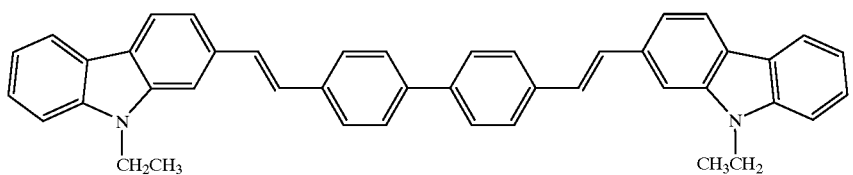

(XI)

The anode electrode 19 is formed on the entire surface of the organic EL layer 18. This anode electrode 19 is formed of a transparent electrode material (e.g., ITO) which has a transmission property to the outside light and the light which is emitted by the organic EL device 12. The thickness of the anode electrode 19 is approximately 50 nm to 150 nm.

The above has described the structure of the organic EL device 12 of the display apparatus 11. As discussed above, the organic EL layer 18 of an organic material hardly produces pinholes which would cause short-circuiting between electrodes even if it is formed very thin as compared with an inorganic EL layer, and, what is more, can emit light with high luminance. Being thin, the organic EL layer 18 exhibits a high transmission property with respect to light in a visible light's wavelength range. As the total thickness of the organic EL layer 18 and the anode electrode 19 is thin, it is possible to make the deviation of the parallax significantly small.

Now the structure of the LCD panel 13 will be discussed. As shown in FIG. 1, in the LCD panel 13, an LC cell is comprised of a front transparent substrate 20, a rear transparent substrate 21 and a liquid crystal 22, sandwiched and sealed between the front transparent substrate 20 and rear transparent substrate 21 by a seal member (not shown). The liquid crystal 22 is a twisted nematic liquid crystal which is twisted by approximately 90 degrees, for example. A front polarization plate 23 is located in front of (above in the figure) the front transparent substrate 20, and a rear polarization plate 24 at the back of (below in the figure) the rear transparent substrate 21. The polarization axes of the front polarization plate 23 and the rear polarization plate 24 are perpendicular to each other and are set in accordance with the alignment of the liquid crystal. A plurality of color filters 27 are formed on the opposing inner surface of the front transparent substrate 20, with black masks 26 of a grid shape or a stripe shape formed around the color filters 27. Each of the color filters 27 is comprised of an R filter, G filter and B filter, which mainly disperse only the respective light components of the red, green and blue wavelength ranges from the lights that respectively include the red, green and blue wavelength ranges. The R filters, G filters and B filters are arranged in a stripe pattern, or a dot pattern in association with pixel electrodes 30 to be described later. A transparent protective film 28 is formed on those black masks 26 and color filters 27. A common electrode 25 of ITO, which has a transmission property of over 70% to the visible light, is formed on the protective film 28 over the entire display area. Formed on the common electrode 28 is a front aligning film 29 of polyimide which has undergone an aligning treatment such as rubbing. A plurality of pixel electrodes 30 of ITO and a plurality of thin film transistors (TFTs) 31 as switching elements are arranged on the opposing inner surface of the rear transparent substrate 21. The source electrodes of the TFTs 31 are connected to the pixel electrodes 30. The layout pattern for the pixel electrodes 30 is a matrix pattern or a delta pattern, for example. The delta pattern is such that adjoining columns of pixel electrodes 30 are staggered by half the cycle of a set of R, G and B filters of each color filter. The gate electrodes of the TFTs 31 are connected to gate lines through which select voltages are applied. The drain electrodes of the TFTs 31 are connected to drain lines through which signal voltages are applied. An interlayer insulator film 34 of silicon nitride is patterned in a non-pixel area which includes those TFTs 31. Formed on the pixel electrodes 30 and the interlayer insulator film 34 are a rear aligning film 32 of polyimide which has undergone an aligning treatment such as rubbing.

A description will now be given of the operations in the case where the thus constituted display apparatus 11 is used with the outside light reflected (where it is used in a bright environment) and in the case where it is used with the organic EL device 12 driven to emit light (where it is used in a dark environment).

Use In Bright Environment

When this display apparatus 11 is used under a bright environment which provides a sufficient amount of outside light, the organic EL device 12 is disabled to be in a non-luminescent state. The arrow "x" in FIG. 1 indicates outside light including every light components in the visible light range, and the arrow "y" indicates outgoing light which is reflected by the reflection cathode electrode 15 of the organic EL device 12 and travels in the arrow direction. The incident light x passes the front polarization plate 23 and becomes linearly polarized light whose polarization face is directed toward the transmission axis of the front polarization plate 23. This linearly polarized light is polarized (linearly polarized, elliptically polarized or circularly polarized) in accordance with the voltage applied between the electrodes 25 and 30 by the birefringence effect of the liquid crystal 22. Of this polarized light according to the applied voltage, only the component directed toward the transmission axis of the rear polarization plate 24 passes the rear polarization plate 24 and comes to the organic EL device 12. The light incident to the organic EL device 12 passes the anode electrode 19 and the organic EL layer 18 and is reflected by the reflection cathode electrode 15.

Figure 2:
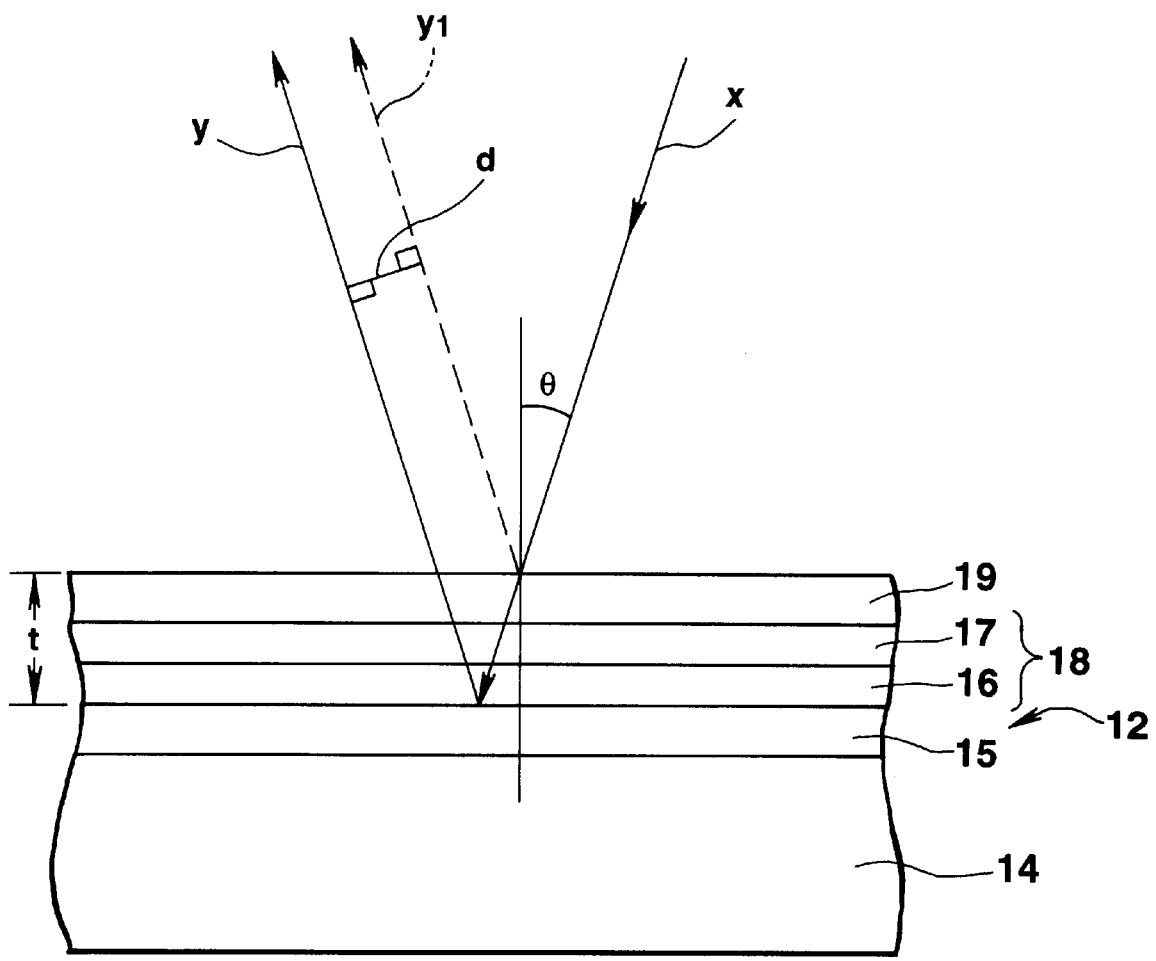
FIG. 2 is a diagram for explaining a deviation of the parallax caused by the reflection of light at the organic EL device of the first embodiment.

FIG. 2 is a diagram for explaining a deviation of the parallax caused by the reflection of light at the organic EL device 12. Since the anode electrode 19 and the organic EL layer 18 are both thin and have similar refractive indexes, there is not much influence of light refraction at the interface between them. As illustrated in the figure, the incident light x is separated to the outgoing light y which is reflected by the reflection cathode electrode 15 and outgoing light y1 which is partially reflected by the surface of the anode electrode 19. The distance d between those outgoing lights y and y1 can be expressed by the following equation (1)

$$d = t \times \sin 2\theta / \cos \theta \quad (1)$$

where "t" is the total thickness of the anode electrode 19 and the organic EL layer 18 and "θ" is the angle of incidence of the incident light x. With the incident angle "θ"=30° and t=300 nm, d becomes about 200 nm. According to this embodiment, since the total thickness of the anode electrode 19 and the organic EL layer 18 can apparently be suppressed small, the distance d between the reflected lights y and y1 becomes very short. This value is substantially the same even if the refractive index of the organic EL layer 18 is considered. As the total thickness of the anode electrode 19 and the organic EL layer 18 is 200 nm, shorter than the wavelength of the visible light, the anode electrode 19 and the organic EL layer 18 does not cause multireflection, so that no other outgoing light than the outgoing lights y and y1 goes out. Even if double display lights are formed by the outgoing lights y and y1 when the reflected lights y and y1 come to the LCD panel 13 and go out forward, the distance between the double display lights are short enough to be visually negligible, so that flickering on the screen does not occur. Nor does continuous partial glowing occur. Because the total thickness of the anode electrode 19 and the organic EL layer 18 is very thin, the outgoing light y has just a small light loss to the incident light x so that a sufficient amount of light necessary for image display can go out.

Use In Dark Environment

When this display apparatus 11 is used in a dark environment where there is an insufficient amount of outside light, the organic EL device 12 is activated to be in a luminescent state. The arrow "z" in FIG. 1 indicates a luminescent light of the organic EL device 12. The schematic energy diagram of the organic EL device 12 in this case is given in FIG. 4A.

Figure 4A:
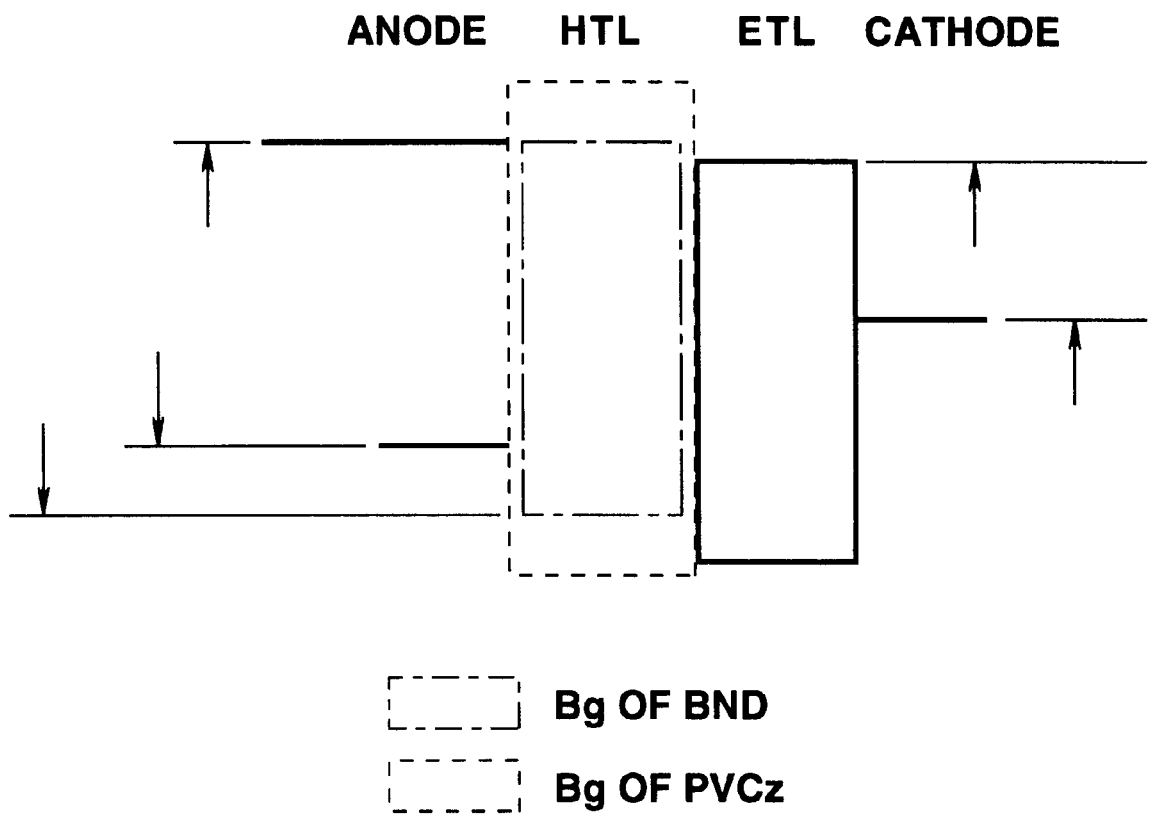
FIG. 4A is an energy diagram of individual materials in an organic EL device.

FIG. 4A shows the energy diagram of the individual materials in the organic EL device 12 which has a double layer structure having a hole-transporting layer consisting of PVCz, BND and a luminescent material, and an electron-transporting layer consisting of Alq3.

The mobility of electrons in the organic EL layer 18 depends on the level of the lowest unoccupied molecular orbital (LUMO) of each material, while the mobility of holes depends on the level of the highest occupied molecular orbital (HOMO) of each material. In other words, the upper and lower limits of the intrinsic band gap of each material is reflected on the movement of the carriers. As a whole including the electrodes, the ionization energy (eV) of each material is reflected on the movement of holes.

There is a potential barrier between the electron affinity of the cathode and the LUMO of Alq3. However, applying a voltage of a predetermined value between the cathode and anode can permit electrons to be supplied from the cathode electrode to the electron-transporting layer (ETL) over this potential barrier. There is also a potential barrier between the ionization energy of the anode and the HOMO of the materials in the hole-transporting layer (HTL). However, applying a voltage between the cathode and anode can permit holes to be supplied from the anode electrode to the HTL over this potential barrier.

Figure 4B:
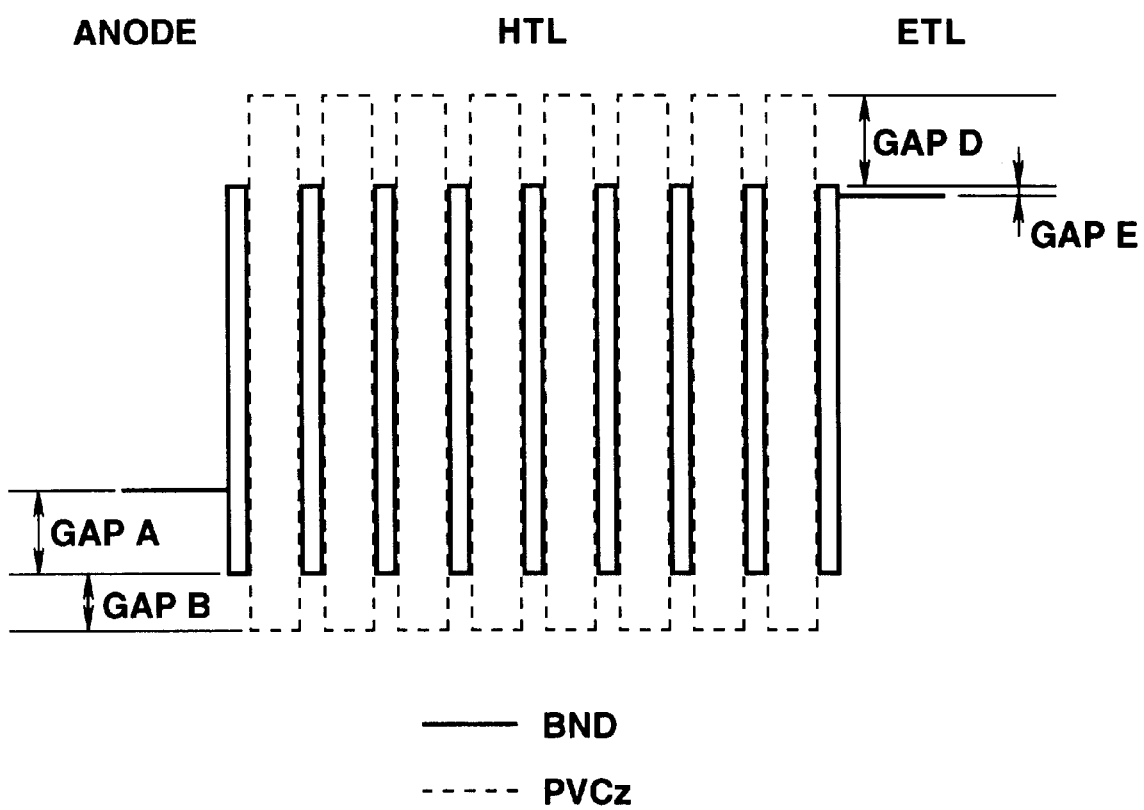
FIG. 4B is an energy diagram showing the mechanism of transporting carriers in a hole-transporting layer.

The movement of holes in the HTL is mainly the popping movement by which holes move through the trapping site formed by the mixture of PVCz and BND as shown in FIG. 4B. That is, the holes, which have moved over a gap A by the application of the voltage equivalent to the difference between the ionization energy of the anode and the HOMO of BND, travel over the gaps B between the HOMO of BND and the HOMO of PVCz one after another toward the ETL Although the electrons injected into Alq3 partially go over a gap E by the applied voltage, they stay in the HTL near the interface with the ETL. Those electrons stayed there recombine with the holes which are transported in the HTL, generating singlet excitons. The remaining electrons recombine with the injected holes in the ETL, generating singlet excitons.

After making an irregular movement for about 10 nm, the singlet excitons are deactivated. The energy which has been generated before the deactivation is caught by the luminescent materials and visible light of a predetermined wavelength range is emitted.

Figure 5:
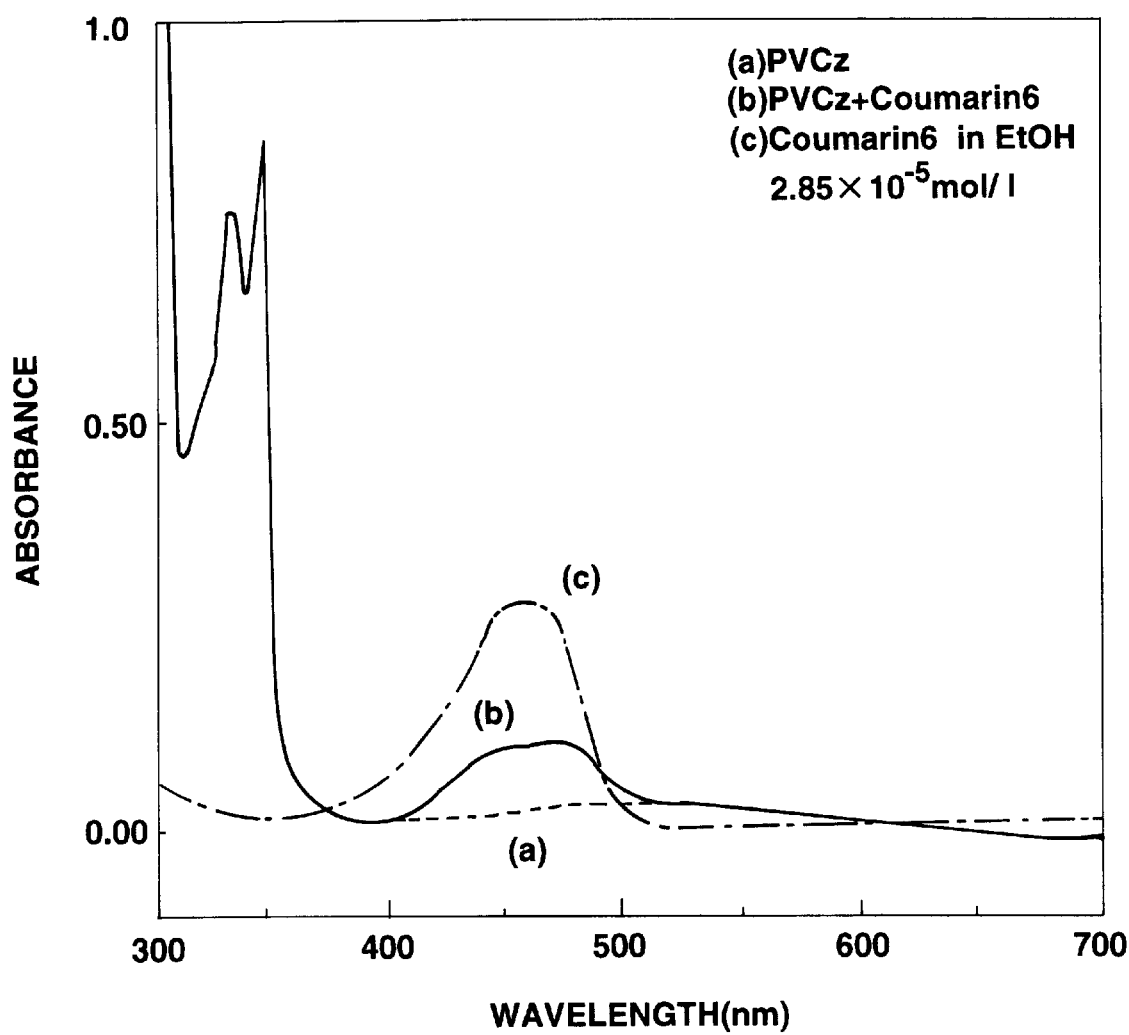
FIG. 5 is a graph showing light absorption spectra of PVCz, PVCz doped with coumarin 6 and coumarin 6 present in ethanol.

FIG. 5 shows light absorption spectra of a single layer of PVCz, the PVCz layer doped with coumarin 6 and coumarin 6 present by the amount of 2.85×10 (mol/l) in ethanol. In the figure, the broken line (a) shows the absorption spectrum of the single layer of PVCz, the solid line (b) shows the absorption spectrum of the PVCz layer doped with coumarin 6, and the one-dot chain line (c) shows the absorption spectrum of an ethanol solution of coumarin 6. Coumarin 6 in PVCz has an absorption peak in the vicinity of 400 nm to 500 nm as indicated by the broken line (a), and PVCz itself mainly has a property to absorb light of 350 nm or less as indicated by the solid line (b).

Figure 6:
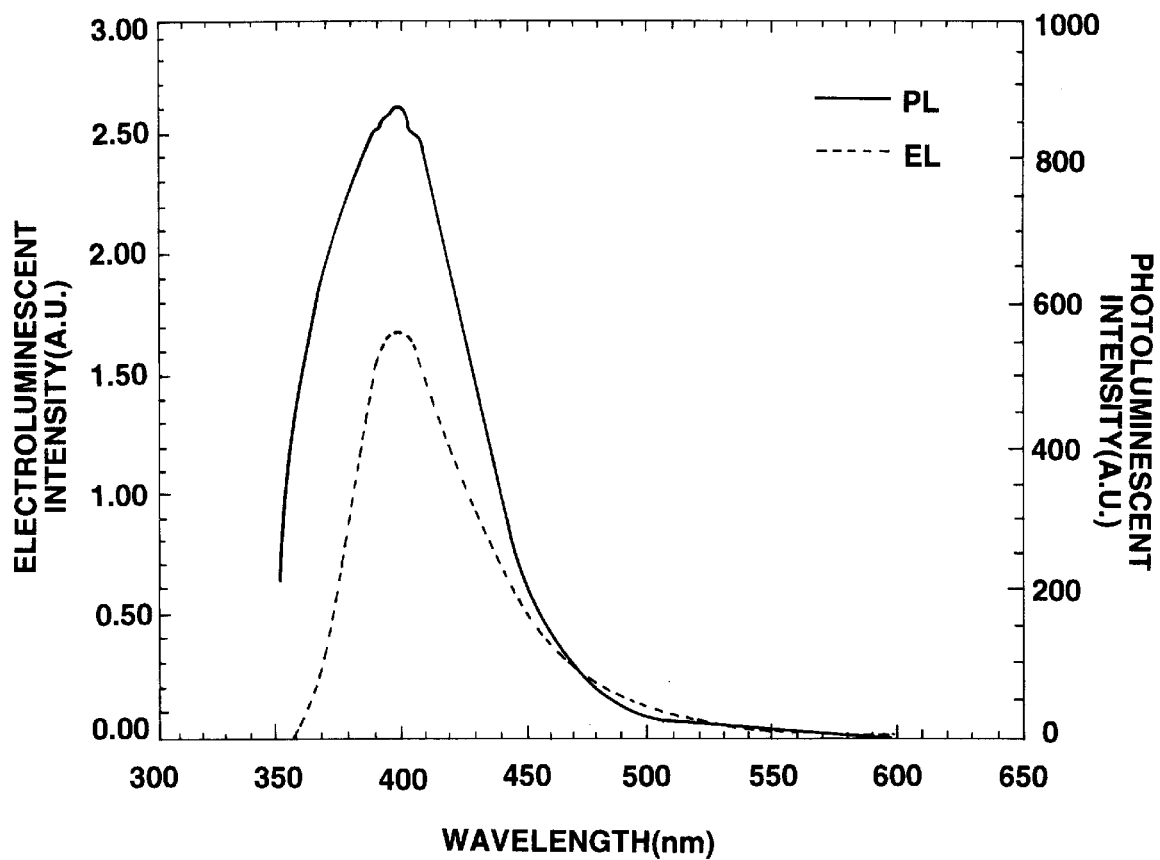
FIG. 6 is a spectrum diagram showing the EL characteristic and PL characteristic of PVCz.

FIG. 6 is a spectrum diagram of the electroluminescence (EL) characteristic and the photoluminescence (PL) characteristic of the single layer of PVCz In the diagram, the broken line shows the luminescent spectrum by voltage application, and the solid line the luminescent spectrum by absorption. PVCz has an EL peak and PL peak near 400 nm.

As apparent from FIGS. 5 and 6, in the case of a single layer of PVCz, PVCz itself emits light having a peak near 400 nm by the recombination of electrons and holes. Coumarin 6 absorbs energy by PVCz and emits light. As shown in FIG. 16, the organic EL device 12 having a two-layer structure according to this embodiment hardly causes light emission with a peak at 400 nm, which is acquired when a voltage is applied to the PVCz layer itself, and only the light emission of the luminescent materials is confirmed. This appears to prove that conversion of the wavelength range of light is executed significantly well.

As described above, when a sufficient amount of outside light is obtained, the outside light is used as display light to display an image, and the organic EL device 12 need not be activated. Even when a sufficient amount of outside light is not available, the organic EL device 12 in this embodiment can be driven on a low voltage. The power consumption of the display apparatus 11 can be made lower than that of the prior art which can prolong the battery drivable time of the display apparatus 11, thus improving the portability of an apparatus in which the display apparatus 11 is used. The light emission in the organic EL device 12 occurs near the interface between the hole-transporting layer 17 and the electron-transporting layer 16. This light should substantially pass the hole-transporting layer and the anode electrode 19 only in the thickness direction, and can thus go out without losing the amount of light. Therefore, the organic EL device 12 can emit a sufficient amount of display light Further, as the EL layer is formed of an organic chemical, a smooth film with a uniform thickness can be formed. The organic EL device 12 thus provides illumination with excellent planar uniform emission. Because the display apparatus 11 is designed to consume less power than the conventional display apparatus when in use both in a bright environment and a dark environment, it is suitable as a battery-driven type. The display apparatus 11 may however be driven by an external power source, which supplies power through a power plug, for example.

Figure 37:
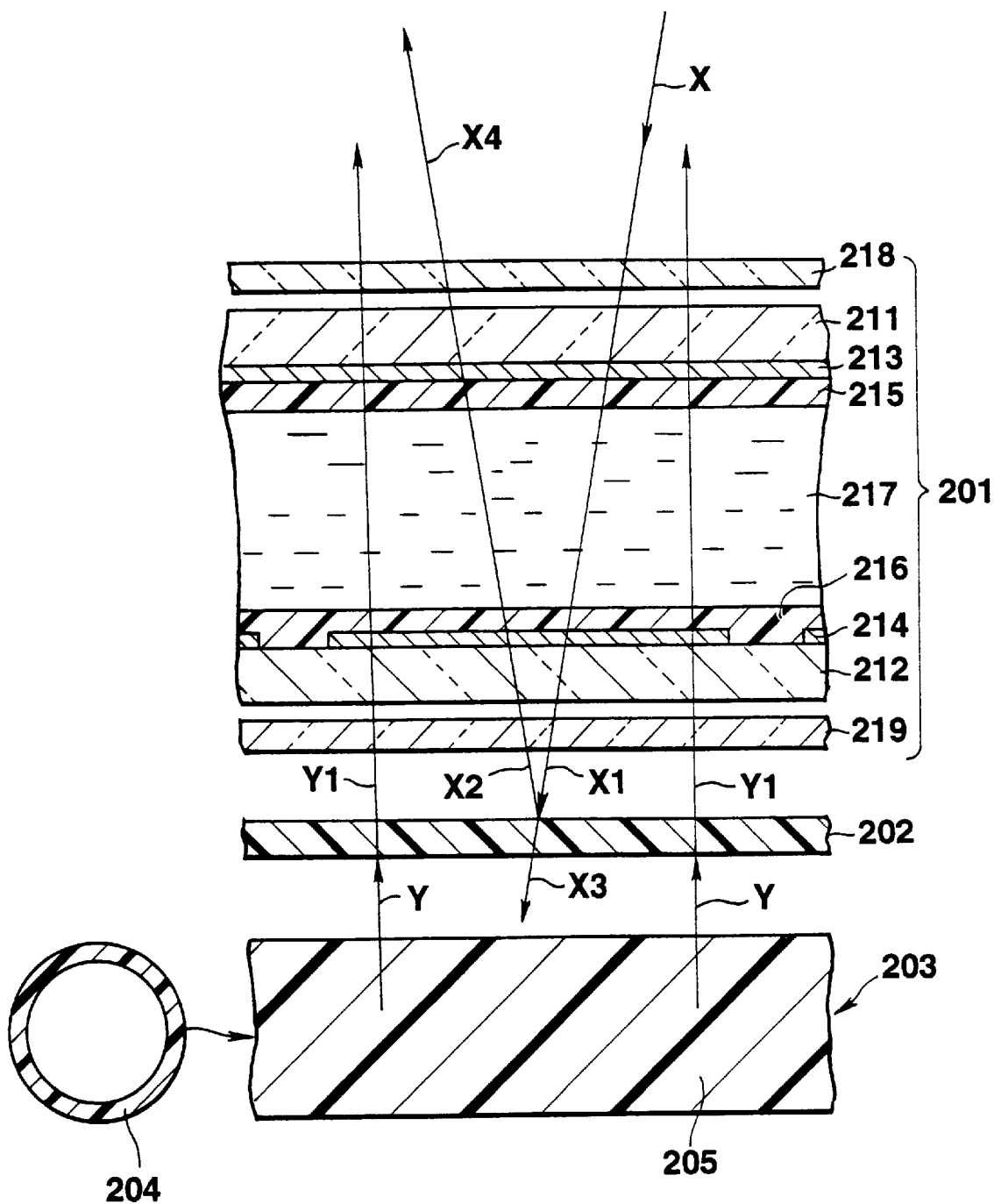
FIG. 37 is a cross-sectional view of a display apparatus using a conventional light guiding plate.
Figure 38:
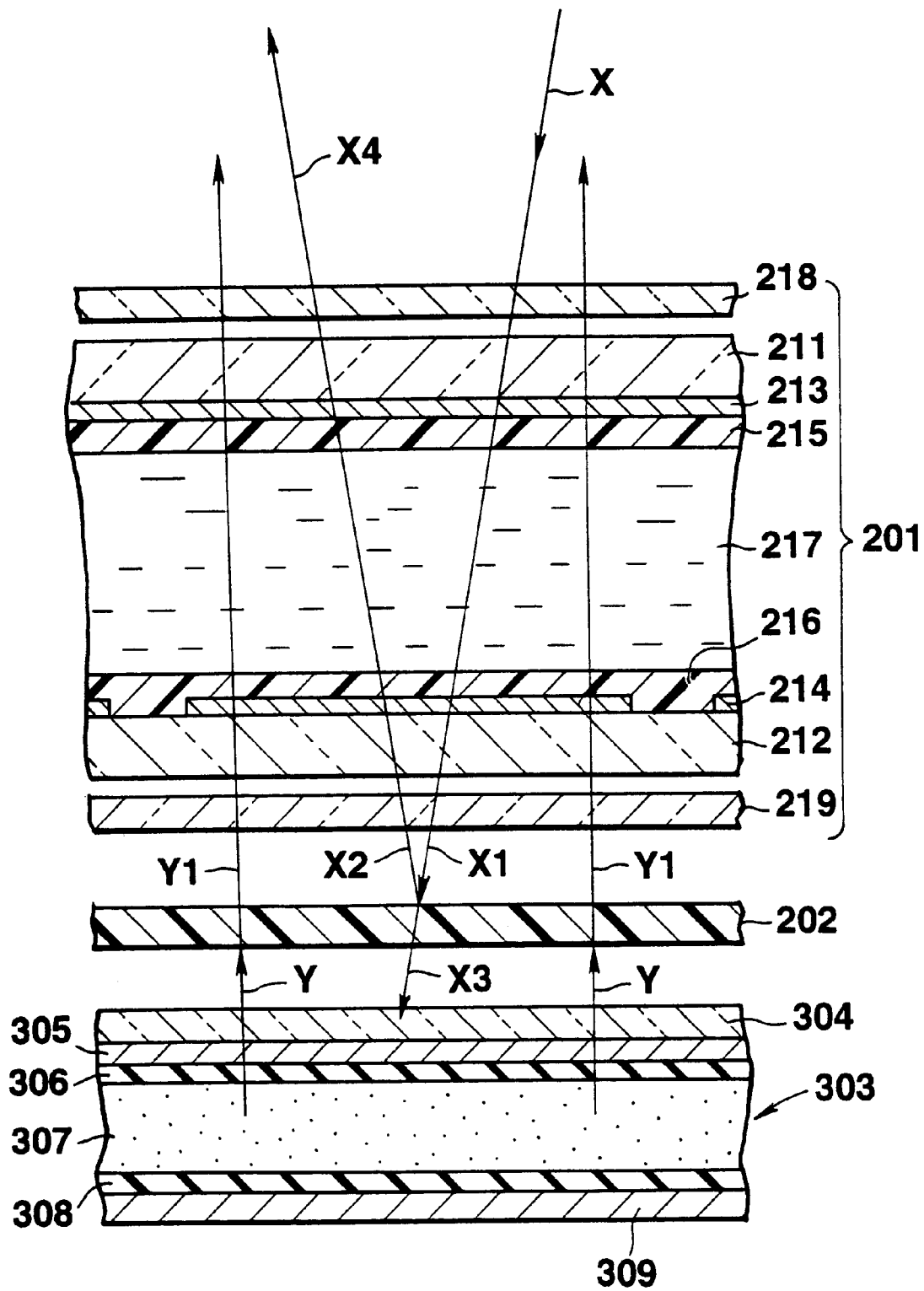
FIG. 38 is a cross-sectional view showing a display apparatus using a conventional inorganic EL layer as a back-light.

The display apparatus 11 of the first embodiment will be further discussed in comparison with a display apparatus whose EL layer is formed of an inorganic EL material. In the first embodiment the luminescent material 18 has a thickness of about 40 nm to 200 nm and can be formed flat by spin coating or vapor deposition. By contrast, an EL layer of an inorganic EL material needs a thickness of several tens of micrometers in order to obtain the proper effective luminance and the uniform luminance in the plane. In this respect, the distance d between the reflected lights y and y1, discussed above referring to FIG. 2, becomes longer in the case of the inorganic EL device than in the first embodiment In the conventional display apparatuses as shown in FIGS. 37 and 38, the light guiding plate and inorganic EL layer are opaque to visible light and do not show a reflection property, so that the semipermeable semireflection film 202 is needed. This results in a poor transmission efficiency and reflection efficiency. The display apparatus 11 according to this embodiment does not need such a semipermeable semi-reflection film and can thus ensure transmission type and reflection type displays with a high transmission efficiency and reflection efficiency.

Further, the organic EL device 12 in the first embodiment has a light emission mechanism such that light is emitted by the recombination of electrons and holes injected in the EL layer. Such an EL layer can be considered as a semiconductor. In the inorganic EL device, by contrast, it is considered that electrons are supplied in the EL layer by the tunnel effect or the like, and are accelerated by a high electric field applied to the EL layer, and then hit on the luminescent center, thereby causing light emission. That is, the mechanism of the inorganic EL device can be considered as dielectric breakdown. In view of the above, the use of an organic EL layer can provide a display with a higher luminance on a low voltage than the use of an inorganic EL layer.

According to this embodiment, colors can be set by both the color filters 27 and the organic EL device 12, thus ensuring the colors to be displayed (hereinafter referred as "display colors") according to the purpose which would be difficult by the color filters 27 alone. According to this embodiment, the reflection surface of the reflection cathode electrode 15 has a smooth mirror structure. If this reflection surface is formed rough to scatter light, however, the angle of visibility for a displayed image can be widened.

The luminescent colors of the organic EL device can be set by adding luminescent materials, which emit lights of arbitrary wavelength ranges, to the organic EL material. According to the display apparatus 11 of this embodiment, therefore, it is possible to set the display colors by the luminescent colors of the organic EL device 12 in addition to setting the display colors by the color filters. This can ensure wider selection of colors.

Figure 3:
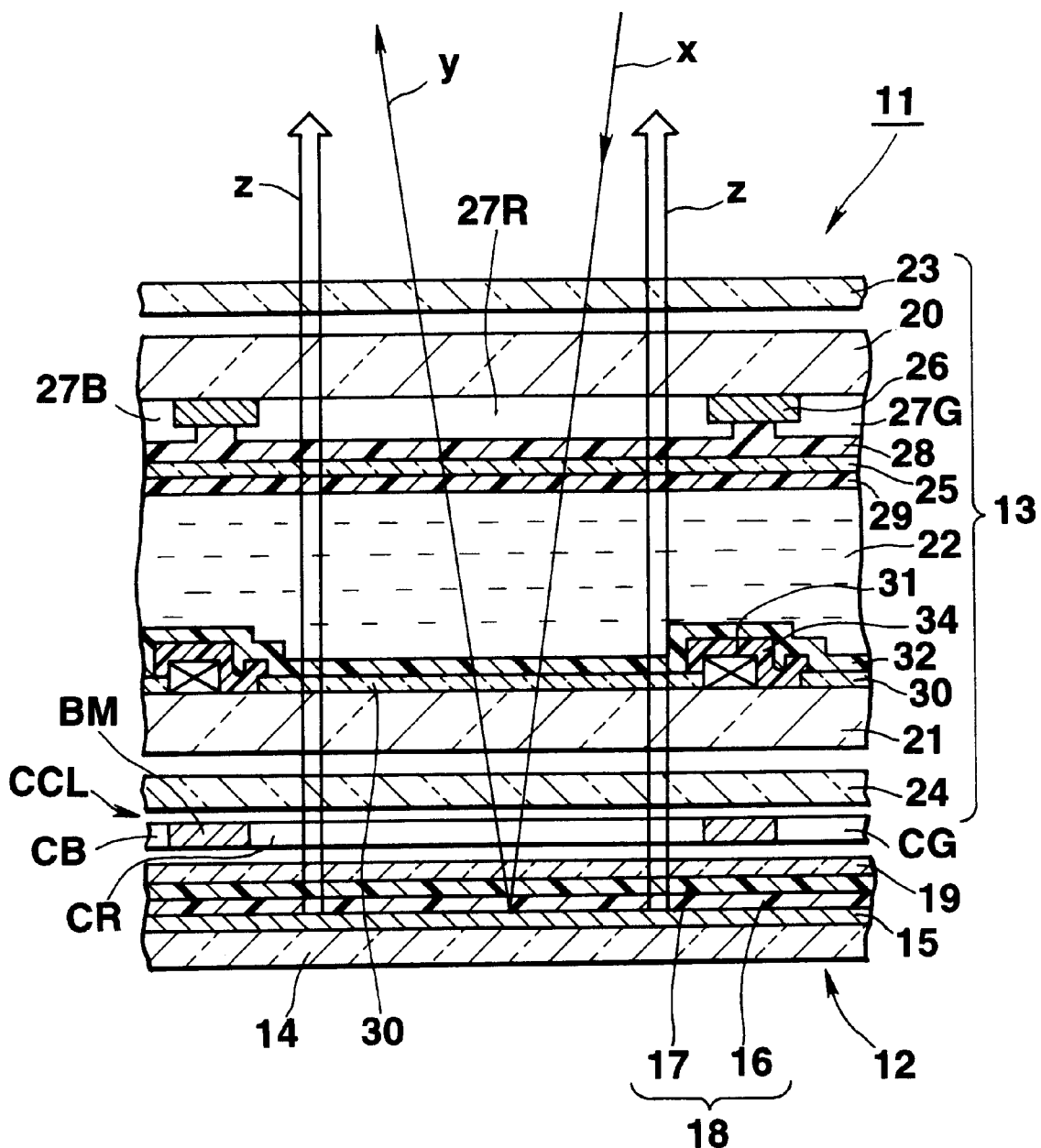
FIG. 3 is a cross-sectional view showing a display apparatus which provides a luminescent color conversion layer.

FIG. 3 shows the display apparatus 11 where a luminescent color conversion layer CCL, which absorbs light emitted from the organic EL layer 18 and emits light of a longer wavelength range than that of the absorbed light, is provided between the LCD panel 13 and the organic EL layer 18.

A luminescent material used for the organic EL layer 18 emits bluish light which includes light of an ultraviolet ray's wavelength range, shorter than the wavelength range of blue light that is the shortest among the wavelength ranges of red, green and blue lights, as a voltage is applied to the electrodes 15 and 19. This can be accomplished by using only PVCz and BND in the hole-transporting layer 17 and no luminescent material mixed therein.

The luminescent color conversion layer CCL is comprised of conversion layers CR, CG and CB, arranged in association with the color filters 27R, 27G and 27B which respectively pass red, green and blue lights, and black masks BM. The conversion layer CR absorbs light including the ultraviolet ray's wavelength range and emits red light. The conversion layer CG absorbs light including the ultraviolet ray's wavelength range and emits green light. The conversion layer CB absorbs light including the ultraviolet ray's wavelength range and emits blue light. The black masks BM are provided between the conversion layers CR, CG and CB, i.e., at positions facing the gate lines and drain lines of the TFTs 31 arranged in a matrix form. In bright environment, the LCD panel 13 allows the incident light x to emit into the luminescent color conversion layer CCL. And then, the luminescent color conversion layer CCL may radiate the conversion light owing to absorption the incident light x in the reflection display mode. Therefore difference of luminance between the reflection display mode and the transmission display mode is small.

The black mask BM can shield visible light and can prevent the reflected light reflected by the reflection cathode electrode 15 or the light emitted by the luminescent material 18 from reaching the associated TFT 31. This can suppress the activation, by those lights, of the semiconductor layer in the TFT 31, e.g., the a—Si layer of TFT 31 which generates carriers inside by received light. The lights, which have been emitted by the organic EL layer 18 or coming from outside of the display device 11 and whose wavelength ranges have been converted by the conversion layers CR, CG and CB, are dispersed by the color filters 27R, 27G and 27B. Therefore, light with a high color purity can go out from the front polarization plate 23.

Second Embodiment

Figure 7:
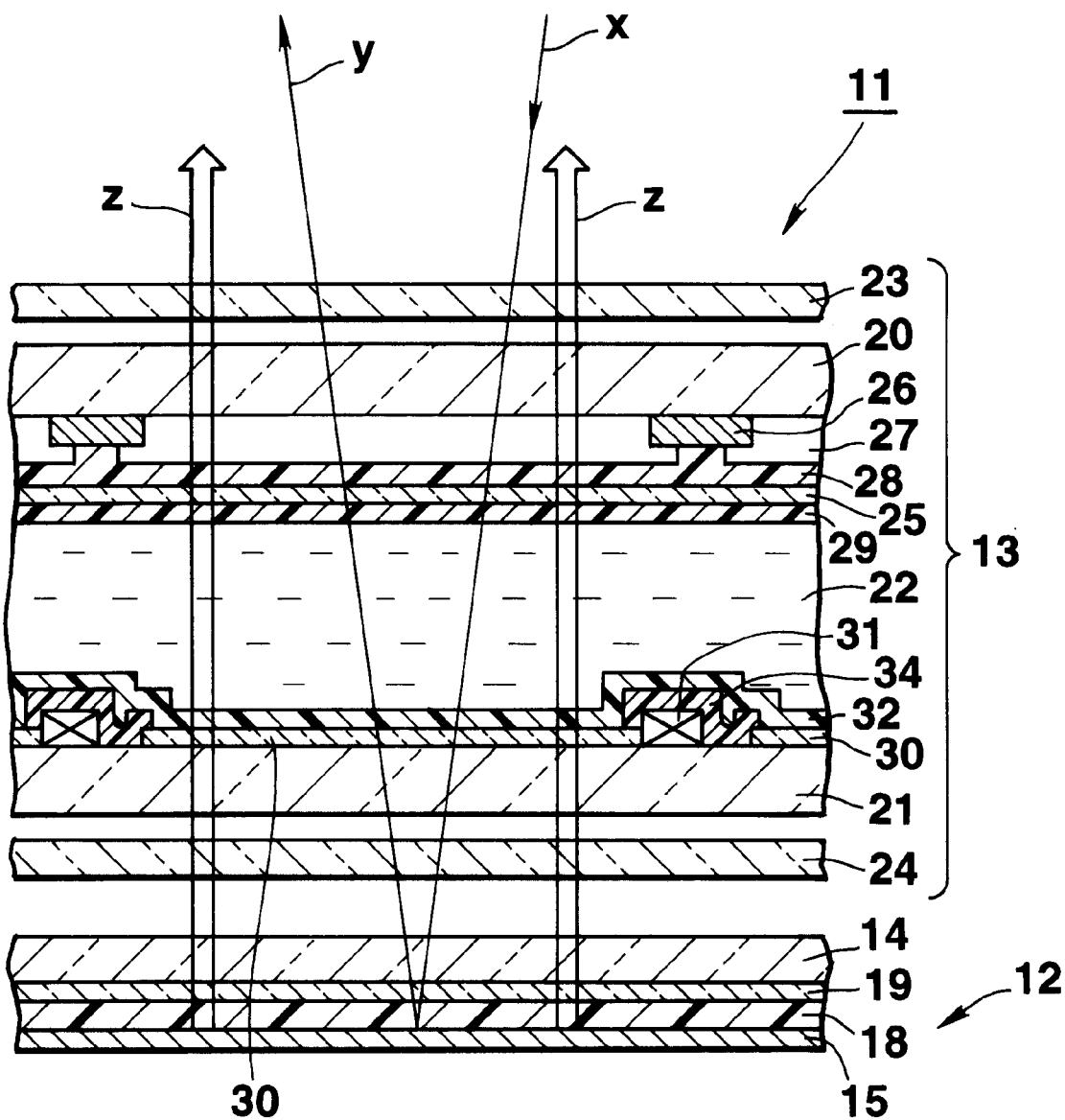
FIG. 7 is a cross-sectional view of a display apparatus according to the second embodiment of this invention.

FIG. 7 is a cross-sectional view of a display apparatus 11 according to the second embodiment of this invention. The structure of the LCD panel 13 in the display apparatus 11 of this embodiment is the same as that of the above-described first embodiment. The organic EL device 12 comprises the substrate 14 of PET, arranged to face the LCD panel 13, and the anode electrode 19, the organic EL layer 18 and the reflection cathode electrode 15, the latter three sequentially formed on (below in the figure) the rear surface of the substrate 14. Note that the materials for the organic EL layer 18 are the same as those of the first embodiment. According to this embodiment, as in the first embodiment, the power consumption of the display apparatus 11 can be reduced, and the organic EL device 12 can accomplish light emission with excellent planar uniformity. Further, the display apparatus 11 of this embodiment, like that of the first embodiment, can suppress the loss of the amount of outside light and can display an image with a good contrast. According to the display apparatus 11 of this embodiment, as the anode electrode 19 is provided on the substrate 14, the reflection cathode electrode 15, which is susceptible to a photoresist etching solution in each step in the fabrication process, can be formed in the last step.

Therefore, the organic EL device 12 has an excellent quality.

Third Embodiment

Figure 8:
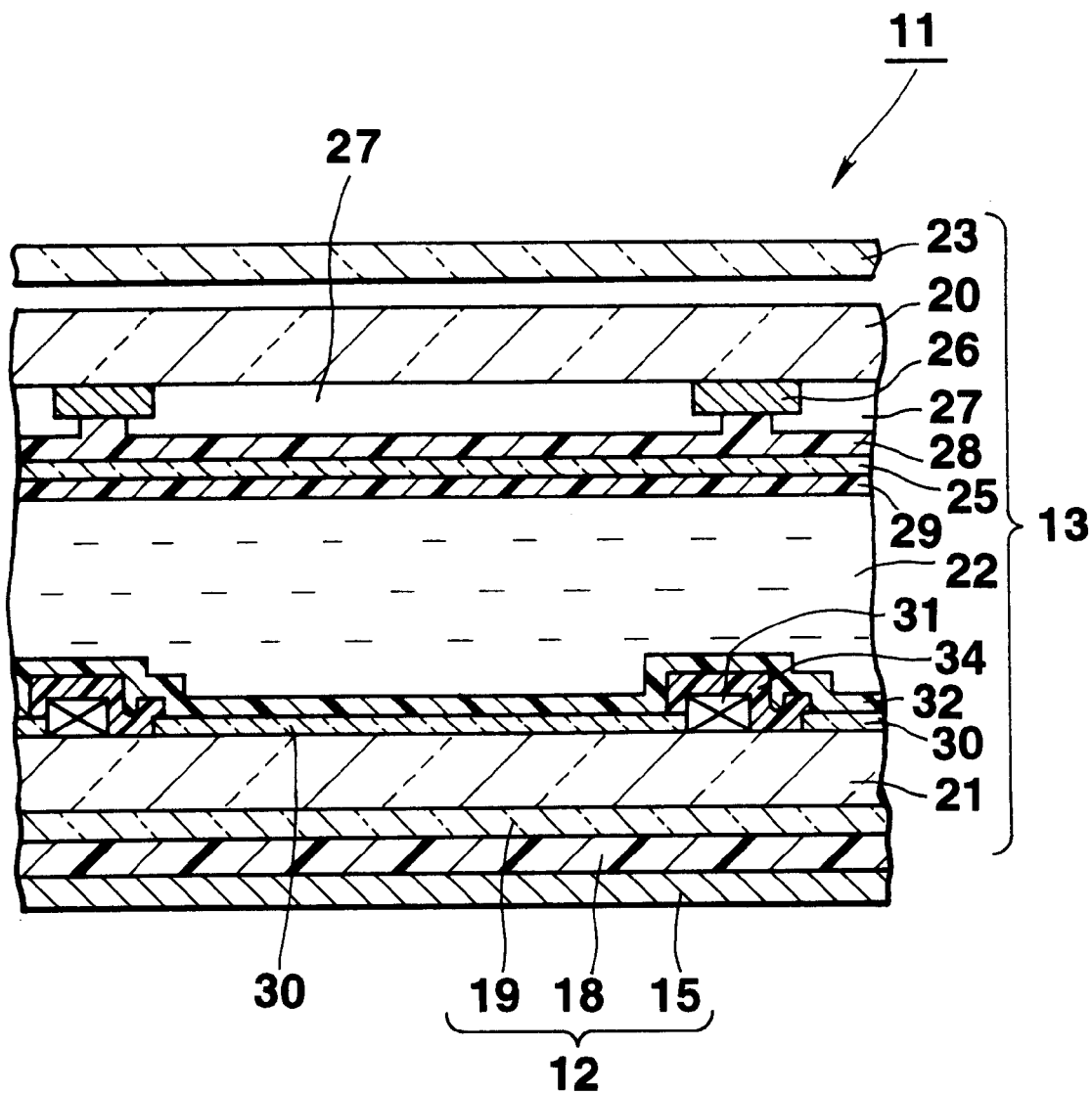
FIG. 8 is a cross-sectional view of a display apparatus according to the third embodiment of this invention.

FIG. 8 is a cross-sectional view of a display apparatus 11 according to the third embodiment of this invention. The structure of the LCD panel 13 in the display apparatus 11 of this embodiment is almost the same as that of the first embodiment but the rear polarization plate 24 is removed. The organic EL device 12 has the anode electrode 19, the organic EL layer 18 and the reflection cathode electrode 15 sequentially formed on the rear surface of the rear transparent substrate 21 of the LCD panel 13. That is, the LCD panel 13 and the organic EL device 12 are constructed integrally. The other structure of this embodiment is the same as that of the second embodiment except that the rear polarization plate 24 and the substrate 14 is removed. With this structure, the display apparatus 11 can have a thinner and more compact structure with the organic EL 12 formed integral with the LCD panel 13. The operation and advantages of this embodiment are the same as those of the second embodiment.

Fourth Embodiment

Figure 9:
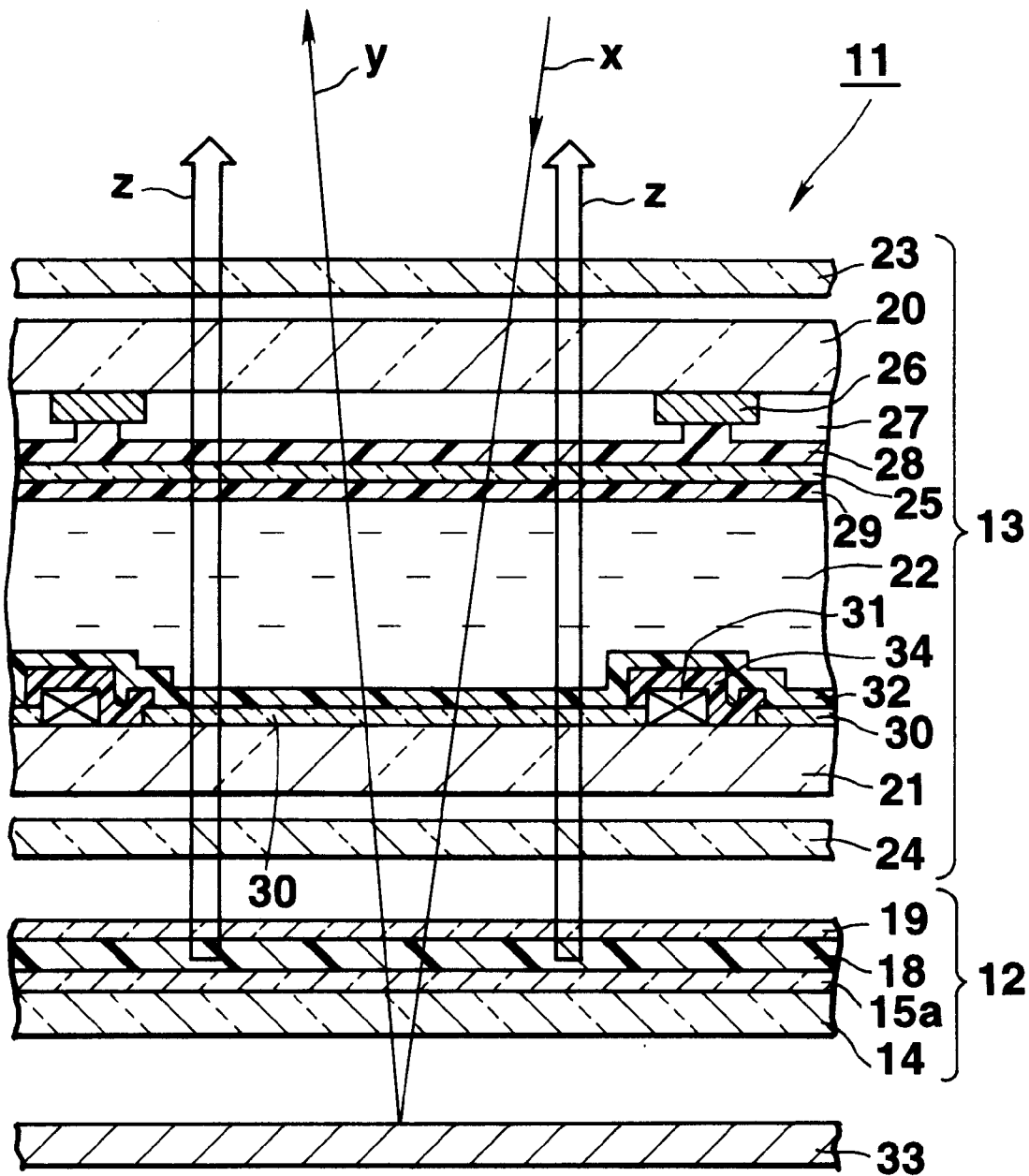
FIG. 9 is a cross-sectional view of a display apparatus according to the fourth embodiment of this invention.

FIG. 9 is a cross-sectional view of a display apparatus 11 according to the fourth embodiment of this invention. The structure of the LCD panel 13 in the display apparatus 11 of this embodiment is the same as that of the first embodiment. The organic EL device 12 is designed such that the reflection cathode electrode 15 in the first embodiment is replaced with a cathode electrode 15a of a transparent electrode material. A diffuse reflection layer 33 is located at the back of (below in the figure) the organic EL device 12. As shown in FIG. 6, incident light x which is the outside light in a bright environment passes the LCD panel 13 and the organic EL device 12, and is reflected by the diffuse reflection layer 33 to become reflected light y. At this time, the reflected light y actually is scattered by the diffuse reflection layer 33 and travels in multiple directions. It is therefore possible to improve the planar uniformity of light which comes to the LCD panel 13 from back. In a dark environment, the organic EL device 12 is activated to emit display light c, so that an image can be displayed according to the alignment of the liquid crystal of the LCD panel 13. The other structure of this embodiment is the same as that of the first embodiment.

Fifth Embodiment

Figure 10:
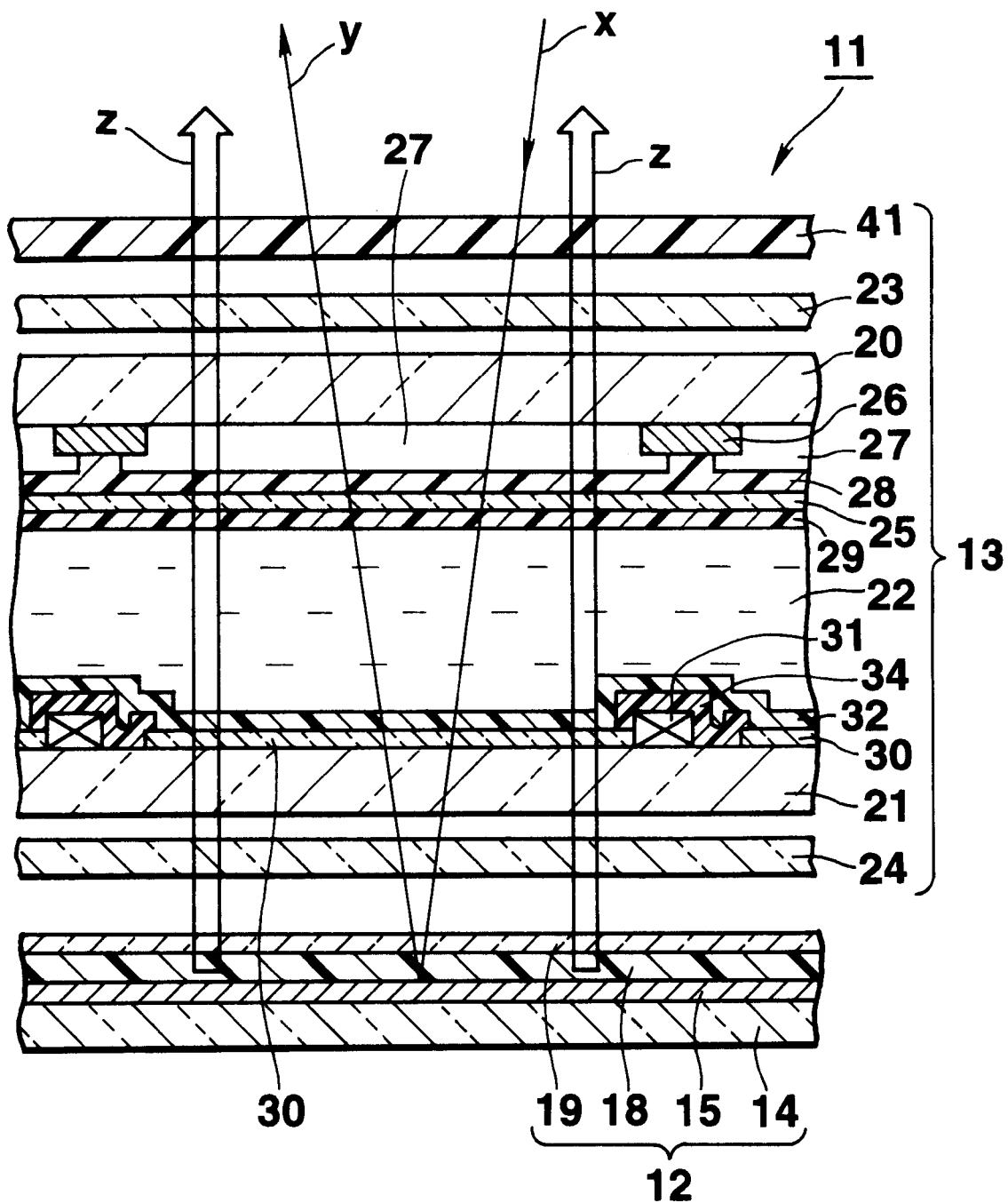
FIG. 10 is a cross-sectional view of a display apparatus according to the fifth embodiment of this invention.

FIG. 10 is a cross-sectional view of a display apparatus 11 according to the fifth embodiment of this invention. This embodiment has the same structure as the first embodiment, except for the provision of a diffusion plate 41 in front of (above in the figure) the front polarization plate 23 of the LCD panel 13. The diffusion plate 41 has a plurality of layers with different refractive indexes stacked one on another, and causes incident light to repeat reflection and transmission at the interfaces of the individual layers, thereby diffusing the progressing direction of the light. According to the thus constituted display apparatus 11, under a bright environment, incident light x comes to the liquid crystal 22 after being diffused once by the diffusion plate 41. Outgoing light y which has been reflected by the reflection cathode electrode 15 passes the front polarization plate 23 and is diffused again by the diffusion plate 41. This double diffusion of light can widen the angle of visibility and ensure display with uniform luminance. Even in a dark environment, as the light emitted by the organic EL device 12 is diffused once, a high-quality image can be displayed.

Sixth Embodiment

Figure 11:
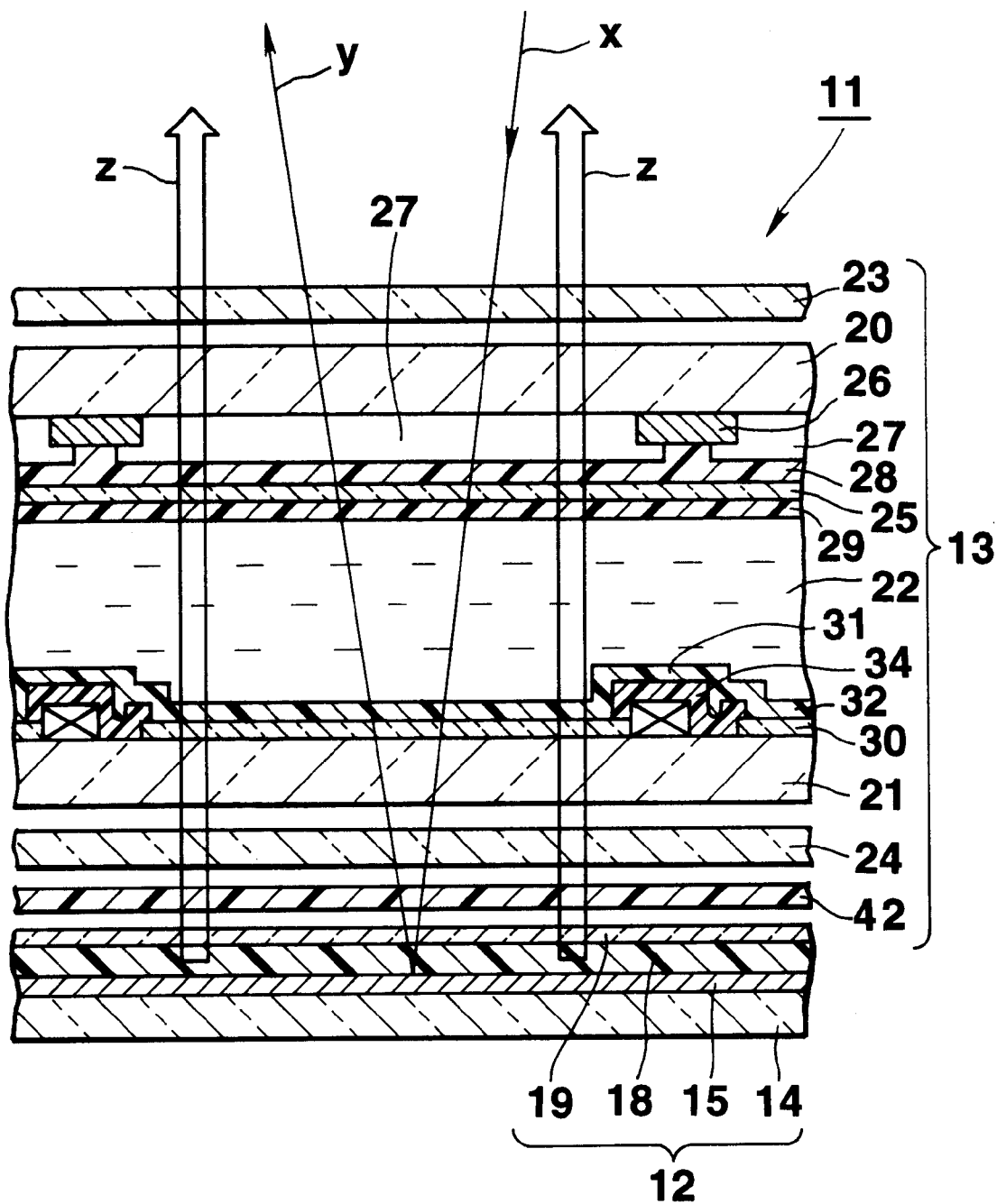
FIG. 11 is a cross-sectional view of a display apparatus according to the sixth embodiment of this invention.

FIG. 11 is a cross-sectional view of a display apparatus 11 according to the sixth embodiment of this invention. The display apparatus 11 of this embodiment has the same structure as that of the first embodiment, except for the provision of a diffusion plate 42 between the LCD panel 13 and the organic EL device 12. The diffusion plate 42 has a plurality of layers with different refractive indexes stacked one on another, and causes incident light to repeat reflection and transmission at the interfaces of the individual layers, thereby diffusing the progressing direction of the light. According to the thus constituted display apparatus 11, in a bright environment, incident light x is diffused by the diffusion plate 42 after passing the liquid crystal 22. Outgoing light y which has been reflected by the reflection cathode electrode 15 is diffused again by the diffusion plate 42. This double light diffusion can widen the angle of visibility and ensure display with uniform luminance. Even in a dark environment, as the light emitted by the organic EL device 12 is diffused once, a high-quality image can be displayed.

Seventh Embodiment

Figure 12:
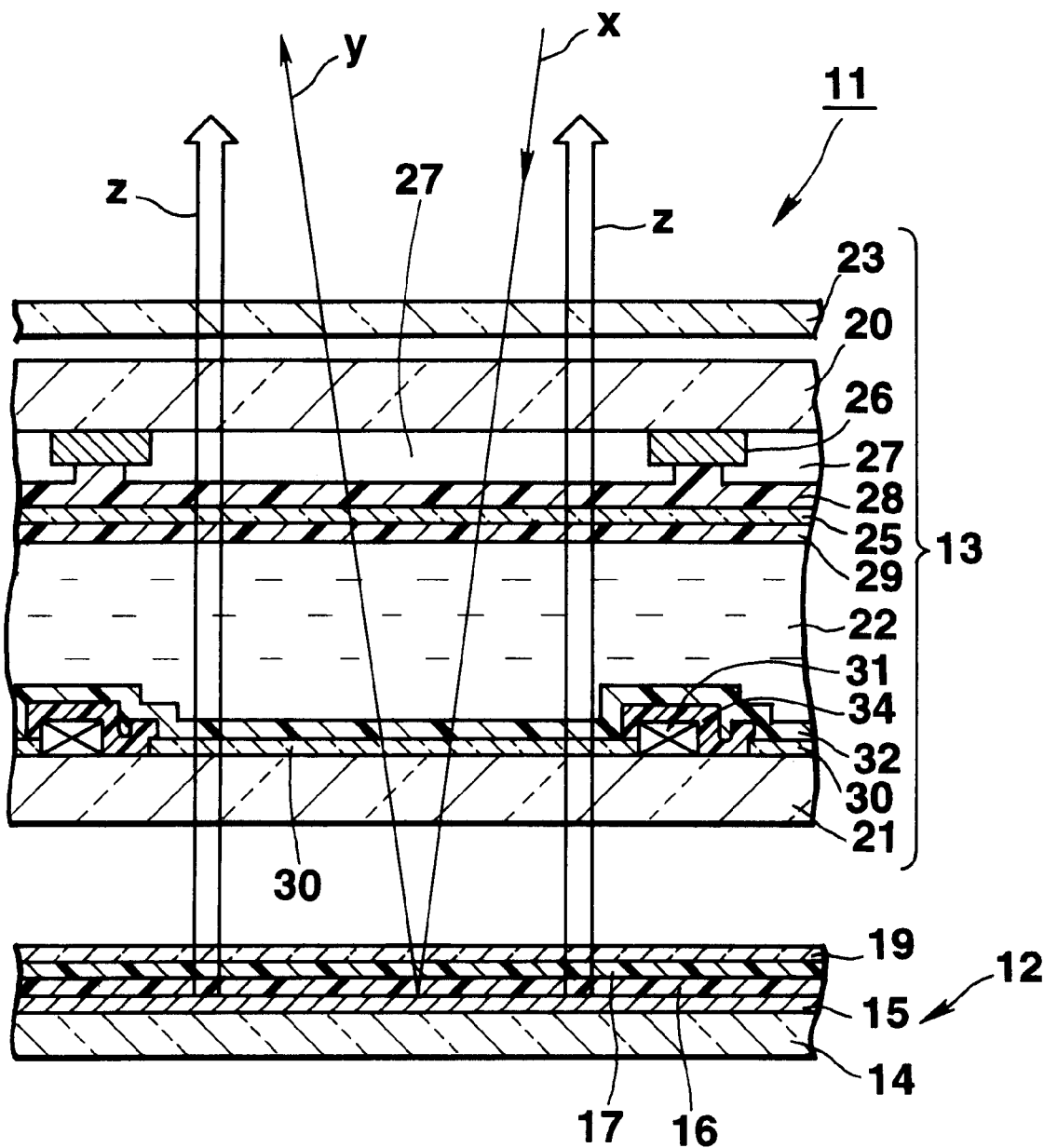
FIG. 12 is a cross-sectional view of a display apparatus according to the seventh embodiment of this invention.

FIG. 12 is a cross-sectional view of a display apparatus 11 according to the seventh embodiment of this invention. The display apparatus 11 of this embodiment has the same structure as that of the first embodiment, except that the rear polarization plate 24 of the LCD panel 13 is eliminated. According to the display apparatus 11 of the first embodiment, in a bright environment, the outside light passes the rear polarization plate 24 twice. The light emitted by the organic EL device 12 of this embodiment in a dark environment passes the rear polarization plate 24 just once. Therefore, the display apparatus 11 of the first embodiment has a relatively large difference in the luminance of an image to be displayed between the case where the apparatus is used as a reflection type in a bright environment and the case where the apparatus is used as a transmission type in a dark environment, and suffers a relatively low contrast of an image when it is used as a reflection type. By contrast, the display apparatus 11 of this embodiment uses a single polarization plate to reduce the difference in the luminance of an image to be displayed between the case where the apparatus is used as a reflection type and the case where it is used as a transmission type, so that the contrast of an image is improved even in the former case of the reflection type.

Eighth Embodiment

Figure 13:
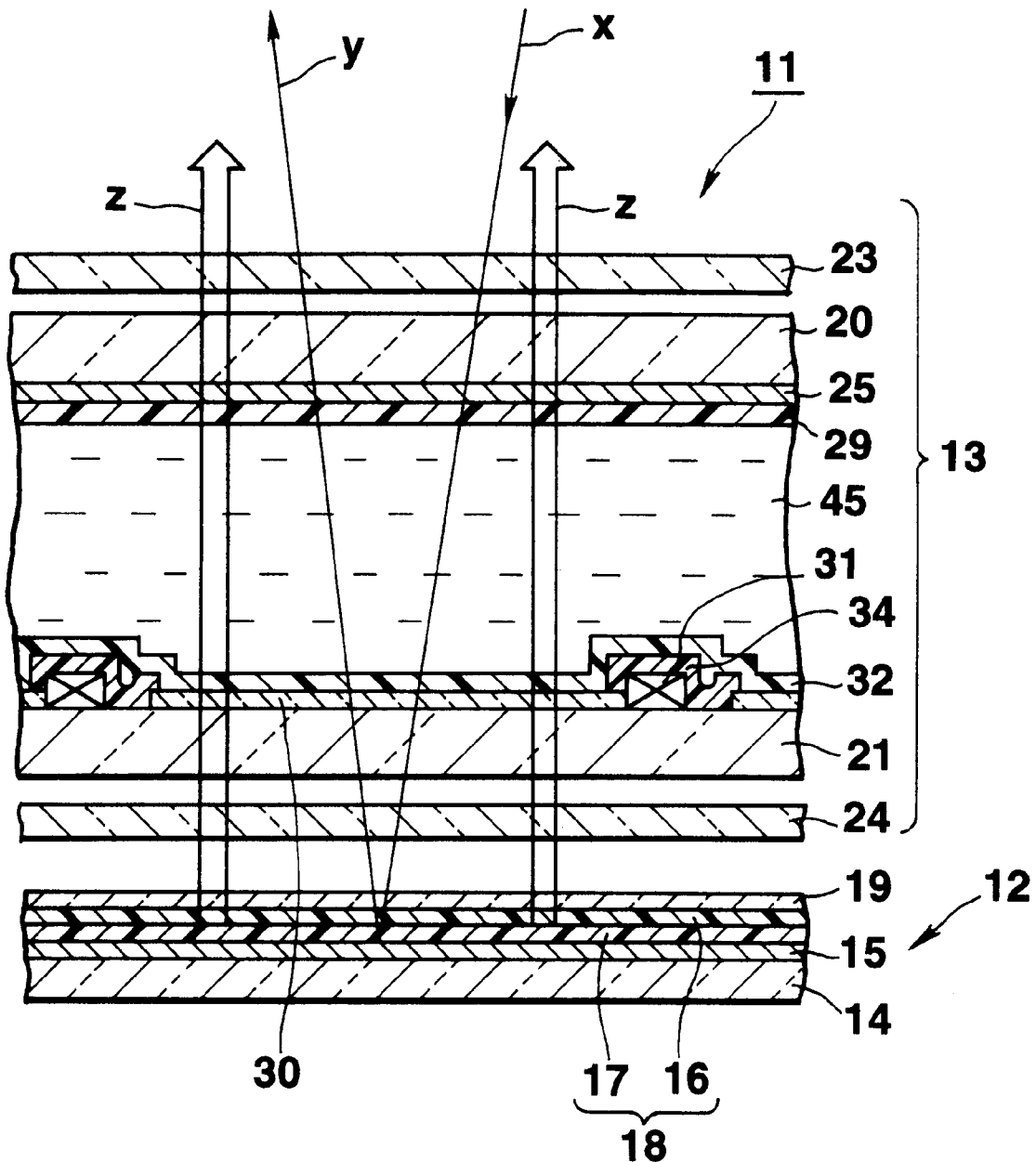
FIG. 13 is a cross-sectional view of a display apparatus according to the eighth embodiment of this invention.

FIG. 13 is a cross-sectional view showing a display apparatus 11 according to the eighth embodiment of this invention. As illustrated, the display apparatus 11 comprises the LCD panel 13 and the organic EL device 12.

The structure of the organic EL device 12 will be discussed below. The reflection cathode electrode 15 of light reflective metal of a low work function (e.g., MgIn) is formed on the substrate 14 of glass. From the viewpoint of the electron discharging property, a material of a low work function is desirable for the reflection cathode electrode 15. It is desirable that the electron affinity (eV) of the material for the reflection cathode electrode 15 is close to or smaller than that of the material for the electron-transporting layer 16. From the viewpoint of the light reflection, a material having a reflection property with respect to visible light (an electromagnetic wave having a wavelength of 400 nm or greater and 800 nm or smaller) is desirable for the reflection cathode electrode 15. Formed on the reflection cathode electrode 15 is the organic EL layer 18 which has a lamination of the electron-transporting layer 16 of Alq3 and the hole-transporting layer 17 consisting of a mixture of PVCz, BND and a luminescent material. The anode electrode 19 is deposited on the organic EL layer 18.

Luminescent materials absorb lights of predetermined wavelength ranges and energy generated in the excitation state, and emit red, green and blue lights. Those luminescent materials are doped in the hole-transporting layer 17. DCM1 is used as the red dopant DCM1 emits orange to red lights having a luminescent peak in the vicinity of 600 nm as shown in FIG. 16. Coumarin 6 is used as the green dopant. As shown in FIG. 16, coumarin 6 emits green light having a peak between 500 nm and 550 nm. Besides coumarin 6, quinacridone may also be used as the green dopant TPB is used as the blue dopant Other blue dopants including 4,4'-bis(2,2'-diphenylvinylene)biphenyl, 4,4'-bis((2-carbazole)vinylene)biphenyl, tetraphenylbutadiene derivative, cyclopentadiene derivative, oxadiazole derivative or the like may be used.

The red dopant, green dopant and blue dopant are mixed with mole ratios of approximately 1/100 to 4/100 with respect to a PVCz unit. The amounts of the red dopant, green dopant and blue dopant to be mixed in the PVCz unit are adjusted in accordance with the spectra of the color filters which will be discussed later.

In the LCD panel 13, an LC cell is comprised of the front transparent substrate 20, the rear transparent substrate 21 and the liquid crystal 22, sandwiched and sealed between the front transparent substrate 20 and rear transparent substrate 21 by a seal member (not shown). This LC cell is sandwiched between the front polarization plate 23 and the rear polarization plate 24. The common electrode 25 of ITO, which has a transparency of over 70% to the visible light, is formed on the opposing inner surface of the front transparent substrate 20 over the entire display area. Formed on the common electrode 25 is the front aligning film 29 of polyimide which has been subjected to an aligning treatment such as rubbing. A plurality of pixel electrodes 30 of ITO and a plurality of TFTs 31 as switching elements are arranged on the opposing inner surface of the rear transparent substrate 21 in accordance with the layout of the pixels. The source electrodes of the TFTs 31 are connected to the pixel electrodes 30, which are laid out in a matrix pattern. The gate electrodes of the TFTs 31 are connected to the gate lines through which select voltages are applied. The drain electrodes of the TFTs 31 are connected to the drain lines through which signal voltages are applied. The interlayer insulator film 34 of silicon nitride is patterned in a non-pixel area which includes those TFTs 31. Formed on the pixel electrodes 30 and the interlayer insulator film 34 is the rear aligning film 32 of polyimide which has undergone an aligning treatment such as rubbing.

A liquid crystal 45 initially aligned in a predetermined direction is intervened between the front aligning film 29 and the rear aligning film 32. The aligning directions of the molecules of the liquid crystal 45 on the aligning films 29 and 32 are restricted in accordance with the aligning treatments of the aligning films 29 and 32. The molecules of the liquid crystal 45 are twisted by a twist angle of 75°±10° from one substrate to the other, while being inclined by a slight pretilt angle with respect to the surfaces of the aligning films 29 and 32.

The value of Δnd, which is the product of the refractive anisotropy Δn and the thickness d of the LC layer, the directions of the transmission axes of the polarization plates 23 and 24 are set in such a way that the color of outgoing light when the incident light is white light changes at least to red, green, blue, black and white in accordance with the voltage to be applied between the electrodes 30 and 25.

Figure 14A:
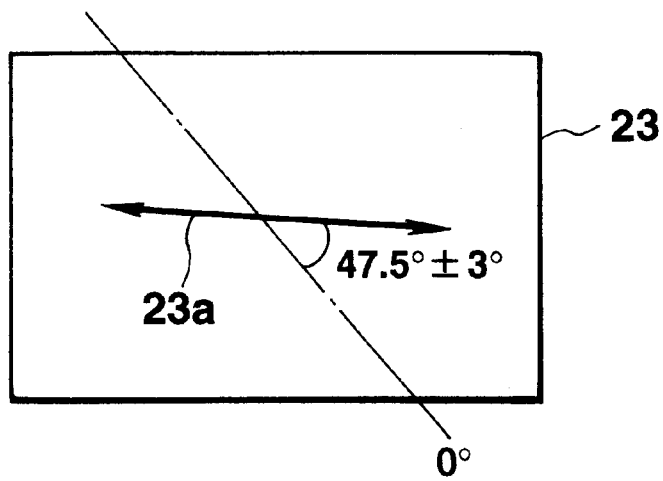
FIG. 14A through 14C are diagrams of the alignment state of LC molecules and the directions of transmission axes of polarization plates in the eighth embodiment as viewed from the display side.
Figure 14B:
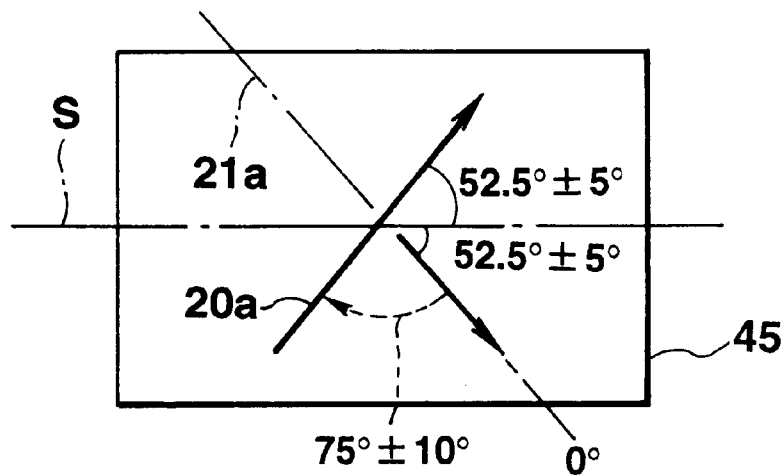
Figure 14C:
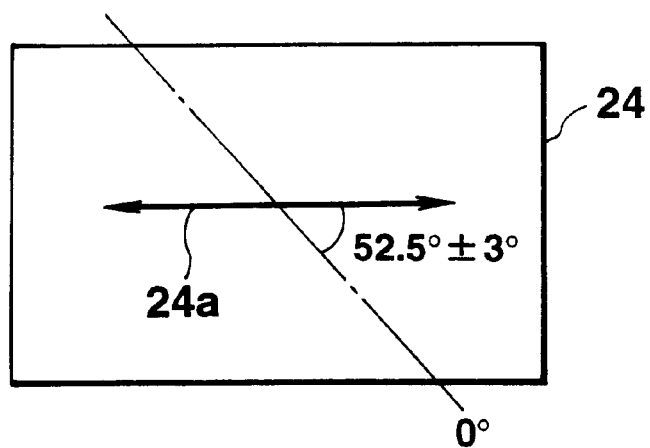

FIGS. 14A through 14C are diagrams of the alignment state of the molecules of the liquid crystal 45 of the LCD panel 13 and the directions of the transmission axes of the polarization plates 23 and 24 as viewed from the side of the display apparatus 11 from which the light outgoes (hereinafter referred as "display side"). The value of Δnd of the LCD panel 13 is set to 800 nm to 1100 nm. The polarization plates 23 and 24 are arranged in such a way that their transmission axes 23a and 24a have the following directions.

As shown in FIG. 14B, the aligning direction 21a of the molecules of the liquid crystal 45 (the aligning direction of the aligning film 32) in the vicinity of one substrate of the LCD panel 13, e.g., the substrate 21, is set in the direction of 52.5°±5° clockwise with respect to the horizontal axis S of the LCD panel 13. The aligning direction 20a of the molecules of the liquid crystal 45 (the rubbing direction of the aligning film 29) in the vicinity of the other substrate 20 is set in the direction of 52.5°±5° counterclockwise with respect to the horizontal axis S. The molecules of the liquid crystal 45 are twisted by a twist angle of 75°±10° clockwise toward the substrate 20 from the substrate 21, as indicted by the broken-line arrow.

Given that the aligning direction 21a of the molecules of the liquid crystal 45 in the proximity of the substrate 21 of the LCD panel 13 is set in the direction of 0°, as shown in FIG. 14C, the transmission axis 24a of the polarization plate 24 which faces the substrate 21 of the LCD panel 13 lies in the direction of 52.5°±3° in the opposite direction to the twist direction of the molecules of the liquid crystal 45. As shown in FIG. 14A, the transmission axis 23a of the polarization plate 23 which faces the substrate 20 of the LCD panel 13 lies in the direction of 47.5°±3° in the opposite direction to the twist direction.

The display apparatus 11 according to this embodiment acquires colored light by using the birefringence effect of the layer of the liquid crystal 45 of the LCD panel 13 and the polarization effects of the pair of polarization plates 23 and 24.

A description will now be given of the operations in the case where this display apparatus 11 is used as a reflection type LCD apparatus in a bright environment and in the case where it is used as a transmission type LCD apparatus in a dark environment.

In a bright environment where a sufficient amount of outside light is obtained, this display apparatus 11 is used under the condition that the organic EL device 12 is disabled to cause its organic EL layer 18 not to emit light. As the outside light incident to the polarization plate 23 passes the polarization plate 23, it becomes linearly polarized light whose polarization direction is in the direction of the transmission axis 23a. As this linearly polarized light passes the layer of the liquid crystal 45 of the LC cell, it is influenced by the birefringence effect of the layer of the liquid crystal 45 to become elliptically polarized lights whose polarization states differ wavelength by wavelength, and go out from the transparent substrate 21. Those elliptically polarized lights go to the polarization plate 24. Of those elliptically polarized lights, the polarized light component directed toward the transmission axis 24a of the polarization plate 24 passes the polarization plate 24. The light outgoing from the polarization plate 24, whose intensity varies wavelength by wavelength, becomes colored light according to the intensity of the light of each wavelength. This colored light reaches the reflection cathode electrode 15 via the anode electrode 19 and the organic EL layer 18, and is reflected by the reflection cathode electrode 15. The colored light reflected by the reflection cathode electrode 15 travels along the opposite path to the aforementioned path and goes out from the polarization plate 23. At this time, the light reflected by the reflection cathode electrode 15 is influenced by the reverse birefringence effect of the layer of the liquid crystal 45 to the one that affects the light at the time of light incidence, and becomes linearly polarized light whose polarization direction substantially matches with the direction of the transmission axis 23a. Therefore, the light outgoing from the polarization plate 23 becomes colored light which is substantially the same as the light that has been reflected by the reflection cathode electrode 15.

In a dark environment where a sufficient amount of outside light is not available, this display apparatus 11 is used under the condition that the organic EL device 12 is activated to cause its organic EL layer 18 to emit light. The light emitted by the organic EL layer 18 reaches the polarization plate 24. As this light passes the polarization plate 24, it becomes linearly polarized light whose polarization direction is in the direction of the transmission axis 24a. As this linearly polarized light passes the layer of the liquid crystal 45 of the LC cell, it is influenced by the birefringence effect of the layer of the liquid crystal 45 to become elliptically polarized lights whose polarization states differ wavelength by wavelength, and go out from the transparent substrate 21. Those elliptically polarized lights go to the polarization plate 23. Of those elliptically polarized lights, the polarized light component directed toward the transmission axis 23a of the polarization plate 23 passes the polarization plate 23. The light outgoing from the polarization plate 24, whose intensity varies wavelength by wavelength, becomes colored light according to the intensity of the light of each wavelength.

The alignment state of the molecules of the liquid crystal 45 changes in accordance with the voltage applied between the electrodes 25 and 30. Accordingly, the birefringence effect by the layer of the liquid crystal 45 varies and the polarization state of the light incident to the polarization plate 24 (23) changes. The intensity of the light passing the polarization plate 24 (23) varies wavelength by wavelength, and the color of the light passing the polarization plate 24 (23) changes. That is, when a voltage is applied between the electrodes 25 and 30, the molecules of the liquid crystal 45 are aligned upward, and as the rising angle increases, the birefringence effect of the layer of the liquid crystal 45 becomes smaller. By controlling the voltage applied between the electrodes 25 and 30 to alter the birefringence effect of the layer of the liquid crystal 45, the color of light outgoing from the LCD panel 13 or the display colors can be changed. This alteration of display colors can be controlled almost in the same way in a dark environment as well as in a bright environment.

The colors that can be displayed by a single pixel of this display apparatus 11 include all the three primary colors of red, green and blue, black which is colorless dark display and white which is colorless bright display.

Figure 15:
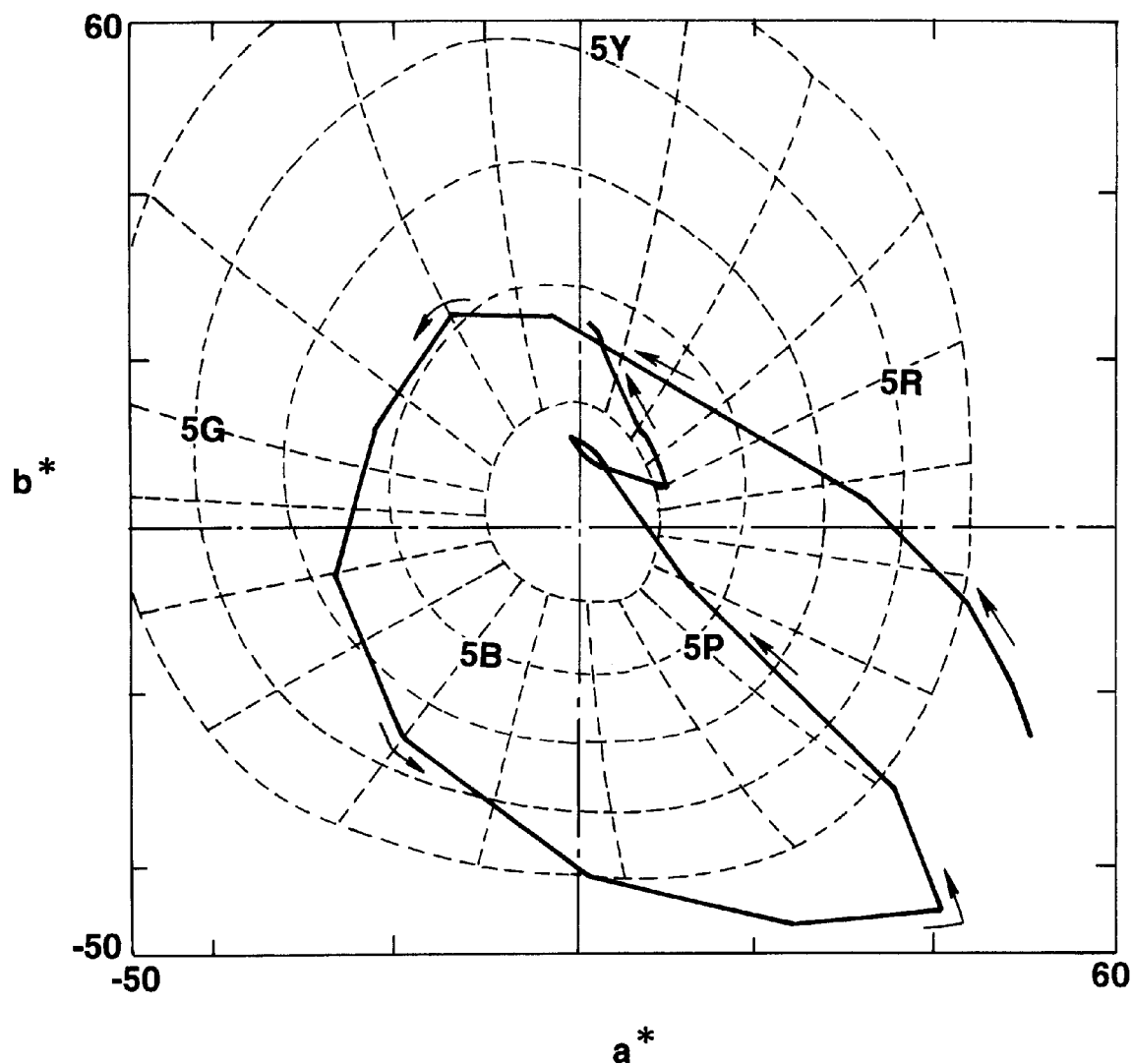
FIG. 15 is a*-b* chromaticity diagram showing a change in the display color of the display apparatus according to the eighth embodiment.

FIG. 15 is an a*-b* of chromaticity diagram showing a change in the display color of this display apparatus 11.

As shown in FIG. 15, the display color of this display apparatus 11 in the initial state where no voltage is applied between the electrodes 25 and 30 of the LCD panel 13 is close to purple (P), and as the voltage to be applied between the electrodes 25 and 30 increases, the display colors changes in the direction of the arrow or in the order of red (R), to green (G), to blue (B), to black and to white. Those red, green, blue, black and white display colors are all clear colors with high color purities.

With this display apparatus 11 used as a transmission type, given that the ratio of the outgoing light to the incident light (hereinafter referred as "outgoing ratio") in displaying black is R(min), and the outgoing ratio in displaying white is R(5V) when the applied voltage is 5 V, and is R(7V) when the applied voltage is 7 V, then R(min)=2.78%

R(5V)=22.85%

R(7V)=29.55%

With this display apparatus 11 used as a reflection type, given that CR(5V) is the contrast when the applied voltage for displaying white is 5 V, and CR(7V) is the contrast when the applied voltage for displaying white is 7 V, then

CR(5V)=8.22

CR(7V)=10.63

Apparently, a sufficiently high contrast is obtained when the applied voltage for displaying white is set to 5 V as well as when the applied voltage for displaying white is set to 7 V.

When this display apparatus 11 is used as a transmission type, the ratio of the outgoing light to the light emitted by the organic EL device 12 (hereinafter referred as "outgoing ratio") in displaying black and the outgoing ratio in displaying white become approximately double those in the case where the display apparatus 11 is used as a reflection type. When this display apparatus 11 is used as a transmission type, therefore, a sufficiently high contrast can be obtained as in the case where it is used as a reflection type.

The aforementioned display colors and contrast are acquired when the twist angle of the molecules of the liquid crystal 45, the value of Δnd and the directions 23a and 24a of the transmission axes of the polarization plates 23 and 24 lie within the aforementioned conditional ranges. If those conditions come off the ranges, as the degree of the deviation increases, the display quality of the display apparatus 11 becomes degraded in the order of contrast and display colors.

Therefore, this display apparatus 11 can color light without using color filters and can display a plurality of colors on a same pixel. This display apparatus 11 can improve the contrast and can display white and black, which are the display basic colors, and the three primary colors of red, green and blue. This display apparatus 11 can thus accomplish clear and colorful multicolor display.

Figure 39:
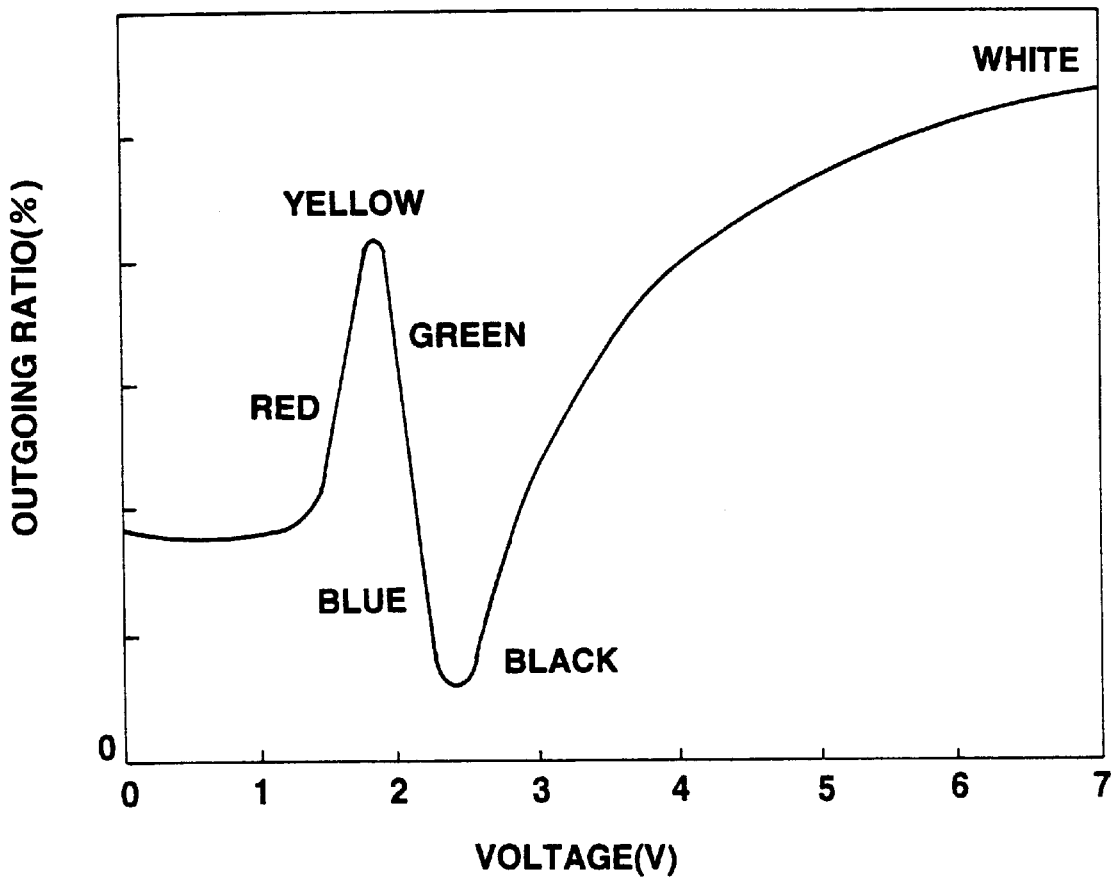
FIG. 39 is a graph showing the relationship among the ratio (outgoing ratio) of outgoing light to light incident to a conventional ECB LCD apparatus, the applied voltage and the colors of the outgoing light

The outgoing ratio of the conventional ECB LCD apparatus when used in a transmission type differs display color by display color, as shown in FIG. 39. Particularly, blue has a lower luminance than the other colors and has a difficulty in visibility. The organic EL device 12 can emit white light by using DCM1 as the red dopant, coumarin 6 as the green dopant and TPB as the blue dopant. By changing the mixing ratio of the dopants, the luminance of blue can be increased relatively to ensure an excellent luminance balance with respect to the individual colors. As the luminescent materials in the organic EL device 12, which emit individual colors, can be set arbitrarily, the display colors and their luminances can be controlled in accordance with the purpose.

Ninth Embodiment

Figure 17:
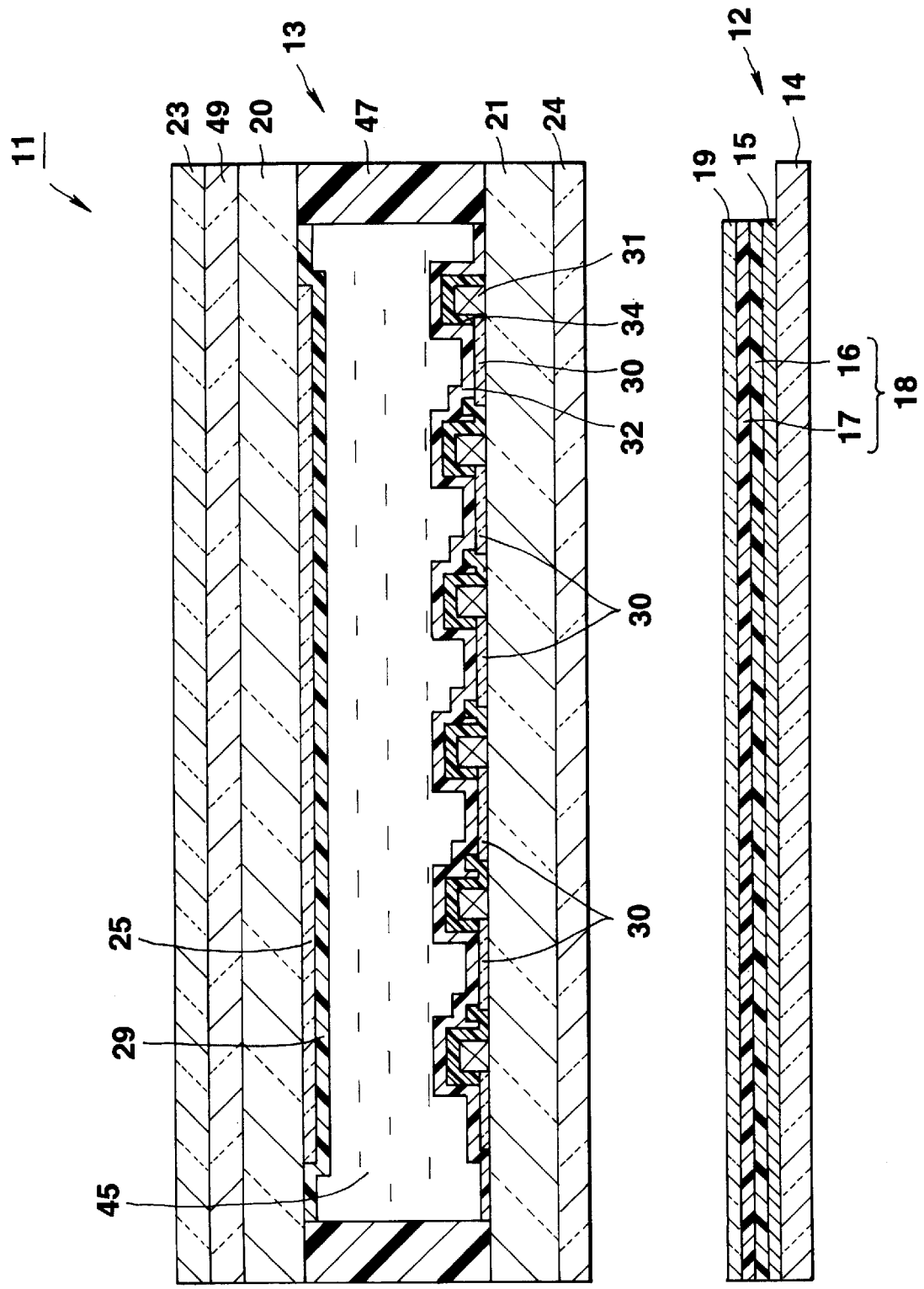
FIG. 17 is a cross-sectional view of a display apparatus according to the ninth embodiment of this invention.

FIG. 17 is a cross-sectional view showing a display apparatus 11 according to the ninth embodiment of this embodiment. As illustrated, the display apparatus comprises the LCD panel 13 and the organic EL device 12.

The structure of the organic EL device 12 is the same as that of the eighth embodiment.

In the LCD panel 13, an LC cell is comprised of a front transparent substrate 20, the rear transparent substrate 21 and the liquid crystal 22, sandwiched and sealed between the front transparent substrate 20 and rear transparent substrate 21 by a seal member (not shown). A retardation plate 49 is provided in front of the LC cell (on the side of the front transparent substrate 20: above in the figure). The front polarization plate 23 is located outside the retardation plate 49. The rear polarization plate 24 is located outside the rear transparent substrate 21. The common electrode 25 of ITO, which has a transparency of over 70% to the visible light, is formed on the opposing inner surface of the front transparent substrate 20 over the entire display area. Formed on the common electrode 25 is the front aligning film 29 of polyimide which has been subjected to an aligning treatment such as rubbing. A plurality of pixel electrodes 30 of ITO and a plurality of TFTs 31 as switching elements are arranged on the opposing inner surface of the rear transparent substrate 21 in accordance with the layout of the pixels. The source electrodes of the TFTs 31 are connected to the pixel electrodes 30, which are laid out in a matrix pattern. The gate electrodes of the TFTs 31 are connected to the gate lines through which select voltages are applied. The drain electrodes of the TFTs 31 are connected to the drain lines through which signal voltages are applied. The interlayer insulator film 34 of silicon nitride is patterned in a non-pixel area which includes those TFTs 31. Formed on the pixel electrodes 30 and the interlayer insulator film 34 is the rear aligning film 32 of polyimide which has undergone an aligning treatment such as rubbing.

The liquid crystal 45 initially aligned in a predetermined direction is intervened between the front aligning film 29 and the rear aligning film 32.

The value of Δnd of the liquid crystal 45, sealed in the LCD panel 13, the retardation value of the retardation plate 49, the directions of the transmission axes of the polarization plates 23 and 24 and the direction of the phase delay axis of the retardation plate 49 are set in such a way that the color of outgoing light when the incident light is white light changes at least to red, green, blue, black and white in accordance with the voltage to be applied between the electrodes 30 and 25.

FIGS. 18A through 18D are diagrams of the alignment state of the sealed LC molecules, the directions of the transmission axes of the polarization plates 23 and 24 and the direction of the phase delay axis of the retardation plate 49 as viewed from the display side. According to this embodiment, the twist angle of the molecules of the liquid crystal 45 is set to $75°±3°$, and the value of Δnd is set to 800 nm to 1100 nm.

The retardation plate 49 in use has a retardation value of 60 nm±20 nm. The polarization plates 23 and 24 are arranged in such a way that their transmission axes 23a and 24a have the following directions. The retardation plate 49 is so arranged that its phase delay axis has the following direction.

Figure 18A:
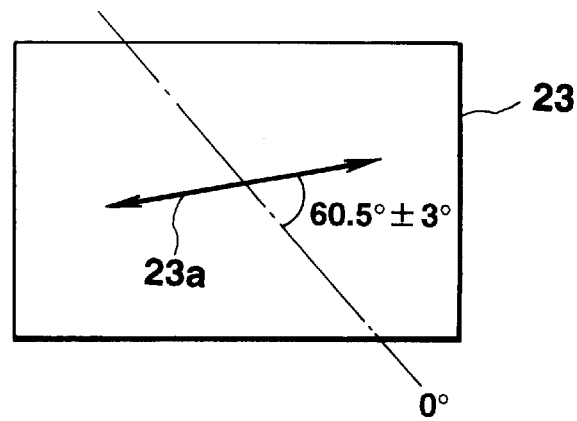
FIG. 18A through 18D are diagrams of the alignment state of LC molecules, the directions of transmission axes of polarization plates and the direction of a phase delay axis of a retardation plate in the ninth embodiment as viewed from the display side.
Figure 18B:
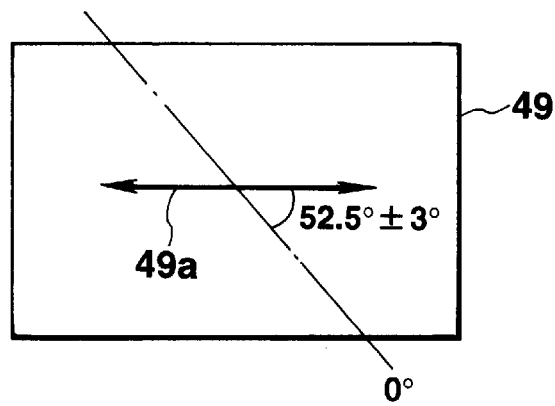
Figure 18C:
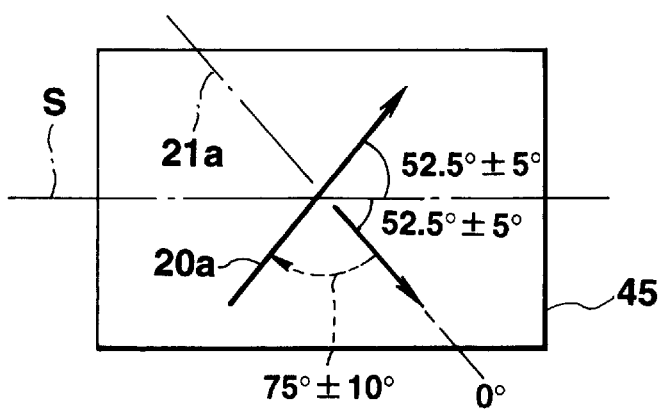

As shown in FIG. 18C, the aligning direction 21a of the molecules of the liquid crystal 45 in the vicinity of one substrate, e.g., the substrate 21, is set in the direction of $52.50°±5°$ clockwise with respect to the horizontal axis S of the LCD panel 13. The aligning direction 20a of the molecules of the liquid crystal 45 in the proximity of the other substrate 20 is set in the direction of $52.5°±5°$ counterclockwise with respect to the horizontal axis S. The molecules of the liquid crystal 45 are twisted by a twist angle of $75°±10°$ clockwise toward the substrate 20 from the substrate 21, as indicted by the broken-line arrow.

Figure 18D:
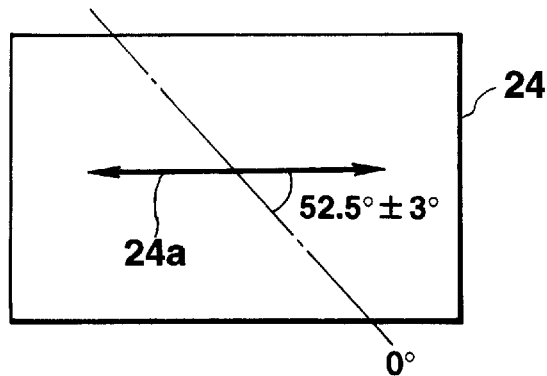

Given that the aligning direction 21a of the molecules of the liquid crystal 45 in the proximity of the substrate 21 is set in the direction of $0°$, as shown in FIG. 18D, the transmission axis 24a of the polarization plate 24 lies in the direction of $52.5°±3°$ in the opposite direction to the twist direction of the molecules of the liquid crystal 45. As shown in FIG. 18A, the transmission axis 23a of the polarization plate 23 lies in the direction of $60.5°±3°$ in the opposite direction to the twist direction. As shown in FIG. 18B, the phase delay axis 49a of the retardation plate 49 lies in the direction of $52.50°±3°$ in the opposite direction to the twist direction.

The display apparatus 11 according to this embodiment acquires colored light by using the birefringence effect of the layer of the liquid crystal 45 of the LCD panel 13, the birefringence effect of the retardation plate 49 and the polarization effects of the pair of polarization plates 23 and 24.

A description will now be given of the operations in the case where this display apparatus 11 is used as a reflection type LCD apparatus in a bright environment and in the case where it is used as a transmission type LCD apparatus in a dark environment.

In a bright environment where a sufficient amount of outside light is obtained, this display apparatus 11 is used under the condition that the organic EL device 12 is disabled to cause its organic EL layer 18 not to emit light. As the outside light incident to the polarization plate 23 passes the polarization plate 23, it becomes linearly polarized light whose polarization direction is in the direction of the transmission axis 23a. As this linearly polarized light passes the retardation plate 49 and the layer of the liquid crystal 45 of the LC cell, it is influenced by the birefringence effects of the retardation plate 49 and the layer of the liquid crystal 45 to become elliptically polarized lights whose polarization states differ wavelength by wavelength, and go out from the transparent substrate 21. Those elliptically polarized lights go to the polarization plate 24. Of those elliptically polarized lights, the polarized light component directed toward the transmission axis 24a of the polarization plate 24 passes the polarization plate 24. The light outgoing from the polarization plate 24, whose intensity varies wavelength by wavelength, becomes colored light according to the intensity of the light of each wavelength. This colored light reaches the reflection cathode electrode 15 via the anode electrode 19 and the organic EL layer 18, and is reflected by the reflection cathode electrode 15. The colored light reflected by the reflection cathode electrode 15 travels along the opposite path to the aforementioned path and goes out from the polarization plate 23. At this time, the light reflected by the reflection cathode electrode 15 is influenced by the reverse birefringence effect of the retardation plate 49 and the layer of the liquid crystal 45 to the one that affects the light at the time of light incidence, and becomes linearly polarized light whose polarization direction substantially matches with the direction of the transmission axis 23a. Therefore, the light outgoing from the polarization plate 23 becomes colored light which is substantially the same as the light that has been reflected by the reflection cathode electrode 15.

In a dark environment where a sufficient amount of outside light is not available, this display apparatus 11 is used under the condition that the organic EL device 12 is activated to cause its organic EL layer 18 to emit light. The light emitted by the organic EL layer 18 reaches the polarization plate 24. As this light passes the polarization plate 24, it becomes linearly polarized light whose polarization direction is in the direction of the transmission axis 24a. As this linearly polarized light passes the layer of the liquid crystal 45 of the LC cell and the retardation plate 49, it is influenced by the birefringence effect of the layer of the liquid crystal 45 and the retardation plate 49 to become elliptically polarized lights whose polarization states differ wavelength by wavelength, and go out from the transparent substrate 21. Those elliptically polarized lights go to the polarization plate 23. Of those elliptically polarized lights, the polarized light component directed toward the transmission axis 23a of the polarization plate 23 passes the polarization plate 23. The light outgoing from the polarization plate 24, whose intensity varies wavelength by wavelength, becomes colored light according to the intensity of the light of each wavelength.

The alignment state of the molecules of the liquid crystal 45 changes in accordance with the voltage applied between the electrodes 25 and 30. Accordingly, the birefringence effect by the layer of the liquid crystal 45 varies and the polarization state of the light incident to the polarization plate 24 (23) changes. The intensity of the light passing the polarization plate 24 (23) varies wavelength by wavelength, and the color of the light passing the polarization plate 24 (23) changes. That is, when a voltage is applied between the electrodes 25 and 30, the molecules of the liquid crystal 45 are aligned upward, and as the rising angle increases, the birefringence effect of the layer of the liquid crystal 45 becomes smaller. By controlling the voltage applied between the electrodes 25 and 30 to alter the birefringence effect of the layer of the liquid crystal 45, the color of light outgoing from the LCD panel 13 or the display colors can be changed. This alteration of display colors can be controlled almost in the same way in a dark environment as well as in a bright environment.

The colors that can be displayed by a single pixel of this display apparatus 11 include all the three primary colors of red, green and blue, black which is colorless dark display and white which is colorless bright display.

Figure 19:
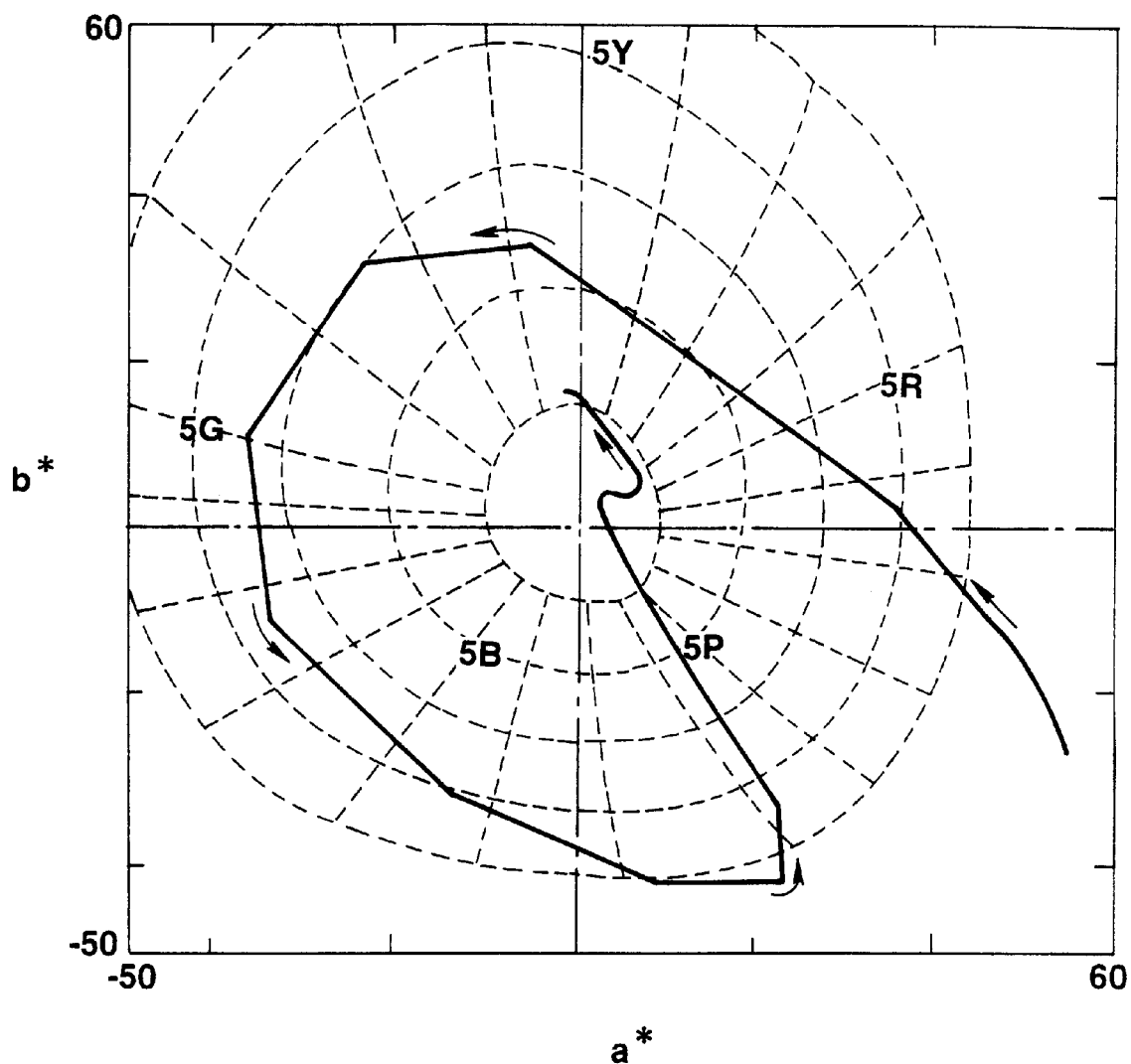
FIG. 19 is an a*-b* chromaticity diagram showing a change in the display color of the display apparatus according to the ninth embodiment.

FIG. 19 is an a*-b* chromaticity diagram showing a change in the display color of this display apparatus 11. As shown in FIG. 19, the display color of the display apparatus 11 in the initial state where no voltage is applied between the electrodes 25 and 30 is close to purple (P), and as the voltage to be applied between the electrodes 25 and 30 increases, the display color changes in the order of red (R), to green (G), to blue (B), to black and to white. Those red, green, blue, black and white display colors are all clear colors with high color purities.

With this display apparatus 11 used as a transmission type, given that the outgoing ratio in displaying black is R(min), and the outgoing ratio in displaying white is R(5V) when the applied voltage is 5 V, and is R(7V) when the applied voltage is 7 V, then R(min)=3.30%
R(5V)=23.64%
R(7V)=28.91%

With this display apparatus 11 used as a reflection type, given that CR(5V) is the contrast when the applied voltage for displaying white is 5 V, and CR(7V) is the contrast when the applied voltage for displaying white is 7 V, then

CR(5V)=7.16
CR(7V)=8.76

Apparently, a sufficiently high contrast is obtained when the applied voltage for displaying white is set to 5 V as well as when the applied voltage for displaying white is set to 7 V.

When this display apparatus 11 is used as a transmission type, the outgoing ratio in displaying black and the outgoing ratio in displaying white become approximately double those in the case where the display apparatus 11 is used as a reflection type. When this display apparatus 11 is used as a transmission type, therefore, a sufficiently high contrast can be obtained as in the case where is used as a reflection type.

The aforementioned display colors and contrast are acquired when the twist angle of the molecules of the liquid crystal 45, the value of $\Delta nd$, the retardation value of the retardation plate 49, the direction 49a of the phase delay axis of the retardation plate 49, and the directions 23a and 24a of the transmission axes of the polarization plates 23 and 24 lie within the aforementioned conditional ranges. If those conditions come off the ranges, as the degree of the deviation increases, the display quality of the display apparatus 11 becomes degraded in the order of contrast and display colors.

Therefore, this display apparatus 11 can color light without using color filters and can display a plurality of colors on a same pixel. This display apparatus 11 can improve the contrast and can display white and black, which are the display basic colors, and the three primary colors of red, green and blue. This display apparatus 11 can thus accomplish clear and colorful multicolor display.

Tenth Embodiment

A display apparatus 11 according to the tenth embodiment will now be discussed. The display apparatus 11 of this embodiment has the same structure as the ninth embodiment, except for the direction of the transmission axis 23a of the front polarization plate 23 and the direction of the phase delay axis 49a of the retardation plate 49.

FIGS. 20A through 20D are diagrams of the alignment state of the LC molecules of the LCD panel 13, the directions of the transmission axes 23a and 24a of the polarization plates 23 and 24 and the direction of the phase delay axis 49a of the retardation plate 49 as viewed from the display side.

Figure 20A:
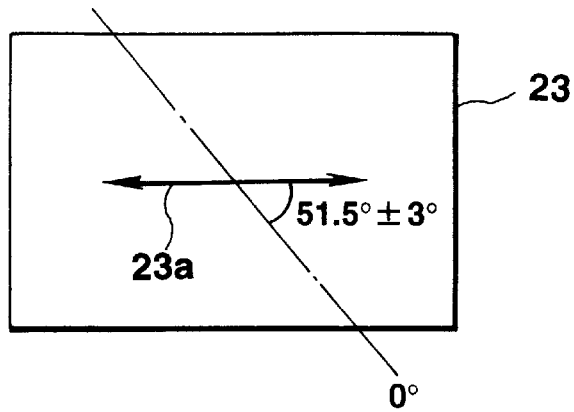
FIG. 20A through 20D are diagrams of the alignment state of LC molecules, the directions of transmission axes of polarization plates and the direction of a phase delay axis of a retardation plate in the tenth embodiment as viewed from the display side.
Figure 20B:
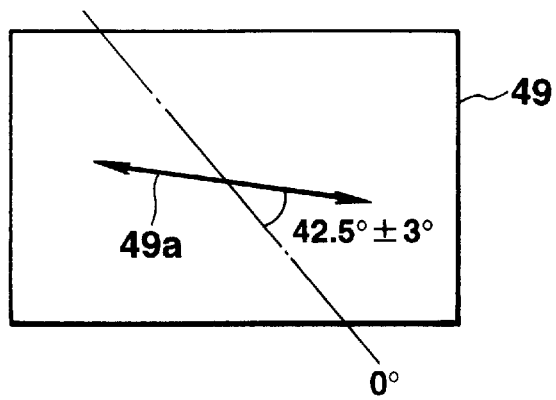
Figure 20C:
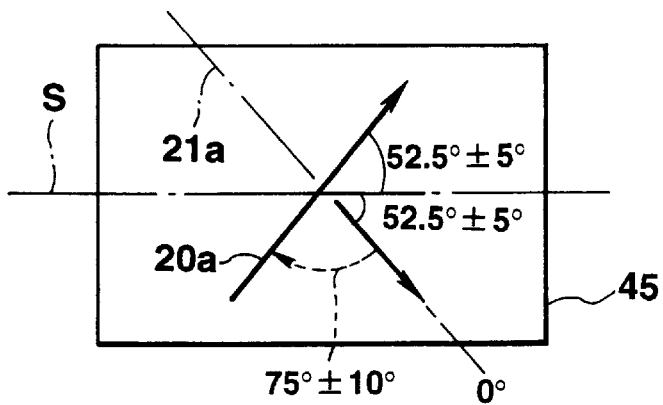
Figure 20D:
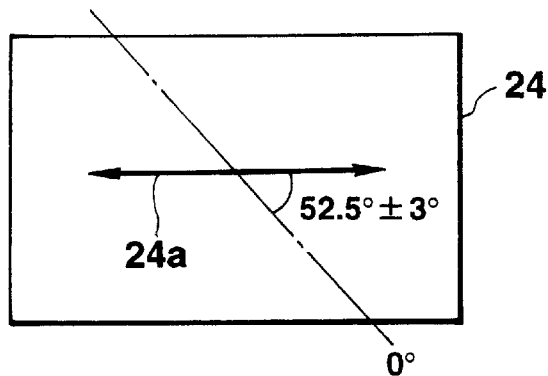

As shown in FIG. 20A, given that the aligning direction 21a of the LC molecules in the vicinity of the rear substrate 21 is set in the direction of 0°, the transmission axis 23a of the polarization plate 23 lies in the direction of 51.5°±3° in the opposite direction to the twist direction of the LC molecules. As shown in FIG. 20B, the phase delay axis 49a of the retardation plate 49 lies in the direction of 42.5°±3° in the opposite direction to the twist direction. The aligning directions 21a and 20a of the molecules of the liquid crystal 45 in the proximity of the substrates 20 and 21 and the direction of the transmission axis 24a of the polarization plate 24 are the same as those shown in FIGS. 18C and 18D.

Figure 21:
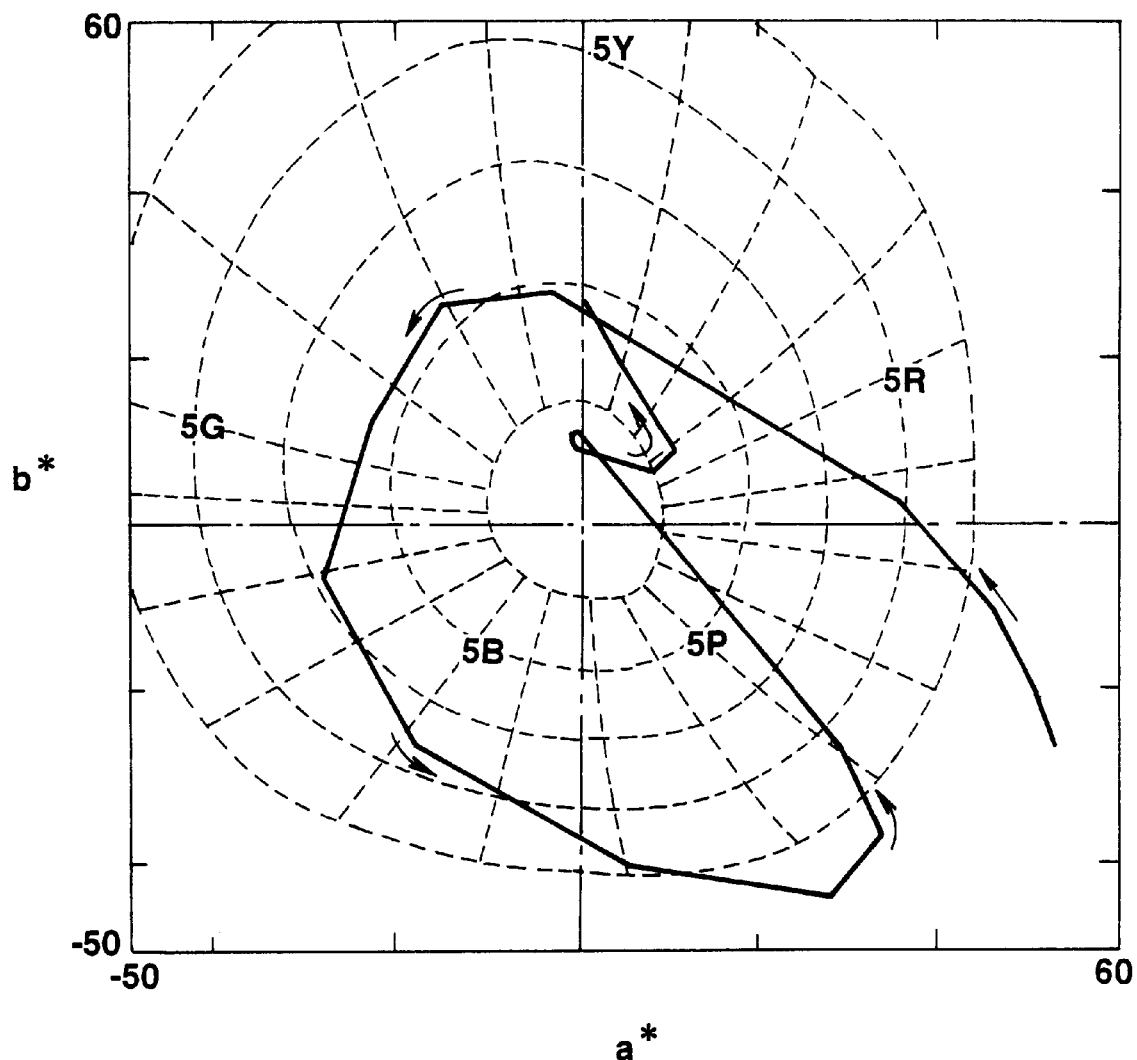
FIG. 21 is an a*-b* chromaticity diagram showing a change in the display color of the display apparatus according to the tenth embodiment.

FIG. 21 is an a*-b* chromaticity diagram showing a change in the display color of the display apparatus 11. As the voltage to be applied between the electrodes 25 and 30 increases, the display color of this display apparatus 11 also changes in the order of red (R), to green (G), to blue (B), to black and to white. Those red, green, blue, black and white display colors are all clear colors with high color purities.

With this display apparatus 11 used as a transmission type, the outgoing ratios are as follows.

R(min)=2.78%
R(5V)=22.85%
R(7V)=29.55%

With this display apparatus 11 used as a reflection type, given that CR(5V) is the contrast when the applied voltage for displaying white is 5 V, and CR(7V) is the contrast when the applied voltage for displaying white is 7 V, then

CR(5V)=8.72
CR(7V)=11.09

Therefore, this display apparatus 11 can color light without using color filters and can display a plurality of colors on a same pixel. This display apparatus 11 can improve the contrast and can display white and black, which are the display basic colors, and the three primary colors of red, green and blue. This display apparatus 11 can thus accomplish clear and colorful multicolor display.

Eleventh Embodiment

A display apparatus 11 according to the eleventh embodiment will now be discussed. The display apparatus 11 of this embodiment has the same structure as the ninth embodiment, except for the direction of the transmission axis 23a of the front polarization plate 23, the direction of the phase delay axis 49a of the retardation plate 49 and the direction of the transmission axis 24a of the rear polarization plate 24.

FIGS. 22A through 22D are diagrams of the alignment state of the molecules of the liquid crystal 45 in the display apparatus 11 of this embodiment, the directions of the transmission axes 23a and 24a of the polarization plates 23 and 24, and the direction of the phase delay axis 49a of the retardation plate 49 as viewed from the surface side of the LCD apparatus. According to this embodiment, the twist angle of the molecules of the liquid crystal 45 is set to 75°±3°, and the value of Δnd is set to 800 nm to 1100 nm. The retardation plate 49 in use has a retardation value of 60 nm±20 nm. The polarization plates 23 and 24 are arranged in such a way that their transmission axes 23a and 24a have the following directions. The retardation plate 49 is so arranged that its phase delay axis has the following direction.

Figure 22A:
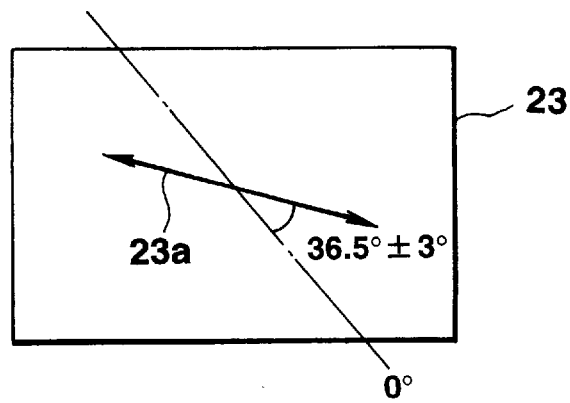
FIG. 22A through 22D are diagrams of the alignment state of LC molecules, the directions of transmission axes of polarization plates and the direction of a phase delay axis of a retardation plate in the ninth embodiment as viewed from the display side.
Figure 22B:
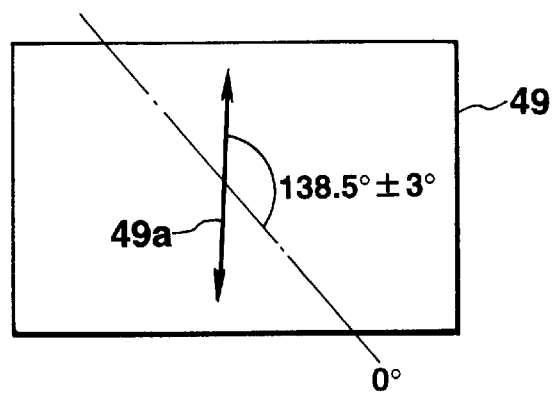
Figure 22C:
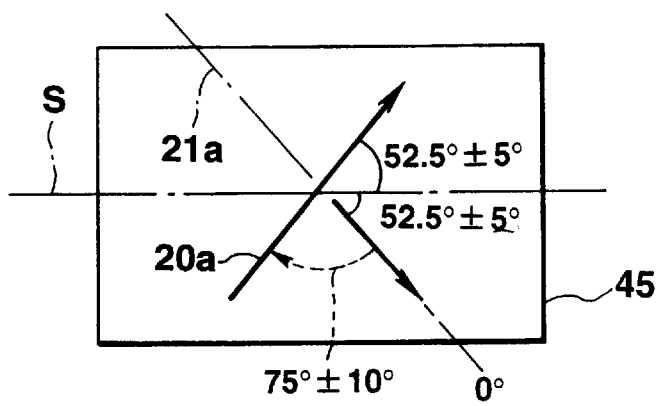

As shown in FIG. 22C, the aligning direction 21a of the molecules of the liquid crystal 45 in the vicinity of one substrate, e.g., the substrate 21, is set in the direction of 52.5°±5° clockwise with respect to the horizontal axis S of the LCD panel 13. The aligning direction 20a of the molecules of the liquid crystal 45 in the vicinity of the other substrate 20 is set in the direction of 52.5±5° counterclockwise with respect to the horizontal axis S. The molecules of the liquid crystal 45 are twisted by a twist angle of 75°±10° clockwise toward the substrate 20 from the substrate 21, as indicted by the broken-line arrow.

Figure 22D:
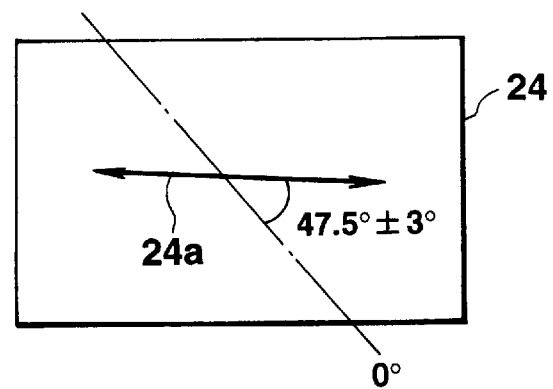

Given that the aligning direction 21a of the molecules of the liquid crystal 45 in the proximity of the substrate 21 is set in the direction of 0°, as shown in FIG. 22D, the transmission axis 24a of the polarization plate 24 lies in the direction of 47.5°±3° in the opposite direction to the twist direction of the molecules of the liquid crystal 45. As shown in FIG. 22A, the transmission axis 23a of the polarization plate 23 lies in the direction of 36.5°±3° in the opposite direction to the twist direction. The phase delay axis 49a of the retardation plate 49 lies in the direction of 138.5°±3° in the opposite direction to the twist direction, as shown in FIG. 22B.

The display apparatus 11 according to this embodiment acquires colored light by using the birefringence effect of the layer of the liquid crystal 45, the birefringence effect of the retardation plate 49 and the polarization effects of the pair of polarization plates 23 and 24. The colors that can be displayed by a single pixel of this display apparatus 11 include all the three primary colors of red, green and blue, black which is colorless dark display and white which is colorless bright display.

Figure 23:
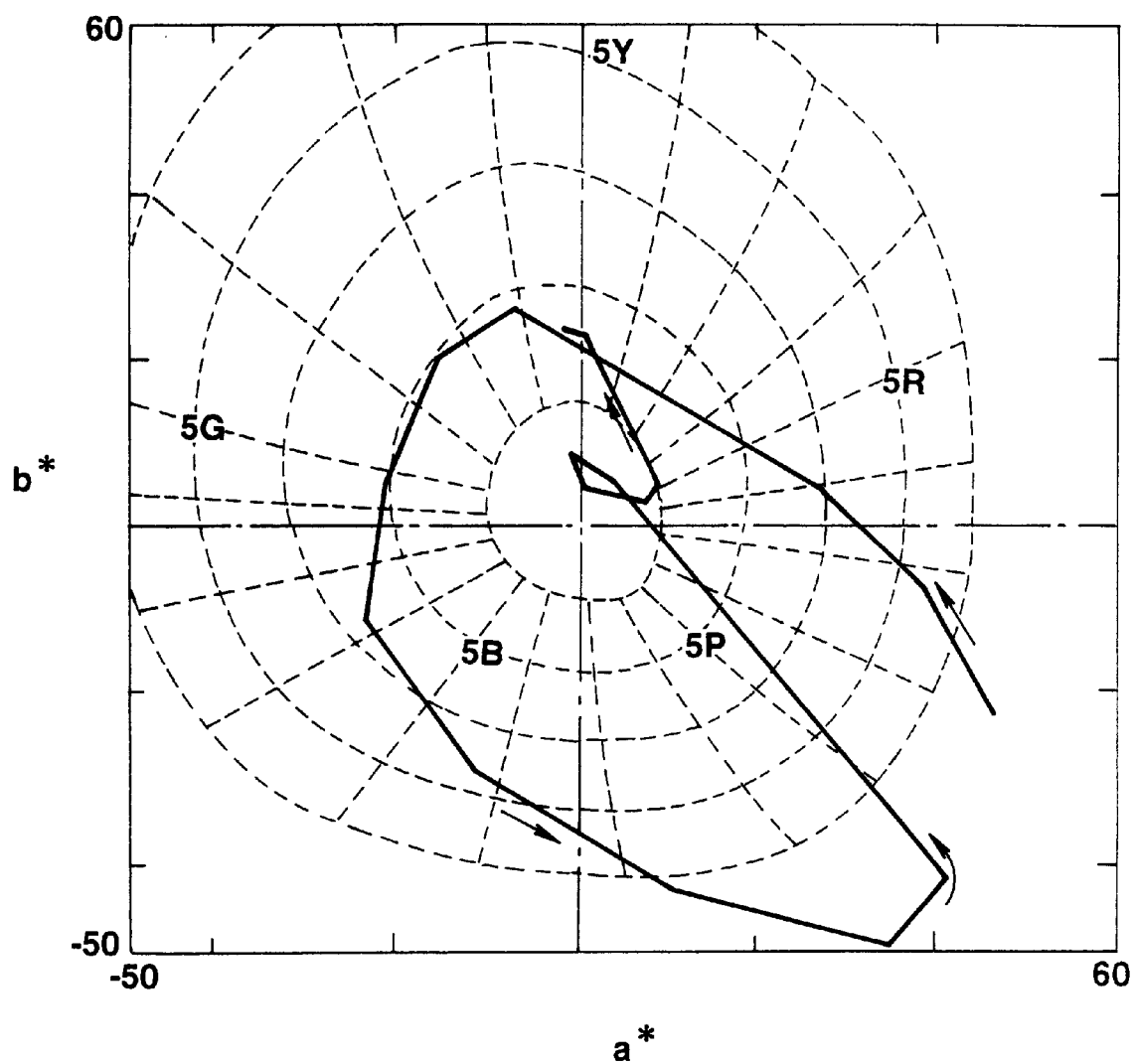
FIG. 23 is an a*-b* chromaticity diagram showing a change in the display color of the display apparatus according to the eleventh embodiment.

FIG. 23 is an a*-b* chromaticity diagram showing a change in the display color of this display apparatus 11.

As shown in FIG. 23, the display color of the display apparatus 11 in the initial state where no voltage is applied between the electrodes 25 and 30 is close to purple (P), and as the voltage to be applied between the electrodes 25 and 30 increases, the display color changes in the order of red (R), to green (G), to blue (B), to black and to white. Those red, green, blue, black and white display colors are all clear colors with high color purities.

With this display apparatus 11 used as a transmission type, given that the outgoing ratio in displaying black is R(min), and the outgoing ratio in displaying white is R(5V) when the applied voltage is 5 V, and is R(7V) when the applied voltage is 7 V, then R(min)=1.85%
R(5V)=22.37%
R(7V)=28.35%.

With this display apparatus 11 used as a reflection type, given that CR(5V) is the contrast when the applied voltage for displaying white is 5 V, and CR(7V) is the contrast when the applied voltage for displaying white is 7 V, then

CR(5V)=12.09
CR(7V)=15.32.

Apparently, a sufficiently high contrast is obtained when the applied voltage for displaying white is set to 5 V as well as when the applied voltage for displaying white is set to 7 V.

When this display apparatus 11 is used as a transmission type, the outgoing ratio in displaying black and the outgoing ratio in displaying white become approximately double those in the case where the display apparatus 11 is used as a reflection type. When this display apparatus 11 is used as a transmission type, therefore, a sufficiently high contrast can be obtained as in the case where it is used as a reflection type.

The aforementioned display colors and contrast are acquired when the twist angle of the molecules of the liquid crystal 45, the value of Δnd, the retardation value of the retardation plate 49, the direction 49a of the phase delay axis of the retardation plate 49, and the directions 23a and 24a of the transmission axes of the polarization plates 23 and 24 lie within the aforementioned conditional ranges. If those conditions come off the ranges, as the degree of the deviation increases, the display quality of the display apparatus II becomes degraded in the order of contrast and display colors.

Therefore, this display apparatus II can color light without using color filters and can display a plurality of colors on a same pixel. This display apparatus 11 can improve the contrast and can display white and black which are the display basic colors, and the three primary colors of red, green and blue. This display apparatus 11 can thus accomplish clear and colorful multicolor display.

Twelfth Embodiment

Figure 24:
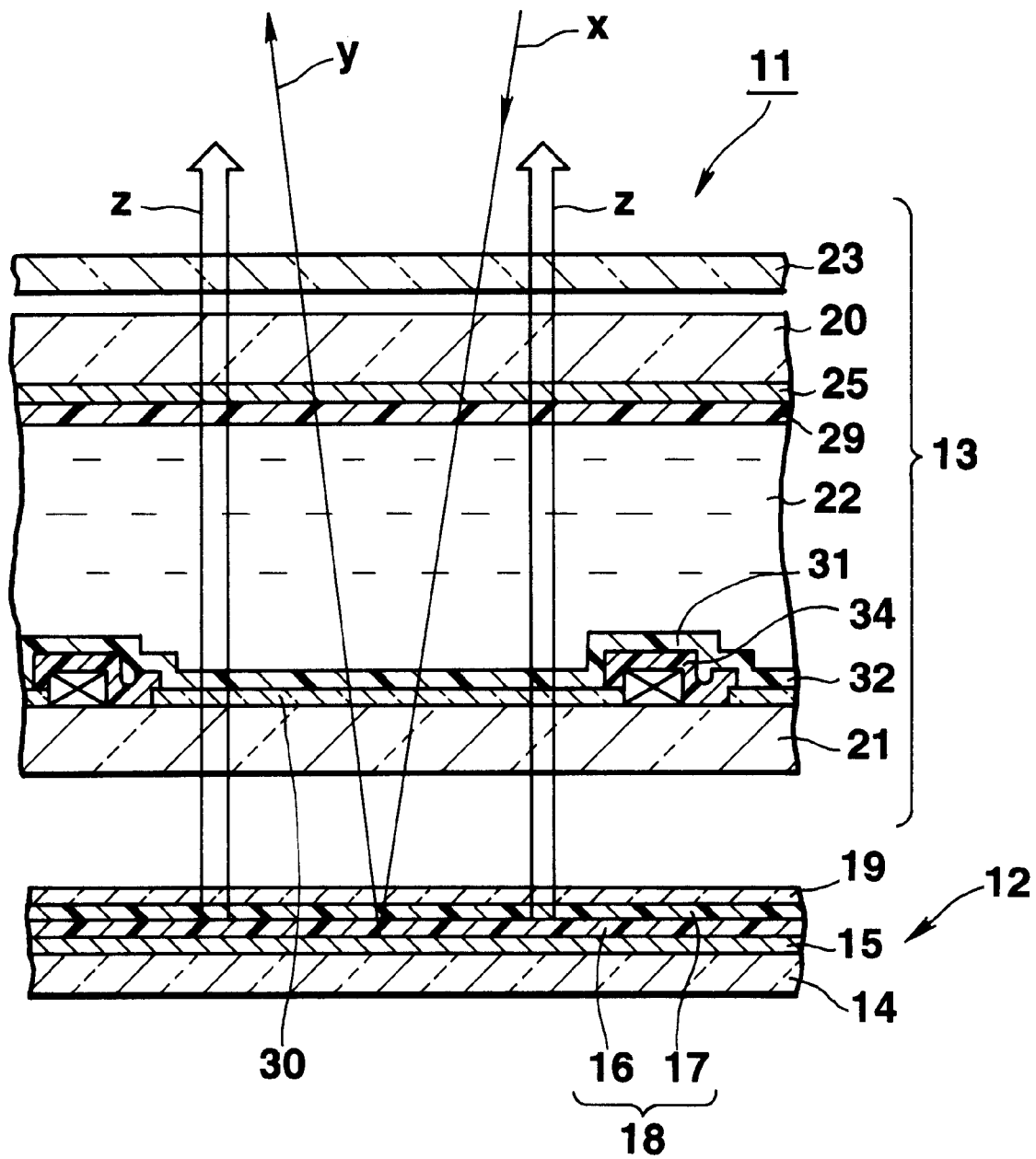
FIG. 24 is a cross-sectional view of a display apparatus according to the twelfth embodiment of this invention.

FIG. 24 is a cross-sectional view of a display apparatus 11 according to the twelfth embodiment of this invention. As illustrated, the display apparatus 11 comprises the LCD panel 13 and the organic EL device 12, and has the same structure as the eighth embodiment, except that the rear polarization plate 24 is removed. The display apparatus 11 with a single polarization plate has a higher transmittance and a higher luminance than the display apparatus 11 which uses two polarization plates, and can reduce the difference in luminance between the case where the display apparatus 11 is used as a reflection type and the case where it is used as a transmission type.

The outgoing ratio of the conventional ECB LCD apparatus when used in a transmission type differs display color by display color, as shown in FIG. 39. Particularly, blue has a lower luminance than the other colors and has a difficulty in visibility. The organic EL device 12 can emit white light by using DCM1 as the red dopant, coumarin 6 as the green dopant and TPB as the blue dopant. By changing the mixing ratio of the dopants, the luminance of blue can be increased relatively to ensure an excellent luminance balance with respect to the individual colors. As the luminescent materials in the organic EL device 12 which emit individual colors, can be set arbitrarily, the display colors and their luminances can be controlled in accordance with the purpose.

The display apparatuses 11 according to the eighth to twelfth embodiments may be designed to have a diffusion plate as in the fourth to sixth embodiments.

Thirteenth Embodiment

Figure 25:
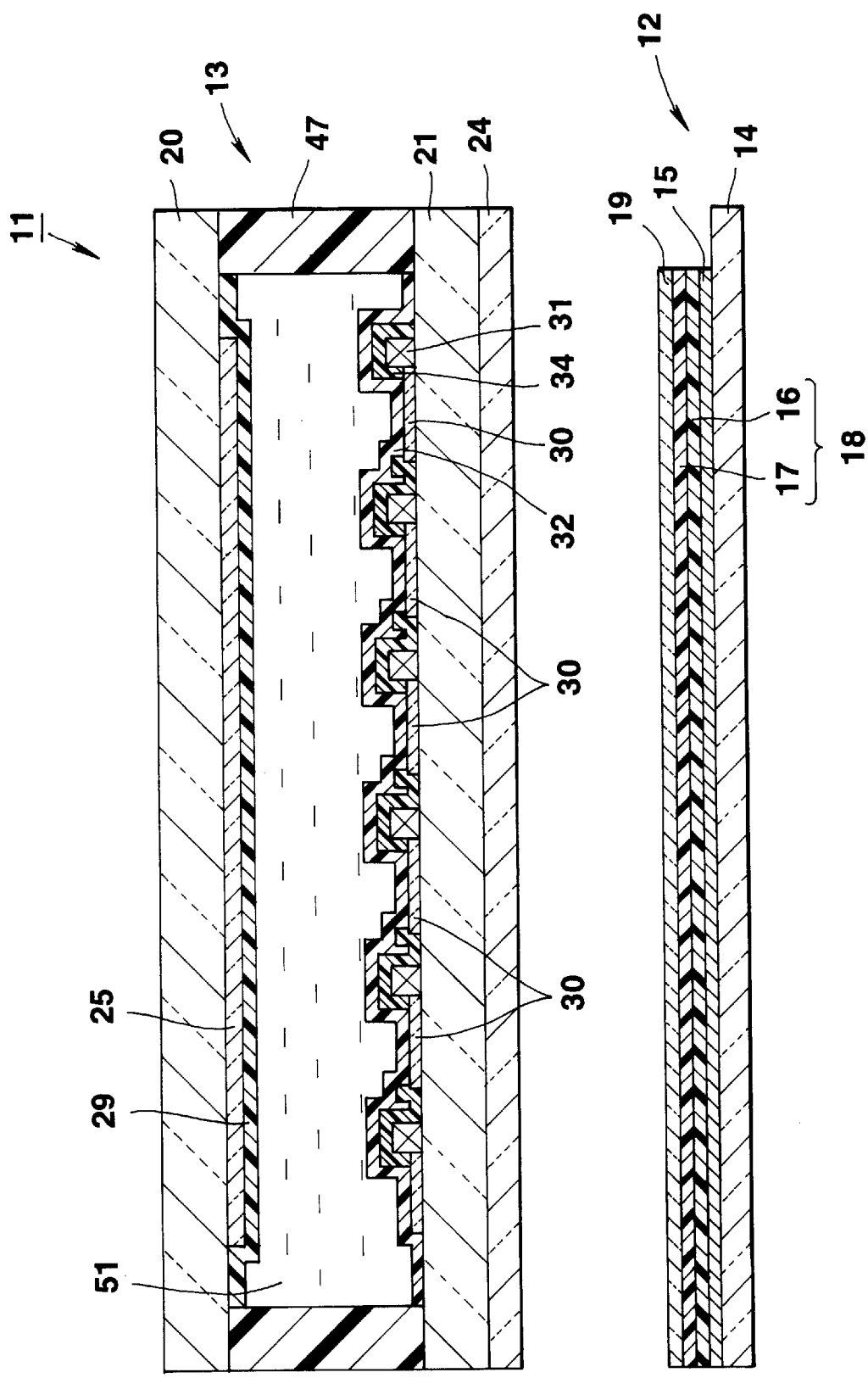
FIG. 25 is a cross-sectional view of a display apparatus according to the thirteenth embodiment of this invention.

FIG. 25 is a cross-sectional view showing a display apparatus 11 according to the thirteenth embodiment of this invention. As illustrated, the display apparatus 11 comprises the LCD panel 13 and the organic EL device 12.

In the LCD panel 13, an LC cell is comprised of the front transparent substrate 20, the rear transparent substrate 21 and a liquid crystal 51, sandwiched and sealed between the front transparent substrate 20 and rear transparent substrate 21 by a seal member 47. The polarization plate 24 is arranged between the rear transparent substrate 21 and the organic EL device 12. The common electrode 25 of ITO, which has a transparency of over 70% to the visible light, is formed on the opposing inner surface of the front transparent substrate 20 over the entire display area. Formed on the common electrode 25 is the front aligning film 29 of polyimide which has been subjected to an aligning treatment such as rubbing. A plurality of pixel electrodes 30 of ITO and a plurality of TFTs 31 as switching elements are arranged on the opposing inner surface of the rear transparent substrate 21 in accordance with the layout of the pixels. The source electrodes of the TFTs 31 are connected to the pixel electrodes 30, which are laid out in a matrix pattern. The gate electrodes of the TFTs 31 are connected to the gate lines through which select voltages are applied. The drain electrodes of the TFTs 31 are connected to the drain lines through which signal voltages are applied. The interlayer insulator film 34 of silicon nitride is patterned in a non-pixel area which includes those TFTs 31. Formed on the pixel electrodes 30 and the interlayer insulator film 34 is the rear aligning film 32 of polyimide which has undergone an aligning treatment such as rubbing.

The liquid crystal 51 initially aligned in a predetermined direction is intervened between the front aligning film 29 and the rear aligning film 32.

A so-called PCGH liquid crystal which is a phase transition (cholesteric-nematic) type liquid crystal added with a dichroic die, a PD (Polymer Dispersed) liquid crystal or the like can be used as the liquid crystal 51.

As the display apparatus 11 of this embodiment is designed to use only one polarization plate, it has a higher light transmittance and higher luminance than the display apparatus which uses two polarization plates. The display apparatus 11 of this embodiment can reduce the difference in luminance between the case where the display apparatus 11 is used as a reflection type and the case where it is used as a transmission type, as compared with the display apparatus which uses two polarization plates.

Figure 26A:
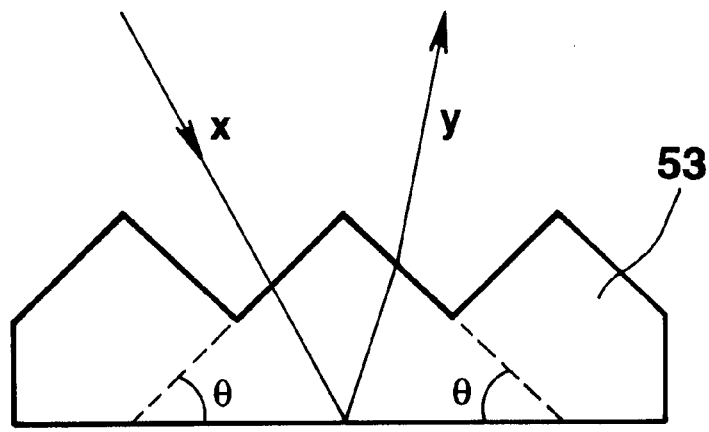
FIG. 26A is a cross-sectional view showing an omnidirectional light propagation direction control plate.
Figure 26B:
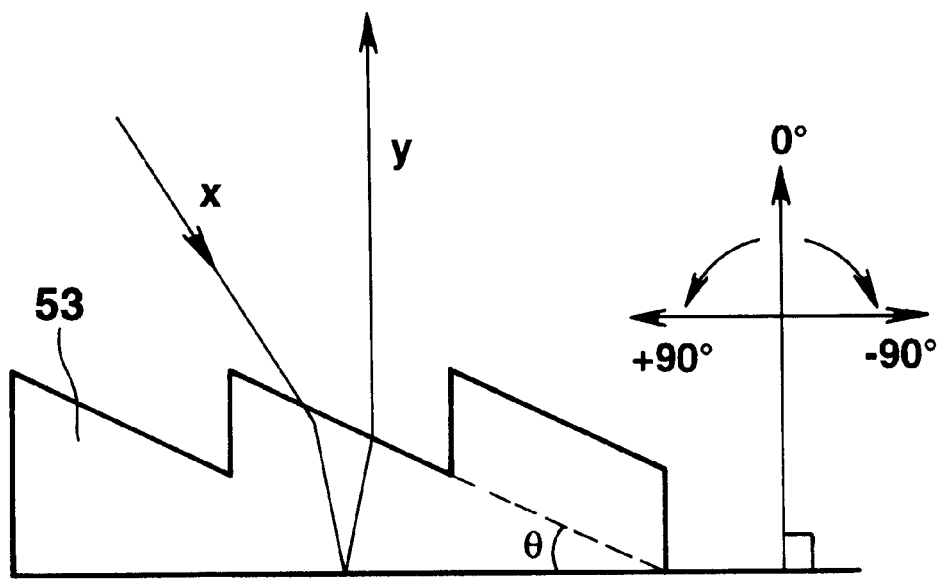
FIG. 26B is a cross-sectional and explanatory diagram showing the light propagation direction control plate.
Figure 27:
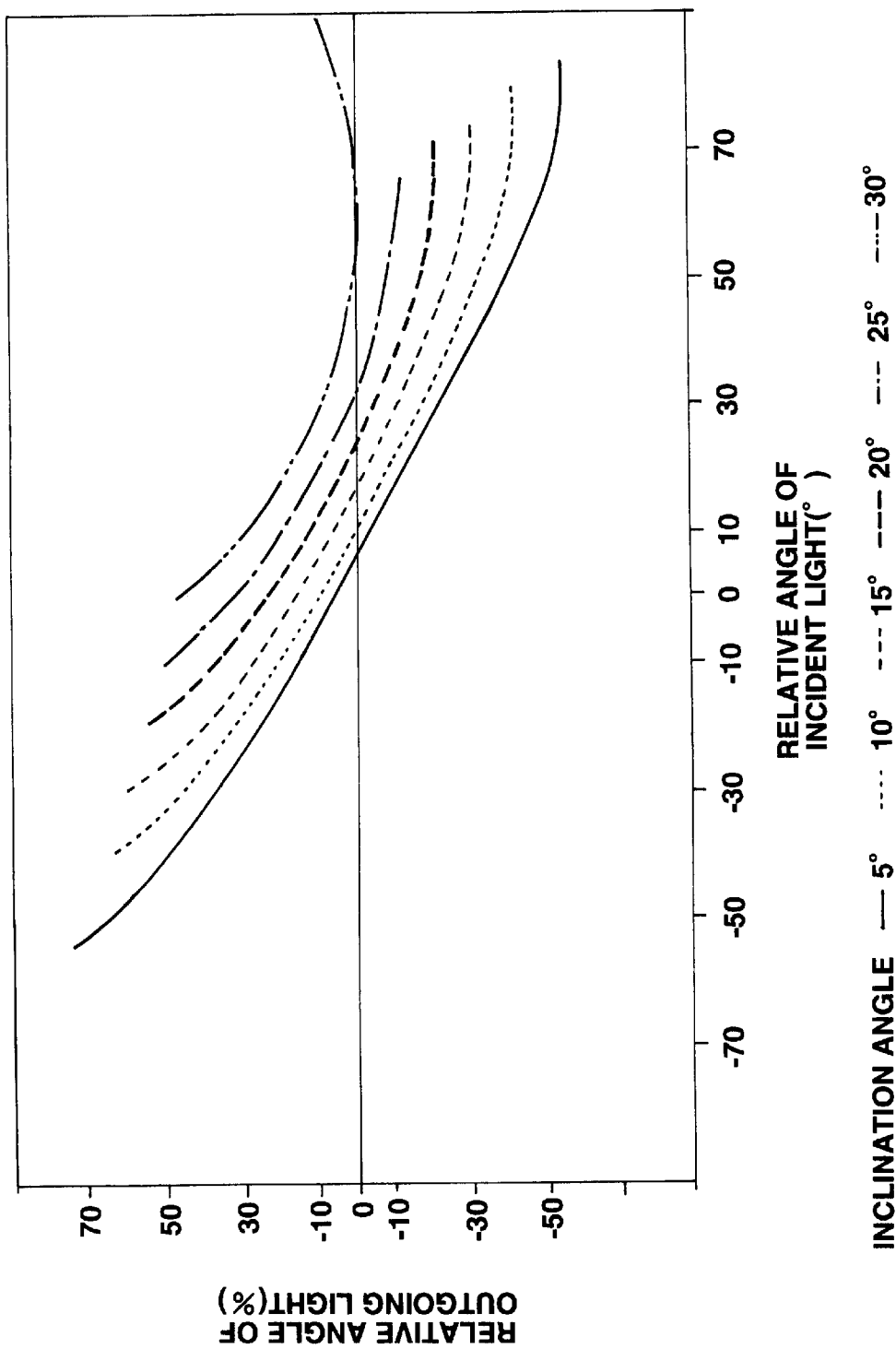
FIG. 27 is a graph showing the relationship between the angle of incident light id the angle of outgoing light in accordance with the angle of inclination of the light propagation direction control plate.

The display apparatuses according to the above-described first to thirteenth embodiments each comprise the LCD panel 13 and the organic EL device 12. A light propagation direction control plate 53 as shown in FIGS. 26A and 26B may be provided between the LCD panel 13 and the organic EL device 12. The light propagation direction control plate 53 is formed of a light transmitive material, such as polycarbonate, polyester or polyacryl, whose refractive index ranges from 1.3 to 1.4. The light propagation direction control plate 53 is designed in the shape of microprisms in such a way that its surface opposite to the LCD panel 13 is inclined and has regular upheavals, and its surface opposing to the organic EL device 12 is smooth. The inclination angles between the smooth surface and the inclined surfaces of the microprisms are set to θ and θ'. The incident angle of light incident to the light propagation direction control plate 53 is defined as 0° in the direction normal to the smooth surface of the light propagation direction control plate 53, +(°) for the inclination toward the inclination angles between the smooth surface and the inclined surfaces of the microprisms, and −(°) for the inclination in the opposite direction. If the inclination angles of the inclined surfaces of the microprisms are set to 25°, the incident light x with the incident angle of +30° goes out as the outgoing light y at an angle of approximately 0° as shown in FIG. 27 when this display apparatus 11 is used as a reflection type.

The display apparatus of this invention is not limited to the above-described first to thirteenth embodiments, but may be modified in various other forms. For instance, in addition to the TN liquid crystal mode, various liquid crystal modes, such as an STN liquid crystal mode, a guest-host (GH) liquid crystal mode, a PC (Phase Transition) mode which does not use a polarization plate, a PDLC (Polymer Dispersed Liquid Crystal) mode, a PDLC/GH mode, a cholesteric liquid crystal mode, and PC liquid crystal/GH mode, can be adapted to the LCD panel 13. The structure of the LCD panel, the provision or elimination of color filters, or the provision or elimination of polarization plates, may be modified properly in accordance with the liquid crystal mode.

Although the organic EL layer 18 according to the first to thirteenth embodiments comprises the electron-transporting layer 16 of Alq3 and the hole-transporting layer 17 consisting of a mixture of PVCz, BND and individual R, G and B luminescent materials, another organic EL material may be used for the organic EL layer 18 so that the layer 18 comprises a single EL layer, or three or more EL layers.

According to the first to thirteenth embodiments, a mixture of PVCz and the luminescent materials is contained in the organic EL device 12 to suppress the density loss caused by the cohesion of hydrogen bonding of the luminescent materials. Instead, a luminescent material which absorbs the energy of light or the like of the luminescent wavelength range from Alq3 or the hole-transporting layer and emits light of a predetermined wavelength range may be added to Alq3, or to Alq3 and the hole-transporting layer. While Alq3 itself emits bluish green light by the recombination of holes and electrons, bluish green light with a higher luminance can be emitted by mixing, for example, coumarin 6 in Alq3. A blue-light emitting material, such as TPB, 4,4'-bis(2,2'-diphenylvinylene)biphenyl, 4,4-bis((2-carbazole)vinylene) biphenyl, tetraphenylbutadiene derivative, cyclopentadiene derivative, or oxadiazole derivative, may be mixed in Alq3.

Although a magnesium alloy is used as the material for the reflection cathode electrode 15 according to the first to thirteenth embodiments, a simple substance of hafnium (Hf, the work function of 3.63 eV) or a rare earth element, scandium (Sc, the work function of 3.5 eV), yttrium (Y, the work function of 3.1 eV), lantern (La, the work function of 3.5 eV), cerium (Ce, the work function of 2.9 eV), praseodymium (Pr, the work function of 3.0 eV), neodymium (Nd, the work function of 3.2 eV), promethium (Pm, the work function of 3.5 eV), samarium (Sm, the work function of 2.7 eV), europium (Eu, the work function of 2.5 eV), gadolinium (Gd, the work function of 3.1 eV), terbium (Tb, the work function of 3.5 eV), dysprosium (Dy, the work function of 3.5 eV), holmium (Ho, the work function of 3.5 eV), erbium (Er, the work function of 2.97 eV), thulium (Tm, the work function of 3.5 eV), ytterbium (Yb, the work function of 2.6 eV) or lutetium (Lu, the work function of 3.5 eV), or an alloy containing any of those elements may be used as the material for the reflection cathode electrode 15.

Although the reflection cathode electrode 15 has a mirror structure with a smooth reflection surface according to the first to thirteenth embodiments, it may be formed with a rough reflection surface to scatter incident light. This design can widen the angle of visibility of the display apparatus 11.

Although the substrate 14 of the organic EL device 12 is a glass substrate according to the first to thirteenth embodiments, it may be a silicon oxide layer or an acrylic organic insulator layer with a thickness of 1 μm to 5 μm. In this case, it is possible to design the organic EL device 12 thinner and to reduce the parallax caused by the difference between the refractive index of the substrate and the refractive index in vacuum or air.

The semiconductor layer of the TFTs 31 adapted for use in the display apparatus 11es according to the first to thirteenth embodiments may be formed of amorphous silicon, or polycrystalline silicon for higher-density implementation. The TFTs 31 may be any of a forward staggered type, a reverse staggered type, a forward coplanar type and a reverse coplanar type. As the switching elements, active elements such as MIM (Metal Insulator Metal) may be used in addition to the TFTs 31. This invention can be adapted to a display apparatus 11 which uses a simple matrix type LCD panel as well as a display apparatus which uses an active matrix type LCD panel using active elements like TFTS.

Fourteenth Embodiment

Figure 28:
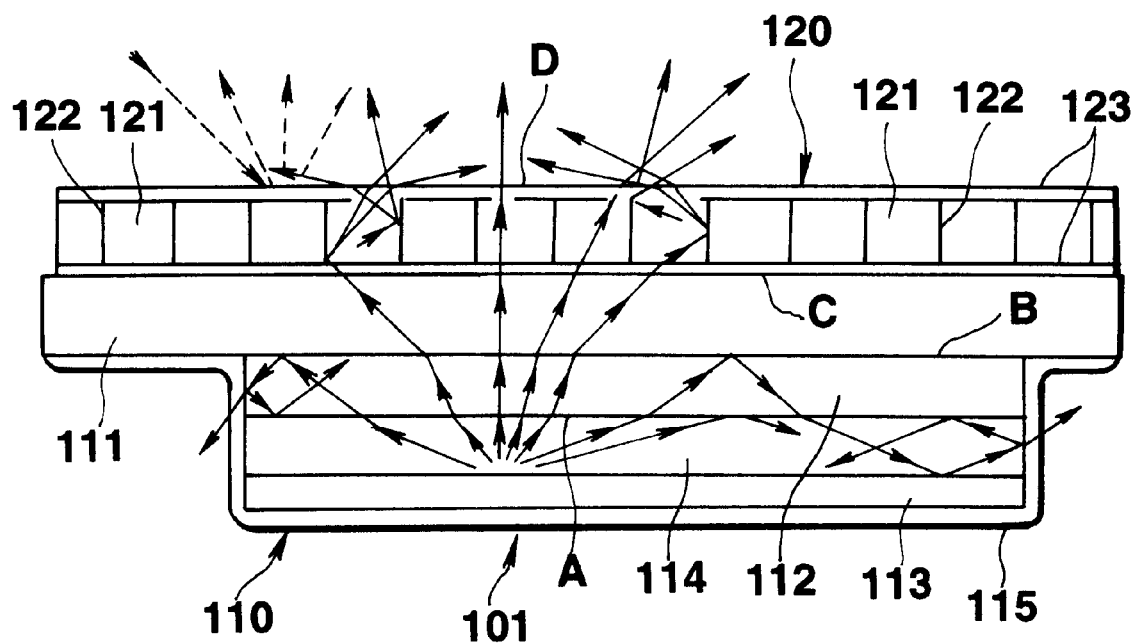
FIG. 28 is a cross-sectional view of a flat type light source according to the fourteenth embodiment of this invention.

FIG. 28 is a cross-sectional view of a flat type light source (an organic EL device 101) according to the fourteenth embodiment of this invention. In this figure, hatching is omitted to more clearly show the light traveling paths to be discussed later.

The organic EL device 101 according to this embodiment comprises a light emitting body 110 and a scatter control film 120 provided on the light-outgoing side of the light emitting body 110 or the side which faces the LCD device (not shown).

The light emitting body 110 will now be discussed. This light emitting body 110 is a back-light which comprises a transparent electrode 112 formed on one surface of a transparent substrate 111 of glass or PET resin, an electrode 113 facing the transparent electrode 112, and an organic EL layer 114 of an organic material, which is located between the transparent electrode 112 and the electrode 113 and emits light in accordance with the applied voltage. The transparent electrode 112 serves as an anode, and the electrode 113 serves as a cathode.

The transparent electrode 112 is formed of a material with a low work function, such as a Mg-based alloy like a Mg—In alloy or Mg—Ag alloy in view of the injection of electrons in the organic EL layer 114.

It is to be however noted that as a Mg-based alloy has a high response characteristic, the electrode 113 which is formed of a Mg-based alloy may react with water in the air to be deteriorated or may react with oxygen to be oxidized. According to this embodiment, as shown in FIG. 28, a transparent sealing film 115 of a cerium oxide and silicon dioxide (CeOx—$SiO_2$ where CeOx is a composition ratio of 1.5< x<1.74) having a high sealing property is coated around the light emitting body 110 over the bottom surface of the transparent substrate 111 from the entire back surface (the lower side in the figure) of the light emitting body 110. This seals the electrode 113 of the Mg-based alloy from air and water.

This organic EL layer 114 may have a double layer structure having a lamination of a hole-transporting layer on the anode side and an electron-transporting layer on the cathode side, or may have a multilayer structure having three or more carrier-transporting layers.

The organic EL layer 114 is separated to an R area, G area and B area in association with the pixels of the LCD device (not shown) facing the organic EL device 101, which display red, the pixels which display green and the pixels which display blue. The R area of the organic EL layer 114 is comprised of two layers, namely an electron-transporting layer of DCM1-doped Alq3 and a hole-transporting layer of α-NPD, and emits red light. The G area of the organic EL layer 114 is comprised of two layers, namely an electron-transporting layer of Bebq2 and a hole-transporting layer of α-NPD, and emits green light. The B area of the organic EL layer 114 is comprised of three layers, namely an electron-transporting layer of Alq3, a luminescent layer consisting of a mixture of 96% by weight of DPVB1 and 4% by weight of BCzVBi, and a hole-transporting layer of α-NPD, and emits blue light.

The refractive index of the organic EL layer 114 on the outgoing side or the refractive index of the hole-transporting layer of α-NPD is 1.40 to 1.80, and the refractive index of the outgoing side electrode (ITO) 112 is approximately 2.00. The refractive index of the transparent substrate (in the case of glass) 111 is 1.45 to 1.80.

This light emitting body 110 is driven to emit light by a voltage (DC voltage) applied between the transparent electrode 112 and the electrode 113. As a predetermined forward bias voltage is applied between the transparent electrode 112 and the electrode 113, holes are injected from the transparent electrode 12 (anode), and electrodes are injected from the electrode 113 (cathode), into the organic EL layer 114. The organic EL layer 114 emits light by absorbing the energy of the singlet excitons which have been generated by the recombination of the injected holes and electrons.

The light emitted by the singlet excitons goes to the transparent electrode 112 from the organic EL layer 114, passes the transparent electrode 112, and comes out of the surface of the light emitting body 110 (the transparent electrode 111). The light which has traveled toward the back side of the organic EL layer 114 is reflected by the electrode 113 and reaches the transparent electrode 112.

Figure 29:
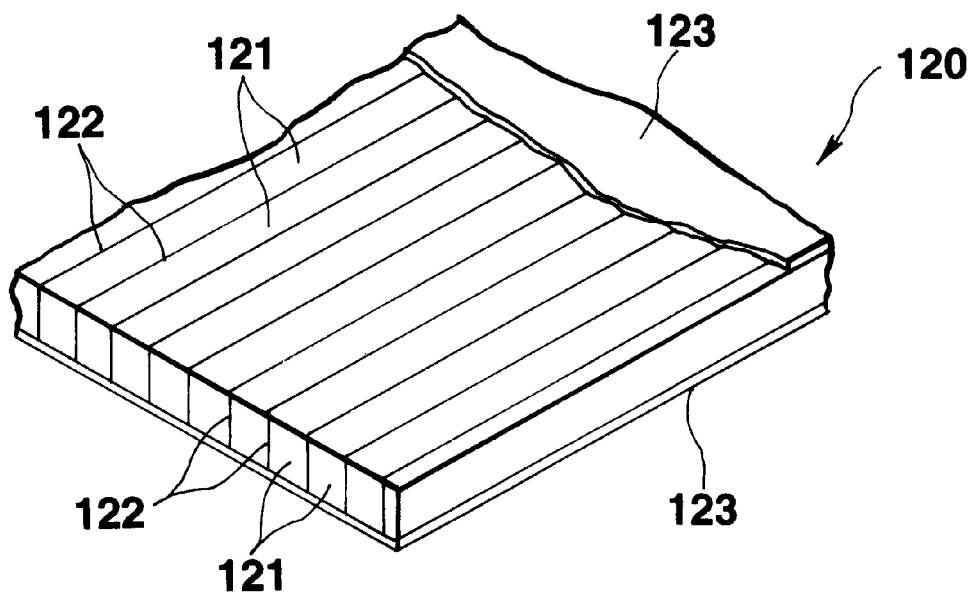
FIG. 29 is a perspective view of a scatter control film used in the flat type light source.

The scatter control film 120 will be discussed below. FIG. 29 is a partly cutaway perspective view showing the structure of the scatter control film 120.

The scatter control film 120 passes the light incident within a predetermined angular range with respect to the light incident surface, and reflects and scatters the incident light out of the predetermined angular range. The scatter control film 120 comprises light guiding portions 121, reflection films 122 and support sheets 123.

The light guiding portions 121 are made of a resin having a transparency with respect to visible light, and are formed into thin bands with equal intervals therebetween. The light guiding portions 121 are arranged in parallel to one another. The reflection films 122 are silver vapor-deposited films, aluminum vapor-deposited films or the like, which are made of a material having a reflective property to visible light. Each reflection film 122 is intervened between the adjoining light guiding portions 121, and is formed perpendicular to the light incident surface of the scatter control film 120. The surface of each reflection film 122 actually has very fine upheavals, so that light incident to the reflection film 122 is scattered. The support sheets 123 are made of a resin having a transparency to visible light. The support sheets 123 are adhered to both sides of the film, which is comprised of the light guiding portions 121 and the reflection films 122, for reinforcement so that the film is not broken up at the interfaces between the light guiding portions 121 and the reflection films 122. The refractive index of the light guiding portions 121 and the refractive index of the support sheets 123 are substantially the same as the refractive index of the transparent substrate 111 of the light emitting body 110.

The film comprised of the light guiding portions 121 and the reflection films 122 is a block which comprises a resin layer constituting the stacked light guiding portions 121 and a metal layer constituting the reflection films 122 and which is sliced perpendicularly with respect to the stacked surfaces of the light guiding portions 121. The support sheets 123 are deposited on both sides of the thus constituted film having the light guiding portions 121 and the reflection films 122, thereby forming the scatter control film 120. The support sheets 123 may be adhered to both sides of the film comprised of the light guiding portions 121 and the reflection films 122 by an adhesive which has substantially the same refractive index as that of the transparent substrate 11.

The refractive index of the transparent substrate 111 of glass is 1.46 to 1.80. Resins whose refractive indexes are approximately the same as that of the transparent substrate 111 include PET, PES (PolyEster Sulfone) and PC (PolyCarbonate). The refractive indexes of those resins are 1.40 to 1.60. The scatter control film 120 is closely attached to the light-outgoing surface of the light emitting body 110 (the surface of the transparent substrate 111). The scatter control film 120 are adhered to the light emitting body 110 by an adhesive whose refractive index is substantially the same as that of any of the light guiding portions 121 and the support sheets 123 or whose refractive index lies between the refractive index of the light guiding portions 121 and the support sheets 123 and the refractive index of the transparent substrate 111.

The "flat type light source" according to this embodiment causes the light, which has been emitted by the organic EL layer 114 of the light emitting body 110 and has come out from the surface of the transparent substrate 11, to go out via the scatter control film 120.

The paths of light which is emitted from one point in the organic EL layer 114 of the light emitting body 110 will be discussed referring to FIG. 28. As indicated by the solid-line arrows in FIG. 28, this light radially travels in every direction. The light which travels nearly perpendicularly to the transparent substrate 111 goes out from the transparent substrate 111 without being hardly refracted or reflected at the interface A between the organic EL layer 14 and the transparent substrate 112 and at the interface B between the transparent substrate 112 and the transparent substrate 111.

The light which travels askew to the transparent substrate 111 is refracted or reflected at the interfaces A and B because the refractive indexes of the organic EL layer 114, the transparent substrate 112 and the transparent substrate 111 differ from one another.

The light which travels askew to the transparent substrate 111 reaches the interface A between the organic EL layer 114 and the transparent substrate 112. Of the incident light, the light which has come at a smaller incident angle than the total reflection critical angle of the interface A is refracted at this interface A and goes to the transparent substrate 112. Of the incident light, the light which has come at a greater incident angle than the total reflection critical angle of the interface A is fully reflected at the interface A.

The light fully reflected at the interface A is reflected by the electrode 113 and is also reflected at the interface A and the end portion of the organic EL layer 114, traveling, zigzag and refracted, in the organic EL layer 114. During this process, the light incident to the interface A at a smaller incident angle than the total reflection critical angle is refracted at the interface A and reaches the transparent electrode 112.

The light incident to the transparent substrate 112 passes the transparent electrode 112 to be incident to the interface B between the transparent electrodes 112 and 111. Of the incident light, the light which has come at a smaller incident angle than the total reflection critical angle of the interface B is refracted at the interface B and goes to the transparent substrate 111. Of the incident light, the light which has come at a greater incident angle than the total reflection critical angle of the interface B is fully reflected at the interface B.

A part of the light fully reflected at the interface B is reflected at the interface A between the transparent electrode 112 and the organic EL layer 114 and is also reflected at the interface B and the end portion of the transparent electrode 112, traveling, zigzag and refracted, in the transparent electrode 112. During this process, the light incident to the interface B at a smaller incident angle than the total reflection critical angle is refracted at the interface B and goes to the transparent electrode 111.

The other part of the light fully reflected at the interface B passes the interface A and returns to the organic EL layer 114. This light, like the light fully reflected at the interface A, travels, zigzag and refracted, in the organic EL layer 114. During the process, the light incident to the interface A at a smaller incident angle than the total reflection critical angle comes into the transparent electrode 112 through this interface A, and the light incident to the interface B at a smaller incident angle than the total reflection critical angle passes through the interface B to reach the transparent electrode 111.

The light incident to the transparent electrode 111 passes through it and comes to the interface C between the light emitting body 110 and the scatter control film 120. Note that the refractive indexes of the light guiding portions 121 and the support sheets 123 of the scatter control film 120 are substantially the same as the refractive index of the transparent electrode 111. The scatter control film 120 is adhered to the light emitting body 110 by an adhesive whose refractive index is substantially the same as that of any of the light guiding portions 121, the support sheets 123 and the reflection films 122 or whose refractive index lies between the refractive index of the light guiding portions 121 and the support sheets 123 and the refractive index of the transparent substrate 111. Therefore, the light incident to the interface C between the light emitting body 110 and the scatter control film 120 mostly passes through the interface C and reaches the scatter control film 120 without refraction and reflection.

As shown in FIG. 28, the lights, fully reflected at the interfaces A and B and traveling zigzag in the organic EL layer 114 and the transparent electrode 112, partially go out from the ends of the transparent electrode 112 and the organic EL layer 114 to become leak light. The amount of the leak light is very small. Most of the light incident to the transparent electrode 111 passes through the interface C and reaches the scatter control film 120. Therefore, the light emitted by the organic EL layer 114 of the light emitting body 110 comes to the scatter control film 120 with hardly any loss.

The paths of the light incident to the scatter control film will now be discussed referring to FIG. 28.

The light which has passed the interface C between the light emitting body 110 and the scatter control film 120 first comes to the support sheet 123 on the side of the light emitting body 110. The light incident to the support sheet 123 comes to the light guiding portions 121 without being refracted or reflected at the interface between this support sheet 123 and the light guiding portions 121 because the refractive index of the support sheet 123 is substantially the same as that of the light guiding portions 121. As will be discussed later, the light, which has passed the light guiding portions 121 and has reached the interface C between the light guiding portions 121 and the support sheet 123 on the opposite side to the light emitting body 110, enters this support sheet 123 without being refracted or reflected at this interface.

The light incident to the scatter control film 120 at an incident angle in a predetermined angular range including the perpendicular direction to the scatter control film 120, or the light incident to the light guiding portions 121 at an incident angle in the predetermined angular range travels straight in the light guiding portions 121 and the support sheet 123 on the opposite side to the light emitting body 110, and reaches the interface D between the scatter control film 120 and the outside air. The light incident to the scatter control film 120 at an incident angle lying off the predetermined angular range, or the light incident to the light guiding portions 121 at an incident angle lying off the predetermined angular range is reflected and scattered by the reflection films 122 and reaches the interface D between the scatter control film 120 and the outside air via the interface between the light guiding portions 121 and the support sheet 123 on the opposite side to the light emitting body 110.

Figure 30:
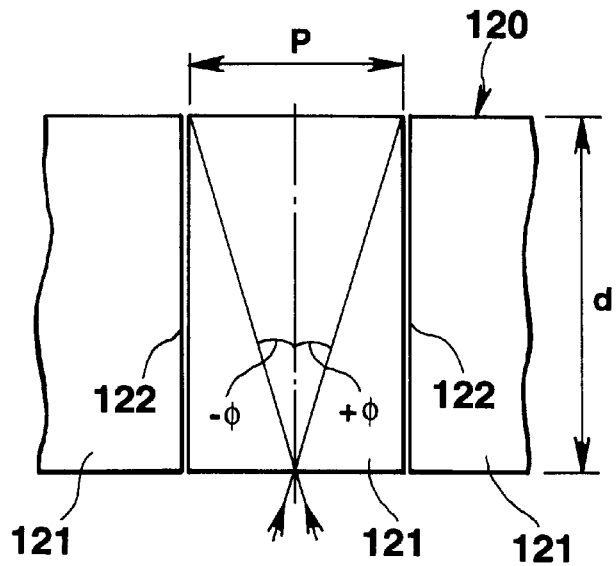
FIG. 30 is a diagram for explaining the range of the incident angle of the light which comes to the light guiding portion of the scatter control film and travels straight in the light guiding portion to reach the interface with the outside air.

The aforementioned predetermined angular range will be described more specifically. FIG. 30 is a diagram for explaining the range of the incident angle of the light, which, after being incident to any light guiding portion 121, travels straight in this light guiding portion 121 and reaches the interface D between the scatter control film 120 and the outside air, when the reflection films 122 of the scatter control film 120 are provided perpendicular to the film surface. Given that P is the distance between the reflection films 122 of the scatter control film 120 (the width of the light guiding portion 121), d is the thickness of the light guiding portion 121, and $+\psi$ and $-\psi$ are respectively the incident angle of light incident to the center of the light guiding portion 121 on the side of the light emitting body 110 from one direction to the normal direction and the incident angle of light incident from the other direction as shown in FIG. 30, the range of the incident angle of the light which, after being incident to the light guiding portion 121, travels straight in this light guiding portion 121 and reaches the interface D between the scatter control film 120 and the outside air is expressed by the following equation:

$d = P/2 \tan(\psi)$.

If the distance P between the reflection films 122 is 100 $\mu$m and the thickness d of the light guiding portion 121 is 572 $\mu$m, lights incident from the center of the light guiding portion 121 at incident angles of approximately $+\psi=+5°$ and $-\psi=-5°$ or greater come to the reflection films 122. Of the lights incident to the center of the light guiding portion 121, therefore, the light which has been incident to the normal direction within a smaller angular range than $\pm 5°$ travels straight in the light guiding portion 121 and the support sheet 123 on the side of the light emitting body 110 and reaches the interface D between the scatter control film 120 and the outside air, while the light which has been incident at a larger angular range than $\pm 5°$ reaches the reflection films 122 and is reflected by them.

The light reflected and scattered by the reflection films 122 travels in various directions in the light guiding portion 121, and a part of that light comes to the interface D. Most of the other portion of the light, which does not reach the interface D directly, is reflected and scattered by the reflection films 122 and a part of the reflected and scattered light reaches the interface D.

Therefore, the light incident to the light guiding portion 121 reaches the interface D between the scatter control film 120 and the outside air directly or after repeated reflection.

Of the light incident to this interface D, the one which has come at a smaller incident angle than the total reflection critical angle of the interface D passes through the interface D and goes out of the organic EL device 101.

The light perpendicularly incident to this interface D goes out perpendicularly without being refracted at the interface D, while the light incident obliquely to the perpendicular direction is refracted at the interface D in accordance with the incident angle to the interface D and the difference between the refractive index of the light guiding portion 121 and the support sheet 123 and that of the outside air (air), and goes out in that direction.

The light which has come at a greater incident angle than the total reflection critical angle of the interface D is fully reflected at the interface D, and the reflected light comes to the reflection films 122 to be repeatedly reflected and scattered by the reflection films 122. Those lights therefore eventually reach the interface D at a smaller incident angle than the total reflection critical angle, and pass through this interface D to go out.

The light which has come at a greater incident angle than the total reflection critical angle of the interface D becomes nearly perpendicular to the normal direction in the process in which the light is repeatedly reflected and scattered by the reflection films 122. This light goes out of the scatter control film 120 without being refracted at the interface D. Accordingly, the light going out in the direction perpendicular to the scatter control film 120 increases and the luminance of the light in the normal direction increases.

According to the organic EL device 101 of this embodiment, of the light having gone out from the light emitting body 110 and having reached the scatter control film 120, the light incident at an incident angle within a predetermined angular range goes out of the scatter control film 120 unscattered. The light incident to the scatter control film 120 at an incident angle off the predetermined angular range goes out of the scatter control film 120 after being reflected and scattered by the reflection films 122. Therefore, the light going out in the normal direction to the scatter control film 120 has a high luminance and the range that provides a sufficient luminance is wide. The light going out of the organic EL device 101 can therefore have an excellent luminance distribution.

According to the organic EL device 101 of this embodiment, of the light incident to the interface D between the scatter control film 120 and the outside air, the light incident at a greater angle than the total reflection critical angle of the interface D is reflected at the interface D, then changes its traveling direction as it is reflected and scattered by the reflection films 122, and finally comes to the interface D at a smaller incident angle than the total reflection critical angle of the interface D. This can permit most of the light incident to the scatter control film 120 to go out from the film 120, thus improving the light outgoing efficiency.

Figure 31:
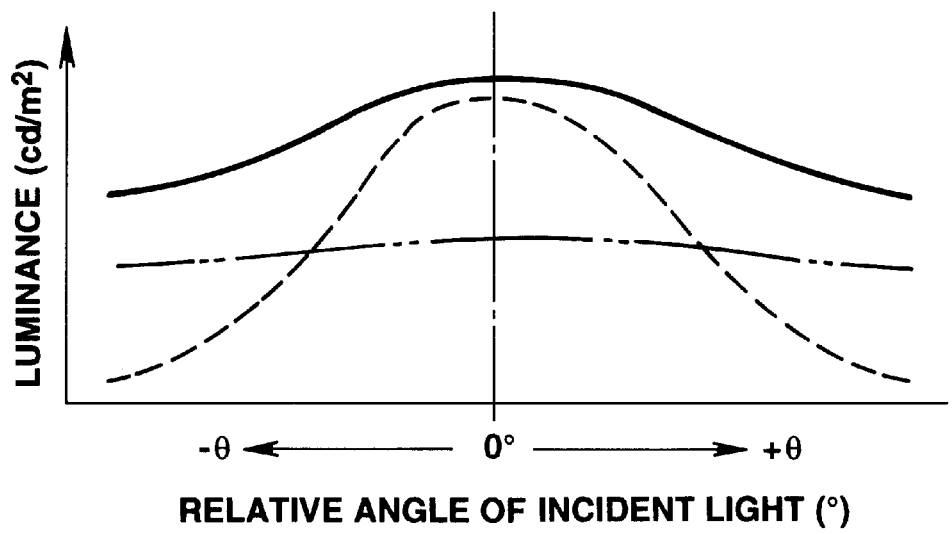
FIG. 31 is a diagram showing the luminance distribution of the outgoing light of the flat type light source in comparison with the luminance distribution in the case of only a light emitting body and the luminance distribution in the case where a diffusion plate is placed, in place of the scatter control film, on the light outgoing surface of the light emitting body.

FIG. 31 shows the luminance distribution of the outgoing light from the organic EL device 101 in comparison with the luminance distribution of an organic EL device comprising the light emitting body 110 alone and the luminance distribution of an organic EL device having a diffusion plate located on the light outgoing surface of the light emitting body 110. In the figure, the solid line indicates the luminance distribution with respect to the outgoing angle of the organic EL device 101, the broken line indicates the luminance distribution with respect to the outgoing angle of the organic EL device comprising the light emitting body 110 alone, and the two-dot chain line indicates the luminance distribution with respect to the outgoing angle of the luminance distribution of the organic EL device having the diffusion plate located on the light outgoing surface of the light emitting body 110.

The luminance distribution of the organic EL device 101 indicated by the solid line in FIG. 31 is the luminance distribution on a plane which is perpendicular to the light outgoing surface of the organic EL device 101 (the surface of the scatter control film 120) and along the lengthwise direction of the light guiding portions 121 and the reflection films 122. In FIG. 31, +θ indicates the outgoing angle of the light on that plane in one direction, and −θ indicates the outgoing angle of the light on that plane in the other direction.

As shown in FIG. 31, when the organic EL device comprises only the light emitting body 110, the luminance of the light going out frontward (perpendicular to the light outgoing surface), but sharply drops as the outgoing angle increases. That is, the organic EL device comprising the light emitting body 110 alone has a strong directivity. The light emitting body 110 alone suffers a narrow outgoing angle range in which outgoing light with a high luminance is acquired.

The luminance distribution in the case where the diffusion plate is located on the light outgoing surface of the light emitting body 110 is approximately uniform. As the light outgoing frontward from the organic EL device is also scattered, the luminance of the light outgoing frontward is significantly lower than the organic EL device 101.

According to the organic EL device 101 of this embodiment, by contrast, the luminance of the outgoing light frontward is high and the outgoing angle range where outgoing light with a sufficient luminance is obtained is wide. According to the organic EL device 101 of this embodiment, in addition to straight light perpendicularly incident to the scatter control film 120 and outgoing directly, the light reflected and scattered by the reflection films 122 and perpendicularly incident to the interface D goes out perpendicularly. Therefore, the luminance of the light which goes out frontward is higher than the one in the case where the organic EL device 101 comprises only the light emitting body 110.

Because the organic EL device 101 according to this embodiment uses the light emitting body 110 which has the organic EL layer 114 with a high transmittance to visible light, it can cause the emitted light to efficiently go out.

A nonemission portion called a dark spot may be produced on the light emitting body 110 of the organic EL device 101. When this dark spot occurs, the luminance distribution of the outgoing light from the light emitting body 110 may suffer a partial drop corresponding to the occurred position of the dark spot With the use of the organic EL device 101 according to this embodiment, however, the scatter control film 120 can overcome the problem of such a drop in the luminance distribution. Therefore, the organic EL device 101 according to this embodiment can permit light with a uniform luminance distribution to go out even if a dark spot occurs.

This organic EL device 101 can be used as a reflection light source which reflects the outside light like natural light or room illumination light as well as a light source which emits light In this case, as indicated by the broken-line arrow in FIG. 28, the outside light which is incident to the interface D between the surface of the scatter control film 120 and the outside air at a smaller incident angle than the total reflection critical angle of the interface D passes the interface D and comes to the light guiding portions 121 via the support sheets 123.

The outside light incident to the light guiding portion 121 takes different paths according to the incident angle to the light guiding portion 121. The light incident to the scatter control film 120 at an incident angle within a predetermined angular range around the normal direction travels straight in the light guiding portions and the support sheets 123 and reaches the interface C between the light emitting body 110 and the scatter control film 120.

Here, the refractive indexes of the light guiding portions 121 and the support sheets 123 of the scatter control film 120 are substantially the same as the refractive index of the transparent electrode 111. The scatter control film 120 is adhered to the light emitting body 110 by an adhesive whose refractive index is substantially the same as that of any of the light guiding portions 121, the support sheets 123 and the reflection films 122 or whose refractive index lies between the refractive index of the light guiding portions 121 and the support sheets 123 and the refractive index of the transparent substrate 111. Therefore, most of the light incident to the interface C between the scatter control film 120 and the light emitting body 110 passes through the interface C and reaches the transparent electrode 111 of the light emitting body 110 without being refracted or reflected.

The outside light incident to the scatter control film 120 at an incident angle off the predetermined angular range or the light incident in the normal direction to the scatter control film 120 from a greatly skewed direction is reflected and scattered by the reflection films 122 at the boundaries between the light guiding portions 121.

The light reflected and scattered by the reflection films 122 travels in various directions in the light guiding portions 121, and a part of that light reaches the interface C between the light emitting body 110 and the scatter control film 120. This light incident to the interface C passes through the interface C and reaches the transparent substrate 111 of the light emitting body 110.

The other light is repeatedly reflected and scattered by the reflection films 122, and a part of that light goes to the light emitting body 110 and the other light goes to the interface D between the scatter control film 120 and the outside air.

Of the lights incident to the interface D, the light incident to the interface D at a greater incident angle than the total reflection critical angle is fully reflected at this interface D. The light incident at a smaller incident angle than the total reflection critical angle passes this interface D and goes out of the scatter control film 120. The direction of the light outgoing from the scatter control film 120 differs in accordance with the incident angle to the interface D. The light incident to the interface D from the normal direction goes out from the scatter control film 120 without being refracted at the interface D. The light incident to the interface D obliquely is refracted, and goes out in accordance with the difference between the refractive indexes of the support sheet 123 and the outside air.

The light fully reflected at the interface D repeatedly reflected and scattered by the reflection films 122. Those lights therefore eventually reach the interface D at a smaller incident angle than the total reflection critical angle, passes the interface D, then goes out.

That is, the scatter control film 120 has such an optical characteristic as to permit the direct outgoing of the light among those lights incident to the scatter control film 120 from the light emitting body 110 which reaches the scatter control film 120 at an incident angle within a predetermined angular range, without scattering, and to allow the outgoing of the light incident at an incident angle off the predetermined angular range after scattering. Further, the scatter control film 120 has such an optical characteristic as to permit the direct outgoing of the light among those outside lights incident to the scatter control film 120 which reaches the scatter control film 120 at an incident angle within a predetermined angular range, without scattering, and to allow the outgoing of the outside light incident at an incident angle off the predetermined angular range after scattering. The scatter control film 120 can therefore cause the outside light incident to the scatter control film 120 to go out from that side where the outside light has come as well as can permit the outgoing of the light from the light emitting body 110.

The light incident to the transparent electrode 111 after passing through the interface D between the scatter control film 120 and the light emitting body 110 is reflected by the electrode 113 and comes to the scatter control film 120 again. This light goes out from the scatter control film 120 directly or scattered in accordance with the incident angle.

Therefore, the flat type light source according to this embodiment can be used as a reflection light source which reflects the outside light as the source light as well as a light source which causes the light from the light emitting body 110 to go out.

According to the flat type light source of this embodiment, the light, which has left the light emitting body 110 and has reached the scatter control film 120 but at an incident angle within a predetermined angular range around the normal direction, goes out from the scatter control film 120 directly. The light which has reached the scatter control film 120 at an incident angle off the predetermined angular range is reflected and scattered by the reflection films 122, then goes out from the scatter control film 120. Therefore, the light going out in the normal direction to the scatter control film 120 has a high luminance and the angular range that provides a sufficient luminance is wide. The flat type light source according to this embodiment can therefore emit light with an excellent luminance distribution, as indicated by the solid line in FIG. 31. The flat type light source according to this embodiment can emit light with an excellent luminance distribution due to the light scattering effect of the scatter control film 120 even when it is used as a reflection light source.

Fifteenth Embodiment

Figure 32:
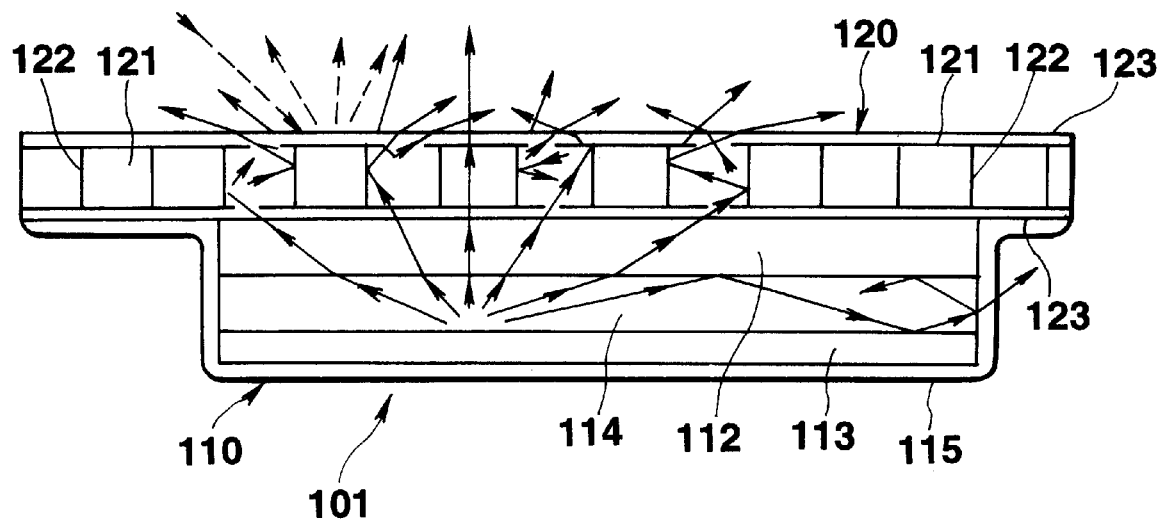
FIG. 32 is a cross-sectional view of a flat type light source according to fifteenth embodiment of this invention.

FIG. 32 is a cross-sectional view of a flat type light source according to the fifteenth embodiment of this invention. In this figure, hatching is omitted to more clearly show the light traveling paths to be discussed later. In the organic EL device (the flat type light source) 101 according to this embodiment, the transparent electrode of the light emitting body 110 is constituted by the scatter control film 120. The basic structure of the light emitting body 110 and the structure of the scatter control film 120 are the same as those of the fourteenth embodiment.

According to this embodiment, however, the refractive indexes of the light guiding portions 121 and the support sheets 123 are formed of transparent resins whose refractive indexes are substantially the same as that of the light outgoing side of the light emitting body 110 (the refractive index of the hole-transporting layer which is the light outgoing side layer when the organic EL layer 114 has a three-layer structure).

According to the organic EL device 101 of this embodiment, the light which has been emitted by the organic EL layer 114 and has passed the transparent electrode 112 reaches the scatter control film 120 without being fully reflected at the interface between the transparent electrode 112 and the scatter control film 120. Of the light emitted by the organic EL layer 114, what is fully reflected in the light emitting body 110 is mostly the light at the interface between the transparent electrode 112 and the organic EL layer 114. Therefore, the leak light from the light emitting body 110 mostly comes from the end portion of the organic EL layer 114. The flat type light source according to this embodiment can therefore increase the amount of outgoing light as compared with the flat type light source according to the fourteenth embodiment.

Although the reflection films 122 are formed along the normal direction to the scatter control film 120 according to the above-described fourteenth and fifteenth embodiments, they may be formed skewed.

Figure 33:
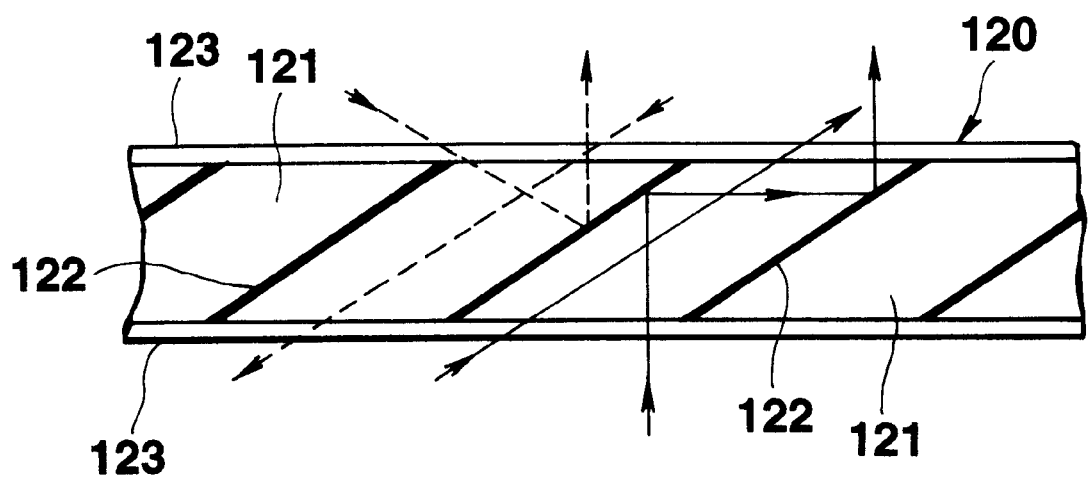
FIG. 33 is a cross-sectional view showing a modification of the scatter control film.

FIG. 33 is a cross-sectional view showing another example of the scatter control film 120. In this figure, hatching is omitted to more clearly show the light traveling paths to be discussed later. This scatter control film 120 has the individual light guiding portions 121 and reflection films 122 inclined to the film surface.

As indicated by the solid-line arrow in FIG. 33, of the light from the light emitting body 110 which is incident to the light guiding portion 121 of the scatter control film 120, the light incident at an incident angle within a predetermined angular range around the direction along a plane parallel to the reflection films 122 travels straight and unscattered in the light guiding portion 121 and goes out from the scatter control film 120. The light incident at an incident angle lying out of the predetermined angular range is reflected and scattered by the reflection films 122 and finally goes out from the scatter control film 120.

Therefore, the flat type light source which uses the scatter control film 120 shown in FIG. 33 can emit light with such a luminance distribution that the luminance of outgoing light in the direction skewed to the perpendicular direction to the light outgoing surface is high and the outgoing angle range where outgoing light with a sufficient luminance is obtainable is wide.

As indicated by the broken-line arrow in FIG. 33, the outside light incident to the light guiding portion 121 of the scatter control film 120 at an incident angle within a predetermined angular range around the direction along a plane parallel to the reflection films 122 travels straight and unscattered in the light guiding portion 121 and goes out from the scatter control film 120. The outside light incident at an incident angle lying out of the predetermined angular range is reflected and scattered by the reflection films 122 and finally goes out from the scatter control film 120. In this case, if the light emitting body 110 has reflection means, the light going out from the light guiding portion 121 toward the light emitting body 110 is reflected by this reflection means to reach the scatter control film 120 again, then goes out of the surface.

Therefore, the flat type light source which uses the scatter control film 120 shown in FIG. 33 can be used as a reflection light source which reflects the outside light as the source light as well as a light source which causes the light from the flat type light source to go out.

Although the fourteenth and fifteenth embodiments use the scatter control film 120 as a scatter control member, which comprises band-like light guiding portions 121 formed side by side in parallel and the reflection films 122 provided at the boundaries between the light guiding portions 121, the scatter control member may have reflection films provided in a grid form in a transparent film, or may have short reflection films in a transparent film at proper distances in the lengthwise direction and the widthwise direction.

Figure 34:
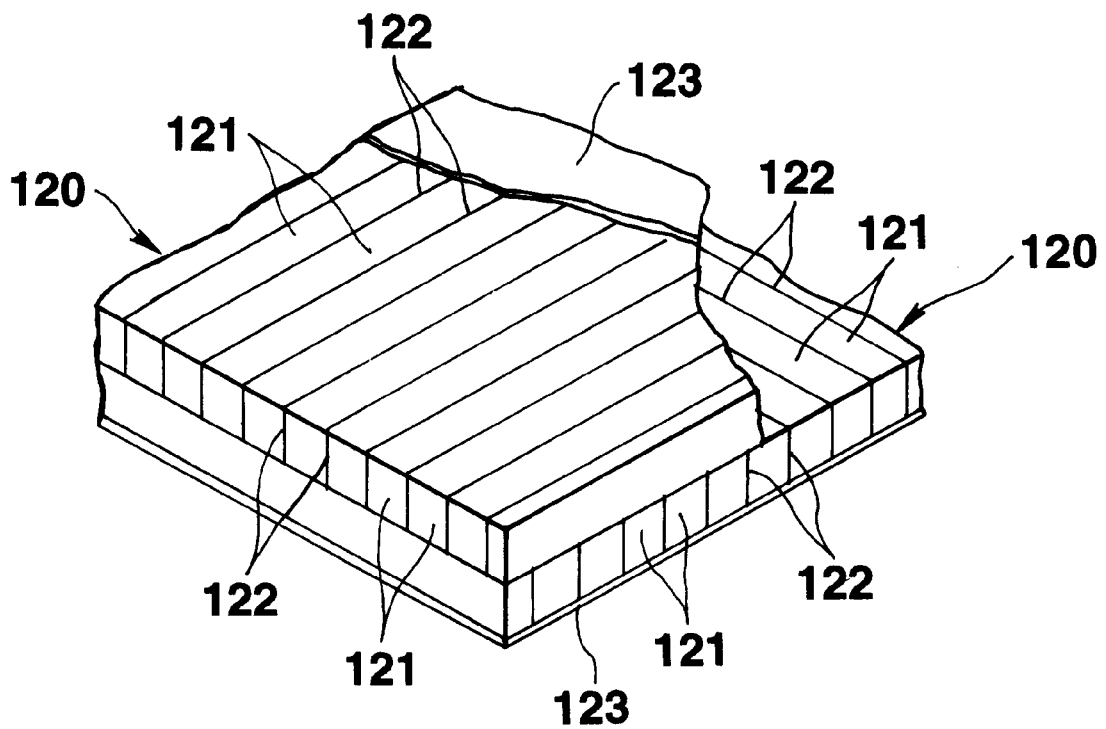
FIG. 34 is a perspective view showing a modification of the scatter control film.

FIG. 34 is a perspective view showing a modification of the scatter control member, which has two scatter control films 120 in the above-described embodiments, placed one on the other with the lengthwise sides of their reflection films 122 set perpendicular to each other. In this example, the opposing surfaces of the two scatter control films 120 are adhered to each other and the support sheets 123 are adhered to the outer surfaces of those scatter control films 120.

Since the reflection films 122 of such a scatter control member are substantially provided in a grid form, incident light is scattered in two perpendicular directions. The luminance distribution of outgoing light can be designed as shown in FIG. 31 in the two directions.

The scatter control member is not limited to the above-described structure, but may take any structure as long as it has such an optical characteristic that the light coming from the light emitting body at an incident angle within a predetermined angular range goes out unscattered, the light incident at an incident angle off the predetermined angular range is scattered and goes out the outside light coming incident at an incident angle within a predetermined angular range goes out unscattered, and the outside light incident at an incident angle off the predetermined angular range is scattered and goes out.

Sixteenth Embodiment

The following description of the sixteenth embodiment will be given of an LCD apparatus using the organic EL device 101, which has been discussed in the foregoing sections of the fourteenth and fifteenth embodiments.

Figure 35:
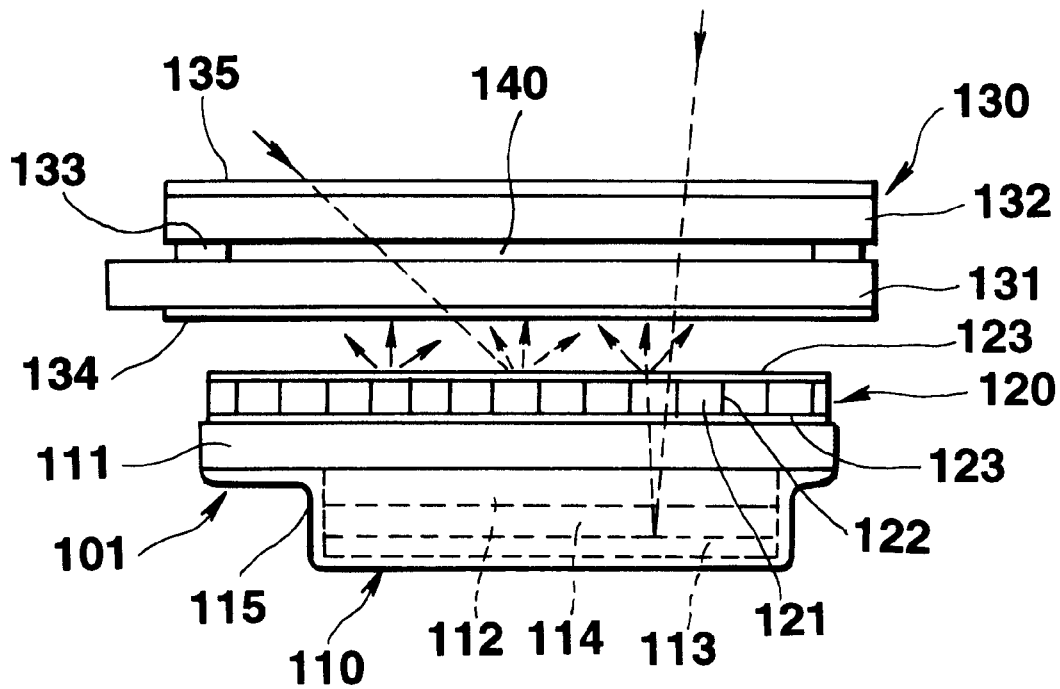
FIG. 35 is a cross-sectional view of an LCD apparatus according to the sixteenth embodiment of this invention.

FIG. 35 is a side view of the LCD apparatus according to the sixteenth embodiment which has the organic EL device 101 arranged as a back-light at the back of the LCD device 130.

The LCD device 130 is a simple matrix type or active matrix type ECB (Electrically Controlled Birefringence) LCD device. The LCD device 130 has a liquid crystal 140 sealed, with the LC molecules aligned in a predetermined alignment state, between a pair of transparent substrates 131 and 132 which have electrodes formed on their opposing surfaces and are connected by a frame-shaped seal member 133, and polarization plates 134 and 135 respectively arranged on the outer surfaces of the transparent substrate 131 and 132.

The LCD device 130 provides colored light by utilizing the birefringence effect of the layer of the liquid crystal 140 and the polarization effects of the polarization plates 134 and 135. As the linearly polarized light which has passed the polarization plate 134 passes the layer of the liquid crystal 140, it becomes elliptically polarized light whose polarization state varies wavelength by wavelength, due to the birefringence effect of the liquid crystal 140. Of this elliptically polarized light, the component in the direction of the transmission axis of the polarization plate 135 passes the polarization plate 135. That is, the intensity of the light which passes the polarization plate 135 differs wavelength by wavelength, and this wavelength-by-wavelength difference causes the light outgoing from the polarization plate 135 to be colored.

The LCD device 130 provides colored light without using color filters. Since there is no light absorption by color filters, the LCD device 130 can provide bright color display with a high transmittance.

The alignment state of the liquid crystal 140 changes in accordance with the voltage to be applied between the electrodes provided on the opposing surfaces of the transparent substrates 131 and 132. Consequently, the birefringence property of the liquid crystal 140 changes, and the wavelength-by-wavelength polarization state changes accordingly. The LCD device 130 can therefore alter the color of the transmitting light by controlling the applied voltage, and can permit each single pixel to display a plurality of colors to thereby display a color image.

According to this embodiment, the organic EL device 101 of the fourteenth embodiment shown in FIG. 28 is used as the aforementioned back-light. As the structure of the organic EL device 101 is the same as that of the one described in the section of the fourteenth embodiment, its description will not be repeated.

According to this LCD apparatus, the organic EL device 101 is located at the back of the LCD device 130. In the organic EL device 101, the scatter control film 120 is provided in front of the light emitting body 110. The scatter control film 120 permits the light, which has come to the scatter control film 120 from the light emitting body 110 at an incident angle within a predetermined angular range, to directly go out unscattered, and permits the light incident at an incident angle off the predetermined angular range to be scattered before going out.

This LCD apparatus 101 can be used as a reflection light source which reflects the outside light as the source light as well as a back-light for the LCD device 130. The LCD apparatus using the organic EL device 101 has both the transmission type display function and reflection type display function.

When this LCD apparatus is used as a transmission type with the organic EL device 101 activated, the light, which has left the light emitting body 110 and has reached the scatter control film 120 at an incident angle within a predetermined angular range around the direction perpendicular to the scatter control film 120, goes out of the scatter control film 120, unreflected and unscattered by the reflection films 122. The light incident to the scatter control film 120 at an incident angle off the predetermined angular range goes out of the scatter control film 120 in a wide angular range after being reflected and scattered by the reflection films 122. Therefore, the light having an excellent luminance distribution such that light going out frontward has a high luminance and the outgoing angular range of light with a sufficient luminance is wide can be made incident to the LCD device 130.

When this LCD apparatus is used as a reflection type utilizing the outside light, the outside light, incident to the scatter control film 120 at an incident angle within a predetermined angular range around the direction perpendicular to the scatter control film 120, is reflected by the electrode 113 and goes out of the scatter control film 120, unreflected and unscattered by the reflection films 122 The light incident to the scatter control film 120 at an incident angle off the predetermined angular range goes out of the scatter control film 120 in a wide angular range after being reflected and scattered by the reflection films 122. Therefore, the light having an excellent luminance distribution such that light going out frontward has a high luminance and the outgoing angular range of light with a sufficient luminance is wide can be made incident to the LCD device 130.

When the organic EL device 101 is activated, the scatter control film 120 of the organic EL device 101 improves the front luminance of the light emitted from the light emitting body 110 and smoothen the luminance distribution. In this case, this LCD apparatus serves as a transmission type LCD apparatus which has a high front luminance and a wide angle of visibility.

When outside light is used, the scatter control film 120 scatters the outside light and lets it go out in a wide angular range, and the electrode 113 of the light emitting body 110 reflects the outside light and lets it go out. In this case, this LCD apparatus serves as a reflection type LCD apparatus which has a high front luminance and a wide angle of visibility.

The LCD apparatus uses the organic EL device 101 as a back-light. The scatter control film 120 of the organic EL device 101 and the electrode 113 of the light emitting body 110 can reflect light. Therefore, the LCD apparatus reflects outside light incident from the surface (light outgoing surface) of the LCD device 130 as indicated by the broken-line arrow in FIG. 35 and can display an image using this reflected light without activating the light emitting body 110. This LCD apparatus can therefore be used as a so-called two-way display apparatus which has both of the transmission type display function which uses light from the organic EL device 101 and the reflection type display function which uses outside light.

The organic EL device 101 uses the organic EL layer 114 with a high light transmittance as a luminescent layer. The organic EL device 101 can therefore allow the light emitted by the organic EL layer 114 to go out efficiently, and permit the incident outside light to go out after efficient reflection.

The light emitting body 110 may produce a dark spot unique to the organic EL device. Even when such occurs, the scatter control film 120 can overcome the dropping of luminance caused by the produced dark spot. Accordingly, light with an excellent luminance distribution without a partial luminance drop gets to the LCD device 130, so that this LCD apparatus can display a high-grade image.

What is more, since this LCD apparatus uses an ECB LCD device, which acquires colored light without using color filters, as the LCD device 130, it can display a sufficiently bright color image even in the reflection type display which uses outside light.

The LCD device 130 is an ECB type which provides colored light by utilizing the birefringence effect of the liquid crystal 140 and the polarization effects of the polarization plates 134 and 135. When the color of the outgoing light is changed to red, green or blue in accordance with the applied voltage, therefore, light with high color impurities for all of red, green blue may not be obtained. In such a case, a luminescent material associated with a color for which it is difficult for the LCD device 130 to obtain light with a high color purity should be added to the organic EL layer 114. This modification allows the LCD apparatus to display a color image with a good color balance.

The scatter control film 120 should desirably be provided in close contact to the light emitting body I 10. It is desirable that the refractive indexes of the light guiding portions 121 and the support sheets 123 of the scatter control film 120 should substantially be the same as that of the member of the light emitting body 110 on the outgoing side (the transparent electrode 111 in the example in FIG. 35). This permits the light from the light emitting body 110 to be efficiently incident to the scatter control film 120 and permits light with a high luminance to go out of the organic EL device 101.

Figure 36:
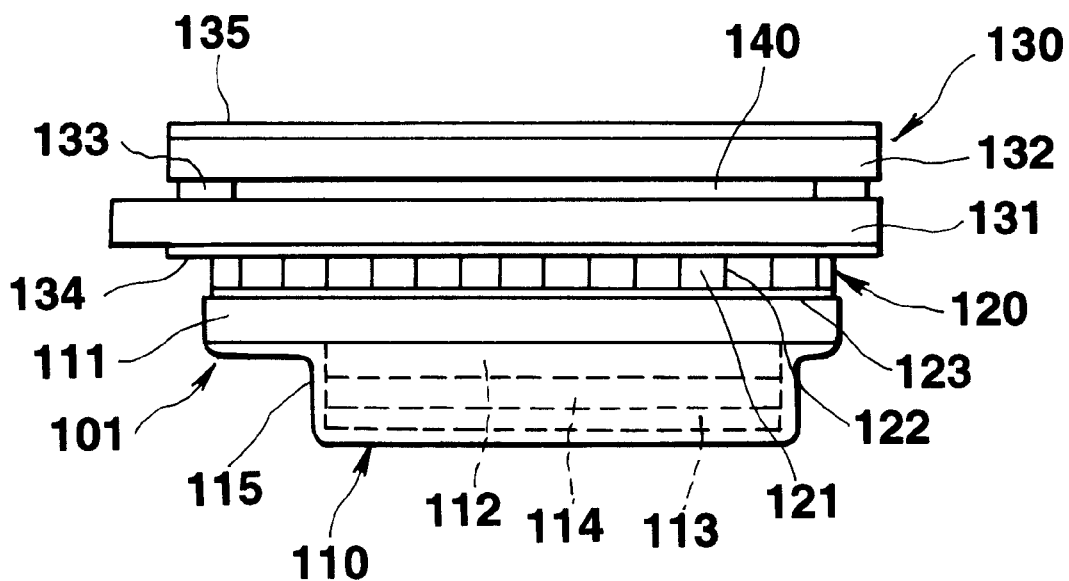
FIG. 36 is a cross-sectional view of another LCD apparatus according to the sixteenth embodiment of this invention.

According to the LCD apparatus of the above-described embodiment, as shown in FIG. 35, the organic EL device 101 has the scatter control film 120 positioned facing the LCD device 130. The organic EL device 101 may have the scatter control film 120 adhered to the LCD device 130 as shown in FIG. 36. In this case, the support sheet 123 on the surface of the scatter control film 120 may be omitted.

Although the LCD device 130 used in the LCD apparatus of this embodiment is an ECB type, the LCD device 130 may be a type which uses color filters to display a color image.

The LCD apparatus of this invention is not limited to the above-described fourteenth to sixteenth embodiments, but may be modified in various other forms. For instance, in addition to the EC liquid crystal, various liquid crystal modes, such as a TN liquid crystal mode, an STN liquid crystal mode, a guest-host (GH) liquid crystal mode, a PC (Phase Transition) mode which does not use a polarization plate, a PDLC (Polymer Dispersed Liquid Crystal) mode, a PDLC/GH mode, a cholesteric liquid crystal mode, and PC liquid crystal/GH mode, can be adapted to the LCD device 130. The structure of the LCD device 130, such as the provision or elimination of color filters or the provision or elimination of polarization plates, may be modified properly in accordance with the liquid crystal mode.

Although the organic EL layer 114 according to the fourteenth to sixteenth embodiments comprises the electron-transporting layer of Alq3 and the hole-transporting layer consisting of a mixture of PVCz, BND and individual R, G and B luminescent materials, another organic EL material may be used for the organic EL layer 18 so that the layer 114 comprises a single EL layer, or three or more EL layers.

According to the fourteenth to sixteenth embodiments, a mixture of PVCz, which disperses luminescent materials, and the luminescent materials may be contained in the organic EL device 12 to suppress the density loss caused by the cohesion of hydrogen bonding of the luminescent materials. A luminescent material which absorbs the energy of light or the like of the luminescent wavelength range from Alq3 or the hole-transporting layer and emits light of a predetermined wavelength range may be added to Alq3, or to Alq3 and the hole-transporting layer. While Alq3 itself emits bluish green light by the recombination of holes and electrons, bluish green light with a higher luminance can be emitted by mixing, for example, coumarin 6 in Alq3. A blue-light emitting material, such as TPB, 4,4'-bis(2,2'-diphenylvinylene)biphenyl, 4,4'-bis((2-carbazole)vinylene) biphenyl, tetraphenylbutadiene derivative, cyclopentadiene derivative, or oxadiazole derivative, may be mixed in Alq3.

Although a magnesium alloy is used as the material for the electrode 113 according to the fourteenth to sixteenth embodiments, a simple substance of hafnium (Hf, the work function of 3.63 eV) or a rare earth element, like scandium (Sc, the work function of 3.5 eV), yttrium (Y, the work function of 3.1 eV), lantern (La, the work function of 3.5 eV), cerium (Ce, the work function of 2.9 eV), praseodymium (Pr, the work function of 3.0 eV), neodymium (Nd, the work function of 3.2 eV), promethium (Pm, the work function of 3.5 eV), samarium (Sm, the work function of 2.7 eV), europium (Eu, the work function of 2.5 eV), gadolinium (Gd, the work function of 3.1 eV), terbium (Th, the work function of 3.5 eV), dysprosium (Dy, the work function of 3.5 eV), holmium (Ho, the work function of 3.5 eV), erbium (Er, the work function of 2.97 eV), thulium (Tm, the work function of ?.? eV), ytterbium (Yb, the work function of 2.6 eV) or lutetium (Lu, the work function of 3.5 eV), or an alloy containing any of those elements may be used as the material for the electrode 113.

Although the electrode 113 has a mirror structure with a smooth reflection surface according to the fourteenth to sixteenth embodiments, it may be formed with a rough reflection surface to scatter incident light. This design can widen the angle of visibility of the LCD apparatus.

What is claimed is:

1. A display apparatus comprising:
    a liquid crystal display panel having a pair of transparent substrates having electrodes formed on opposing surfaces and a liquid crystal sandwiched between said transparent substrates;
    an organic electroluminescence panel arranged opposite to said liquid crystal display panel, said organic electroluminescence panel including a front electrode having a transparency to visible light, a rear electrode having a reflection property with respect to said visible light, and an organic electroluminescence layer for emitting light as a predetermined voltage is applied between said front electrode and said rear electrode; and
    a scatter control member, located between said liquid crystal display panel and said organic electroluminescence panel, for sassing light incident at an incident angle within a predetermined angular range without scattering through said scatter control member, and for passing light incident at an incident angle outside said predetermined angular range with scattering.

2. The display apparatus according to claim 1, wherein said scatter control member includes:
    a plurality of light guiding portions arranged adjacent to one another and having a transparency to visible light; and
    a plurality of reflection films located between said plurality of light guiding portions and having a reflection property with respect to said visible light.

3. The display apparatus according to claim 1, wherein said organic electroluminescence layer contains a red luminescent material for emitting red light, a green luminescent material for emitting green light and a blue luminescent material for emitting blue light, and emits white light as the predetermined voltage is applied between said front electrode and said rear electrode.

4. The display apparatus according to claim 1, wherein said organic electroluminescence layer contains a red luminescent material for emitting red light, a green luminescent material for emitting green light and a blue luminescent material for emitting blue light, and emits bluish white light as the predetermined voltage is applied between said front electrode and said rear electrode.

5. The display apparatus according to claim 1, wherein said liquid crystal display panel has a luminescent color conversion layer for absorbing light emitted by said organic electroluminescence layer and emits light with a longer wavelength range than that of said absorbed light.

6. The display apparatus according to claim 1, wherein said front electrode and said organic electroluminescence layer are located between said rear electrode and said liquid crystal display panel.

7. The display apparatus according to claim 1, wherein said organic electroluminescence panel has a substrate located on a side of said rear electrode and showing a transparency to visible light.

8. The display apparatus according to claim 1, wherein said front electrode is an anode electrode for injecting holes into said organic electroluminescence layer and said rear electrode is a cathode electrode for injecting electrons into said organic electroluminescence layer.

9. The display apparatus according to claim 1, wherein said liquid crystal display panel has color filters for respectively passing lights of specific wavelength ranges.

10. The display apparatus according to claim 1, wherein said liquid crystal display panel has at least one polarization plate located on at least one side of said pair of transparent substrates.

11. The display apparatus according to claim 1, wherein said liquid crystal display panel has at least one polarization plate located on at least one side of said pair of transparent substrates, and transmits light with a color and luminance corresponding to a birefringence effect of said liquid crystal which are changed in accordance with said voltage applied to said electrodes formed on said pair of transparent substrates and a polarization effect of said polarization plate.

* * * * *

UNITED STATES PATENT AND TRADEMARK OFFICE
CERTIFICATE OF CORRECTION

PATENT NO. : 6,025,894
DATED : February 15, 2000
INVENTOR(S) : Tomoyuki SHIRASAKI et al It is certified that error appears in the above-indentified patent and that said Letters Patent is hereby corrected as shown below:

Column 46, line 8 (claim 1, line 17), change "sassing" to --passing--.

Signed and Sealed this

First Day of May, 2001

Attest:

NICHOLAS P. GODICI

*Attesting Officer*      *Acting Director of the United States Patent and Trademark Office*